United States Patent [19]
Haraguchi et al.

[11] Patent Number: 5,321,462
[45] Date of Patent: * Jun. 14, 1994

[54] LENS SHUTTER CAMERA INCLUDING ZOOM LENS

[75] Inventors: Keisuke Haraguchi; Shinsuke Kohmoto; Takeo Kobayashi; Shigeru Kondoh; Hideki Ohkubo; Norio Numako; Hirofumi Matsuo; all of Tokyo, Japan

[73] Assignee: Asahi Kogaku Kogyo Kabushiki Kaisha, Tokyo, Japan

[*] Notice: The portion of the term of this patent subsequent to Oct. 20, 2009 has been disclaimed.

[21] Appl. No.: 924,631

[22] Filed: Aug. 4, 1992

Related U.S. Application Data

[60] Continuation of Ser. No. 480,214, Feb. 14, 1990, Pat. No. 5,157,429, which is a division of Ser. No. 144,030, Jan. 7, 1988, Pat. No. 4,944,030.

[30] Foreign Application Priority Data

| | | |
|---|---|---|
| May 12, 1986 [JP] | Japan | 61-108278 |
| May 12, 1986 [JP] | Japan | 61-108279 |
| May 28, 1986 [JP] | Japan | 61-80861 |
| May 28, 1986 [JP] | Japan | 61-80862 |
| Jun. 2, 1986 [JP] | Japan | 61-83932 |
| Jun. 2, 1986 [JP] | Japan | 61-127496 |

(List continued on next page.)

[51] Int. Cl.⁵ .............................................. G03B 5/00
[52] U.S. Cl. .................................................. 354/195.1
[58] Field of Search ................. 354/195.1, 195.12, 199

[56] References Cited

U.S. PATENT DOCUMENTS

| | | | |
|---|---|---|---|
| 2,378,406 | 6/1955 | Harris | 354/288 |
| 2,995,061 | 8/1961 | Haraguchi et al. | |
| 3,095,794 | 7/1963 | Raab | 354/195.1 |

(List continued on next page.)

FOREIGN PATENT DOCUMENTS 0144933 6/1985 European Pat. Off. .
1135281 8/1962 Fed. Rep. of Germany .

(List continued on next page.)

OTHER PUBLICATIONS

Patent Abstracts of Japan, vol. 008, No. 141 (P-283), Jun. 1984.

(List continued on next page.)

Primary Examiner—W. B. Perkey
Attorney, Agent, or Firm—Sandler, Greenblum & Bernstein

[57] ABSTRACT

A lens shutter type of camera is disclosed in which a zoom lens is positioned in a lens block (1) which has a sector gear (15) rotatably associated with the lens block and with a rotatable cam ring (14). The cam ring and sector gear are rotatable in a substantially constant axial position. A movable finder optical assembly (8) and a movable strobe assembly (9) are movable in association with movement of the zoom lens. The zoom lens is movable between an extreme telephoto position and an extreme wide angle position, as well a into a fully collapsed lens position beyond the extreme wide angle position and a macro or closeup photographing position beyond the extreme telephoto position. When the camera is in its macro mode, a prism (P1) is inserted into the finder optical assembly to correct for parallax; the strobe assembly is moved to change its illumination angle; and an optical wedge (4e) is pivoted into the path between a light receiver (4) and a light emitter (3e). A single cam plate (53) is provided to move the finder assembly and the strobe assembly. The photographic aperture (22b) can be selectively closed by barrier plates (31a) when the zoom lens is moved into its fully collapsed position. A light intercepting assembly (210) is provided for preventing light from entering the photographic optical assembly via cam grooves (20 and 21). This intercepting assembly includes a flexible code plate (90) which surrounds a peripheral portion of the cam ring (14) and which provides positional information relating to the position of the zoom lens.

12 Claims, 32 Drawing Sheets

[30] Foreign Application Priority Data

| | | | |
|---|---|---|---|
| Jun. 21, 1986 | [JP] | Japan | 61-145470 |
| Jun. 26, 1986 | [JP] | Japan | 61-150995 |
| Aug. 15, 1986 | [JP] | Japan | 61-125045 |
| Aug. 22, 1986 | [JP] | Japan | 61-196911 |
| Aug. 29, 1986 | [JP] | Japan | 61-132658 |
| Aug. 29, 1986 | [JP] | Japan | 61-132659 |
| Aug. 29, 1986 | [JP] | Japan | 61-132660 |
| Aug. 29, 1986 | [JP] | Japan | 61-132661 |

U.S. PATENT DOCUMENTS

| | | | |
|---|---|---|---|
| 3,200,699 | 8/1965 | Graves | 352/171 |
| 3,246,590 | 4/1966 | Jenkins . | |
| 3,260,184 | 7/1966 | Pagel et al. . | |
| 3,267,828 | 8/1966 | Raab | 354/195.1 |
| 3,619,202 | 11/1971 | Bellows . | |
| 3,701,309 | 10/1972 | Thiele et al. . | |
| 3,721,492 | 3/1973 | Kessler | 352/137 |
| 3,777,684 | 12/1973 | Friedman et al. . | |
| 3,823,638 | 7/1974 | Bombardi | 84/503 |
| 3,893,135 | 7/1975 | Matsui et al. | 354/195.12 |
| 3,940,777 | 2/1976 | Komine | 354/195.12 |
| 3,972,056 | 7/1976 | Tsujimoto | 354/402 |
| 3,978,503 | 8/1976 | Shono . | |
| 3,979,763 | 9/1976 | Mills | 354/187 |
| 3,980,398 | 9/1976 | Von Belvard . | |
| 4,002,405 | 1/1977 | Stahl | 354/195.1 |
| 4,043,642 | 8/1977 | Hirose et al. . | |
| 4,072,971 | 2/1978 | Kuboshima | 354/199 X |
| 4,110,769 | 8/1978 | Schutz et al. | 354/195.1 |
| 4,122,466 | 10/1978 | Iwata | 354/149.1 X |
| 4,129,369 | 12/1978 | Kobayashi et al. | 354/195.12 |
| 4,132,463 | 1/1979 | Sakaguchi et al. . | |
| 4,171,887 | 10/1979 | Hayata | 354/195.12 X |
| 4,346,967 | 8/1982 | Komoto et al. . | |
| 4,367,934 | 1/1983 | Matsui | 354/403 |
| 4,404,595 | 9/1983 | Ushiro et al. | 358/227 |
| 4,410,253 | 10/1983 | Tsuboi | 354/195.1 |
| 4,443,078 | 4/1984 | Niwa et al. | 354/403 |
| 4,445,756 | 5/1984 | Komoto . | |
| 4,445,757 | 5/1984 | Enomoto et al. | 354/195.12 X |
| 4,451,129 | 5/1984 | Ikari et al. | 354/195.12 |
| 4,457,604 | 7/1984 | Tsuboi | 354/145.1 |
| 4,462,666 | 7/1984 | Orban | 354/126 |
| 4,491,396 | 1/1985 | Isobe et al. | 354/400 X |
| 4,506,959 | 3/1985 | Hama . | |
| 4,508,443 | 4/1985 | Matsuzaki et al. | 354/402 |
| 4,523,815 | 6/1985 | Tomori . | |
| 4,525,050 | 6/1985 | Ohashi | 354/195.12 |
| 4,537,487 | 8/1985 | Taniguchi et al. | 354/400 |
| 4,577,944 | 3/1986 | Grosser et al. | 352/35 |
| 4,596,449 | 6/1986 | Iwata et al. . | |
| 4,596,454 | 6/1986 | Kawai et al. | 354/286 |
| 4,609,269 | 9/1986 | Kamata | 354/195.12 |
| 4,627,691 | 12/1986 | Tomori . | |
| 4,634,254 | 1/1987 | Ogihara et al. | 354/403 |
| 4,643,555 | 2/1987 | Wakabayashi | 354/195.12 |
| 4,652,104 | 3/1987 | Harvey | 354/106 |
| 4,669,848 | 6/1987 | Wakabayashi | 354/400 |
| 4,699,491 | 10/1987 | Ishimura | 354/286 |
| 4,721,972 | 1/1988 | Wakabayashi | 354/195.1 |
| 4,768,048 | 8/1988 | Wakabayashi | 354/195.12 |
| 4,771,303 | 9/1988 | Matsumoto et al. | 354/195.12 |
| 4,822,153 | 12/1988 | Tomori . | |
| 4,833,497 | 5/1989 | Sugawara | 354/403 |
| 4,857,951 | 8/1989 | Nakajima et al. | 354/400 |
| 4,864,338 | 9/1989 | Wakabayashi | 354/187 |
| 4,914,461 | 4/1990 | Hori | 354/149.1 |
| 4,916,475 | 4/1990 | Hori | 354/419 |
| 4,951,074 | 9/1990 | Ueda | 354/149.1 |
| 4,992,809 | 2/1991 | Nozaki et al. | 354/149.11 |

FOREIGN PATENT DOCUMENTS

| | | |
|---|---|---|
| 2007179 | 10/1970 | Fed. Rep. of Germany . |
| 2706551 | 8/1977 | Fed. Rep. of Germany . |
| 2847319 | 5/1980 | Fed. Rep. of Germany . |
| 3211557 | 11/1982 | Fed. Rep. of Germany . |
| 3220265 | 1/1983 | Fed. Rep. of Germany . |
| 3336265 | 4/1984 | Fed. Rep. of Germany . |
| 11-18930 | 10/1936 | Japan . |
| 4980242 | 10/1947 | Japan . |
| 36-18930 | 10/1961 | Japan . |
| 47-27020 | 10/1972 | Japan . |
| 50-36118 | 4/1975 | Japan . |
| 51-47236 | 4/1976 | Japan . |
| 51-127725 | 11/1976 | Japan . |
| 51-147041 | 11/1976 | Japan . |
| 52-101027 | 8/1977 | Japan . |
| 53-25422 | 3/1978 | Japan . |
| 53-63014 | 6/1978 | Japan . |
| 53-127719 | 11/1978 | Japan . |
| 54-2668 | 2/1979 | Japan . |
| 54-14231 | 2/1979 | Japan . |
| 54-50324 | 4/1979 | Japan . |
| 54-66541 | 5/1979 | Japan . |
| 56-5072 | 2/1981 | Japan . |
| 56-89731 | 7/1981 | Japan . |
| 56-102521 | 8/1981 | Japan . |
| 58-63921 | 4/1983 | Japan . |
| 6059311 | 4/1983 | Japan . |
| 58-202432 | 11/1983 | Japan . |
| 59-113 | 1/1984 | Japan . |
| 59-23335 | 2/1984 | Japan . |
| 59-041014 | 3/1984 | Japan . |

(List continued on next page.)

OTHER PUBLICATIONS

European Search Report and Annex, Sep. 1993.
Candian Office Action of May 21, 1993.
EPO Search Reports and Annexes, Jun. 5, 1992, May 26, 1992.
European Search Report and Annex, May 14, 1987, Jun. 22, 1992.

FOREIGN PATENT DOCUMENTS

| | | |
|---|---|---|
| 59-107310 | 6/1984 | Japan . |
| 59-109006 | 6/1984 | Japan . |
| 59-123832 | 7/1984 | Japan . |
| 60-52812 | 3/1985 | Japan . |
| 60-60729 | 4/1985 | Japan . |
| 60-70411 | 4/1985 | Japan . |
| 61-273514 | 5/1985 | Japan . |
| 60-129717 | 7/1985 | Japan . |
| 60-131526 | 7/1985 | Japan . |
| 60-175038 | 9/1985 | Japan . |
| 60-178415 | 9/1985 | Japan . |
| 60-235126 | 11/1985 | Japan . |
| 60-258525 | 12/1985 | Japan . |
| 61-13839 | 1/1986 | Japan . |
| 61-87122 | 5/1986 | Japan . |
| 63-49740 | 6/1986 | Japan . |

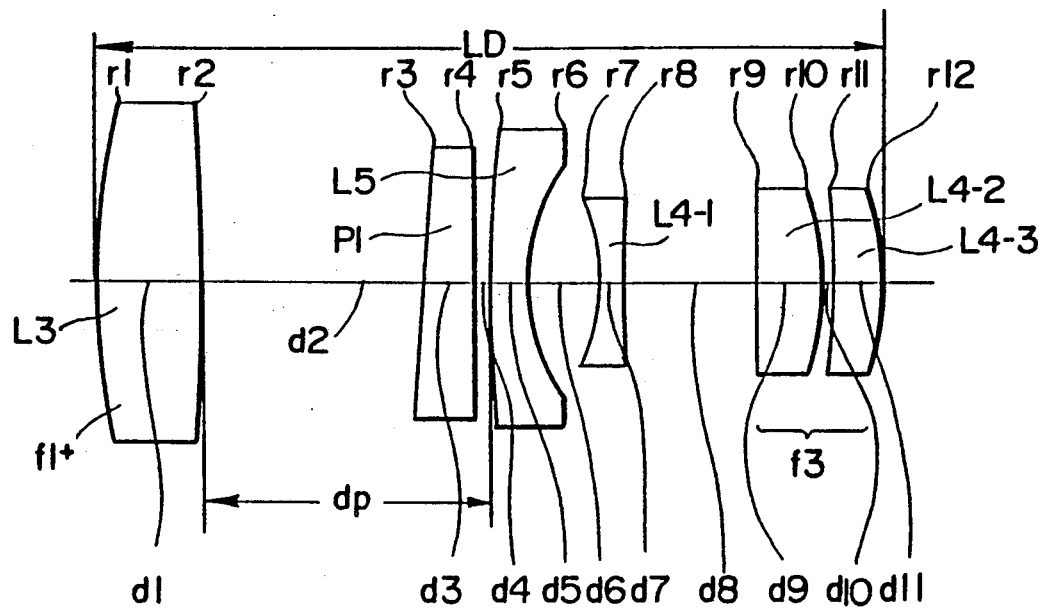
Fig-20A
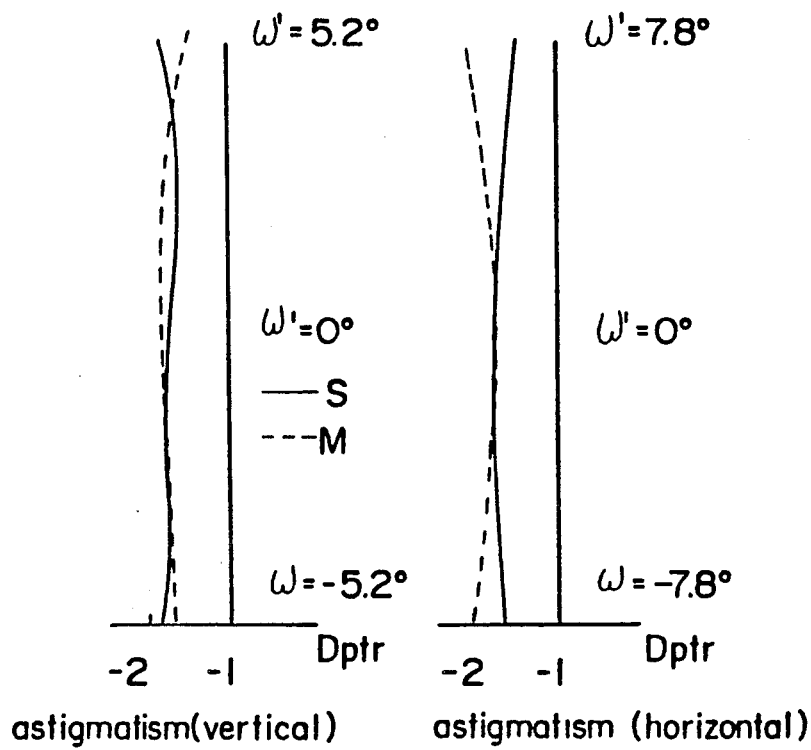
Fig-20B  Fig-20C

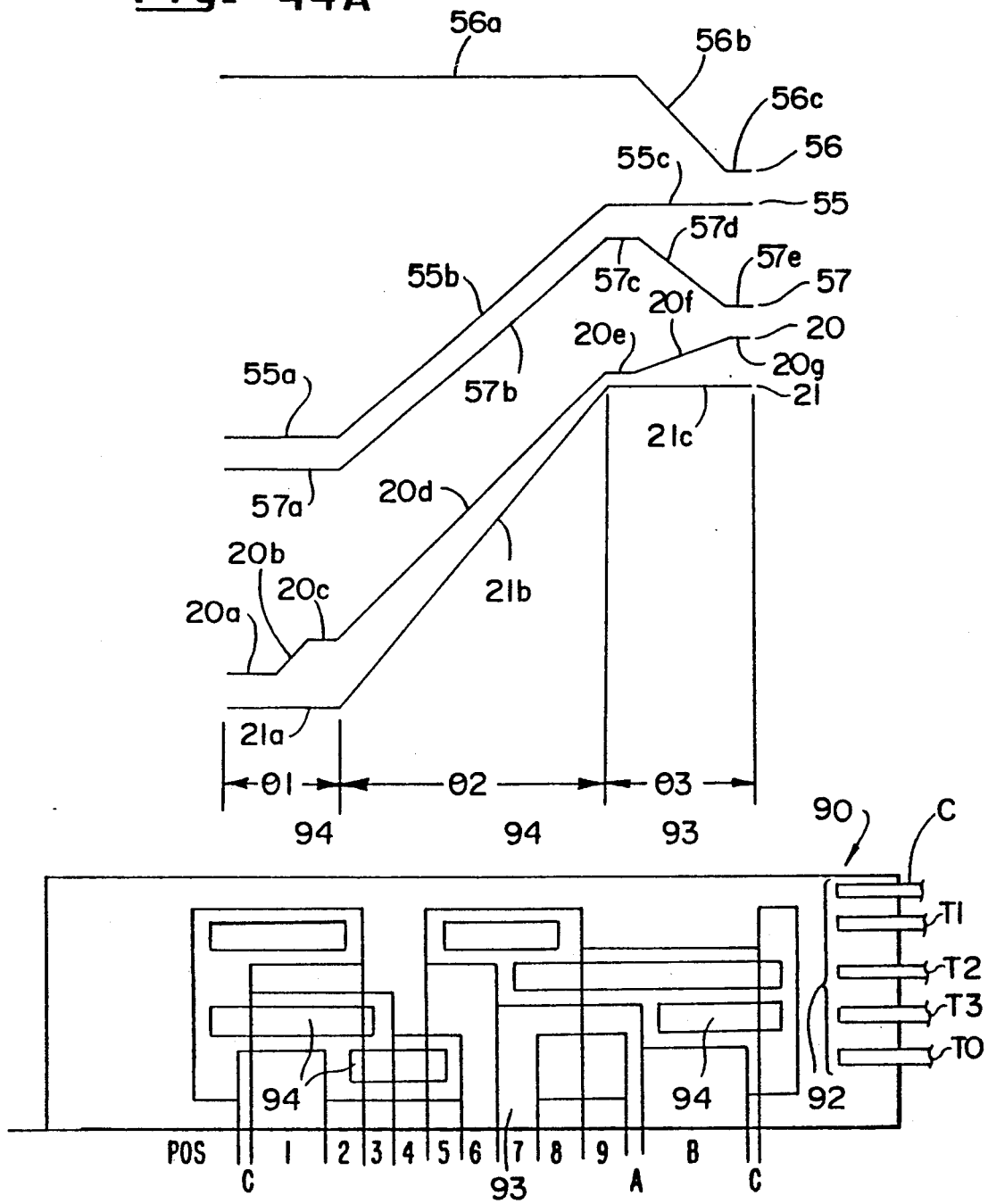

| ZP 3 2 1 0 | POS | NORMAL MODE CHANGING | ZOOM POSITION DURING FORWARD ROTATION | ZOOM POSITION DURING REVERSE ROTATION |
|---|---|---|---|---|
| 1 1 1 0 | 0 | LOCK | | |
| 1 0 1 0 | 1 | | | |
| 1 0 1 1 | 2 | f0 | | |
| 1 0 0 1 | 3 | f1 | | |
| 0 0 0 1 | 4 | f2 | | |
| 0 0 1 1 | 5 | f3 | | |
| 0 0 1 0 | 6 | f4 | STOP IMMEDIATELY | |
| 0 1 1 0 | 7 | f5 | | |
| 0 1 1 1 | 8 | f6 | | |
| 0 1 0 1 | 9 | f7 | | |
| 0 1 0 0 | A | f7' | | |
| 1 1 0 0 | B | | | |
| 1 1 0 1 | C | MACRO | | |

(Column "POSITION OF CAM" corresponds to POS.)

□ STARTING POSITION

○ STOP POSITION

▽△ POSITION OF ZOOM LENS WHEN MODE CHANGING SWITCH IS MOVED TO ZOOM POSITION DURING ROTATION OF ZOOMING MOTOR

Fig-45

LENS SHUTTER CAMERA INCLUDING ZOOM LENS

This application is a continuation of application Ser. No. 07/480,214, filed Feb. 14, 1990, now U.S. Pat. No. 5,157,429, (status, pending) which is a division of U.S. Ser. No. 07/144,030 filed Jan. 7, 1988, which is now U.S. Pat. No. 4,944,030 which issued on Jul. 24, 1990.

BACKGROUND OF THE DISCLOSURE

1. Technical Field

The present invention generally relates to a lens shutter type of auto-focus camera, and more particularly to a zoom lens type of camera in which a zoom lens system is used as a taking or photographing optical system, and in which a finder optical system and an electronic flash device (i.e., a strobe) are associated with the zooming operation of the zoom lens system. In other words, the finder optical system and the strobe move in coordinated fashion with zooming movement of the lens.

This application is related to the commonly assigned application filed on even date herewith, application Ser. No. 143,946, entitled "Zoom Lens Drive System for Camera", now U.S. Pat. No. 4,936,664 the disclosure of which is expressly incorporated by reference herein.

2. Background Art

Generally, in conventional lens shutter (i.e., between the lens shutter) types of auto focus cameras, it is impossible to vary the focal length of the photographic optical system. Other lens shutter types of auto focus cameras comprise a two focal length system, in which a lens is provided for varying the focal length and can be selectively inserted in the photographing optical system. In such a system, two focal lengths are provided; however, it is possible to use only the two focal lengths provided, e.g., a wide angle and a telephoto range for the zoom lens, or, e.g., a standard range and a telephoto range for the zoom lens. While taking advantage of such dual focal lengths, it is impossible to cover the range of focal lengths between the two extreme focal lengths, or between a wide angle and a medium telephoto focal length. Under such circumstances, taking pictures with the use of a zoom lens has heretofore only been possible by using a single lens reflex camera.

However, single lens reflex cameras are more expensive and heavier than lens shutter type cameras, and, accordingly, it is not easy for a photographer who is unfamiliar with cameras to freely use such single lens reflex cameras. Because of the heavy weight and relatively large size of such single lens reflex cameras, female photographers and travelers who are desirous of reducing the weight and the amount of baggage carried tend to hesitate to use such a single lens reflex (hereinafter SLR) camera, even if they appreciate the high quality pictures which are generally taken by such cameras.

Accordingly, users who would otherwise hesitate to use single lens reflex cameras which are relatively bulky and heavy, as noted above, have only two alternate choices: (a) a relatively small, light lens shutter type of automatic camera which has heretofore not been capable of controlling the focal length of the photographing optical system; or (b) a dual focal length type of auto focus camera in which only two extreme focal lengths can be used.

In view of such circumstances, one primary object of the present invention is to provide a small, light, compact lens shutter type of camera with a zoom lens in which focusing control and electronic flash or strobe control can be automatically effected.

Another object of the present invention is to provide a lens shutter type of auto-focus camera which has an additional macro (i.e., close-up) function with which an extremely large, detailed image can be taken; and in which a finder optical system and an electronic flash device are adapted to be coordinated with zooming operation of the zoom lens in the macro mode as well as in normal operation (e.g., in wide angle, telephoto or standard operation).

Yet another object of the present invention is to provide a movable macro compensating optical element which is used in the distance measuring apparatus or range finder in order to extend the optical base length from its value in the normal photographic mode, and to enable substantially the same area on the position detecting sensor to receive light when measuring the distance of a subject.

Still another object of the present invention is to provide a camera having a field of view with minimum parallax in the macro mode.

Another object of the present invention is to reduce parallax in a lens shutter type camera by providing a prism selectively movable into the path of a finder optical system in order to deflect the field of view downwardly and rightwardly to the axis of the photographing optical system when the camera is in its macro photographing mode.

Still a further object of the present invention is to move a strobe lamp assembly along an optical axis thereof in coordination with movement of a zoom lens.

Yet another object of the present invention is to provide a distance measuring device used in an auto-focus lens shutter type of camera in which an optical wedge is selectively inserted to extend the optical base length between the light emitter and the light receiver comprising the distance measuring device.

Still another object is to provide a finder optical system in which it is necessary to move only a single lens to vary the field of view.

Another object is to provide a lens shutter type camera with a light intercepting assembly which minimizes light from entering a photographic optical assembly lens system.

Still a further object of the present invention is to provide a lens shutter type of camera which includes a strobe assembly whose illumination angle varies in accordance with the position of a movable zoom lens assembly.

Yet another object of the present invention is to provide a lens shutter type camera in which a flexible printed circuit board is guided in its movement along one side of a cam ring and zoom lens, and which includes strucure for minimizing internal reflections from the FPC board into the interior of a photographing optical assembly.

DISCLOSURE OF INVENTION

The present invention provides a lens shutter type of camera having a subject distance measuring device, a photographing optical system which is driven in response to measurement of the subject distance which is detected by the subject distance measuring device, a finder optical system which is independent of the photographing optical system, and a strobe. In accordance with the present invention, the photographing optical system comprises a zoom lens assembly which is capable of successively varying the focal length of this optical system; the finder optical system is independent of the photographing optical system and comprises a variable power finder optical lens assembly which is capable of varying the field of view of the finder lens assembly, in accordance with the specific focal length of the zooming lens system at any point in time; and the zoom lens system and the variable power finder optical system are driven by a single zooming motor.

With such an arrangement, only the zooming operation and the shutter release operation will be manually effected, resulting in a high quality, compact automatic camera.

The lens shutter type of camera used in the present invention is functionally equivalent, or in fact superior, to a single lens reflex camera, insofar as it incorporates a strobe device, thereby providing a highly systemitized, auto-focus camera which is easy to use and handle.

The strobe device can be of a type, e.g., in which the illumination angle will be fixed, but is preferably a variable illumination angle strobe device which is capable of varying the illumination angle in accordance with, or in response to, the variable focal length of the zoom lens system.

In accordance with the present invention, the zoom lens system can either be partially or completely moved in the direction of the optical axis of the photographing optical system, beyond one of the focal length extremities, when the camera is placed into the macro mode. Another feature of the present invention is that the finder optical system comprises a variable power finder optical system which includes an optical element which is capable of varying the field of view, the optical element varying the field of view in accordance with or in response to the particular focal length of the zoom lens system. The finder system includes an optical element which is capable of deflecting the finder optical axis towards the optical axis of the photographing optical system in order to correct parallax in the macro mode of the camera.

In accordance with yet another feature of the present invention, a strobe device comprises a variable illumination angle strobe device which is capable of varying the strobe illumination angle in accordance with the focal length of the zoom lens system and in association with or in response to movement or transfer of the zoom lens (photographing lens) system into the macro mode.

The subject distance measuring device of the present invention is capable of detecting the subject distance by a conventional triangulation measuring method, which has been adopted to ensure precise detection of the subject distance, even when the camera is in its macro mode; this distance measuring device includes an optical element which is capable of deflecting the distance measuring light in order to optically extend the base length of the measuring device in response to transfer or movement of the zoom lens system into the macro mode.

In one aspect of the present invention a lens shutter type of auto focus camera is provided which has a zoom lens which is continuously movable between an extreme wide angle position and an extreme telephoto position. The lens is movable beyond the extreme telephoto position into a macro or close-up photographing position; and it is movable beyond the extreme wide angle position into a closed position in which the photographing lens is completely collapsed and in which lens barriers are provided to close an opening in a lens barrier block.

The finder field of view and strobe illumination angle in the camera vary in accordance with the zooming operation of the lens, as well as when the picture of a subject is taken in a macro mode at a close distance. Focusing can be automatically controlled in both the macro mode and in any range of the zooming lens. An optical wedge is adapted to be positioned along the optical path of the distance measuring device which forms a portion of the automatic focusing system of the camera. A prism is adapted to be pivoted into the optical path of the finder optical system in order to correct for parallax in the macro mode. A cam plate is provided which is driven by a single motor, which also drives the zoom lens Via a cam ring; and the cam plate is adapted to drive the finder optical system and the strobe light assembly in accordance with zooming operation of the zoom lens.

In a second aspect, the present invention provides a lens shutter type of camera having a zoom lens driven by a motor. The camera further comprises a finder optical assembly and means for moving the finder in accordance with zooming movement of the lens in order to vary the field of view through the finder.

In a third aspect, the present invention provides a lens shutter type of camera having a zoom lens driven by a motor, a movable strobe light assembly with a variable illumination angle, and means for moving the strobe assembly in accordance with zooming movement of the zoom lens.

In a fourth aspect of the present invention, a lens shutter type of camera is provided having a zoom lens driven by a motor, means for driving the zoom lens continuously between an extreme wide angle position and an extreme telephoto position, as well as means for driving the zoom lens beyond the telephoto terminal position in order to take a close-up or macro photograph.

The camera includes an automatic focusing mechanism which comprises a subject distance measuring device which measures the distance of the subject from the film plane of the camera by triangulation.

The distance measuring device includes an optical wedge which is movable into the path between a light emitter and a light receiver in order to extend the base length of the subject distance measuring device when the camera is placed into the close-up photographic mode.

A rotatable cam ring is attached to the zoom lens which houses the photographic optical assembly, and a rotatable gear is positioned about the cam ring. The cam ring includes a recess and an adjacent projection which are adapted to engage a lower end of the optical element and to pivot the optical element in front of the light receiver of the distance measurement device, and against the biasing force of a spring attached to the optical element.

The finder optical assembly and the strobe assembly can be positioned into a plurality of positions in response to or coordination with continuous movement of the lens over an infinite number of positions. This is achieved by the use of a code plate which defines thirteen positions, including extreme telephoto and extreme wide angle positions.

In a fifth aspect, the present invention discloses an automatic focus camera with a lens movable into a macro photographic position. This camera includes a subject distance measuring device which comprises means for determining the distance of a subject from a film plane in the camera. The camera further includes a photographic optical system which is automatically focused in accordance with the detected distance of the subject. The optical system is movable to an extreme telephoto position and to a macro or close-up position beyond the extreme telephoto position. The subject distance measuring device comprises an optical element and means for selectively inserting the optical element into the optical path of the subject distance measuring device. The optical element is positioned within a frame or mask which is attached to a flexible correction flag; the flag is pivotably connected to a camera base at one end, and has a second, free end to which the compensating optical element is positioned. A cam ring includes a rotatable gear thereon and includes a recess and an adjacent projection which are adapted to pivot the flag to overcome the bias of a spring which continuously biases the correcting flag into a retracted position away from the optical path of the light receiving element of the distance measuring device.

In another aspect, the present invention provides a zoom lens adapted to be positioned in a camera. The lens includes at least a first lens group and a second lens group and means for positioning the photographing optical system of the zoom lens in an extreme wide angle position and an extreme telephoto position. The zoom lens further comprises means for moving only the first lens group into a position beyond the extreme telephoto position in order to provide close-up focusing of the photographic optical system when the camera is in a macro photographing mode.

In a further aspect of the present invention, a camera is provided having a zooming lens positionable in an extreme wide angle position, an extreme telephoto position, and a plurality of variable magnification positions located between these two extreme positions, as well as in a close-up position beyond the extreme telephoto position. The camera includes an auto focus assembly comprising a light emitter and a light receiver, the light receiver comprising a position sensing device which has a first area which is used to sense the position of a subject during automatic focusing for all lens positions except a macro position, and a second area closely adjacent to the first area and which comprises means for sensing the position of a subject during macro focusing of the camera. These two areas can either be identical or overlapping.

The camera can comprises a zoom lens movable between an extreme wide angle position and an extreme telephoto position, and a plurality of variable magnification positions between the two extreme positions, as well as into a focusing position which is located beyond the extreme telephoto position. The camera includes a device for measuring the distance of a subject from the film plane of the camera which incorporates a light receiver and a light emitter. An optical element is selectively positionable in the optical path between the light receiver and the light emitter, and a motor is provided for driving the lens. Means are provided for drivably connecting the motor to the lens, and for positioning the optical element between the light emitter and the light receiver when the lens is moved into the close-up or macro focusing position.

The lens shutter type camera includes a photographic optical system having a zooming function and a macro function, and includes an independent finder optical system which comprises a first lens group having a negative refractive index and which comprises a positive lens and a negative lens, a second lens group comprising a negative lens, a third lens group having a positive refractive index, and a prism which is adapted to be selectively inserted into the optical path between the two lenses of the first lens group. The prism comprises means for deflecting the optical path of the finder optical system towards the optical axis of the photographic optical system when the prism is positioned between the lenses of the first group.

In still another aspect of the present invention, a finder optical system is provided in a lens shutter type of camera which has a photographing optical system which can have a macro photographing position. The finder optical system is independent of the photographing optical system and comprises at least one lens and an optical element which is selectively inserted into the finder optical system when the photographic optical system, i.e., the zoom lens, is in the macro mode. The optical element comprises means for correcting parallax by deflecting the optical axis of the finder optical system towards the optical axis of the photographic optical system.

A movable cam plate can be provided for the camera, and will be adapted to be driven by a motor. The cam plate comprises a substantially flat main portion, a downwardly extending rack attached to a rear end of the main portion, and a plurality of grooves located in the main portion. The grooves include a parallax compensating cam groove having a non-projecting section, a forward macro feeding section, and a macro fixing section; a strobe assembly guide groove having a wide angle section, a variable power section, and a telephoto section; and a variable lens guide groove having a wide angle section, a telephoto section, and a variable power magnification section.

In still another aspect, the lens shutter type camera comprises a photographing optical system including a zoom lens with a movable variable power lens group for varying the focal length of this optical system. An independent finder optical system is provided which has a variable power lens group for varying the finder field of view in accordance with the varying focal length of the zoom lens system, and a variable illumination angle strobe assembly is provided with a lamp which is movable in accordance with the focal length of the zoom lens system. A motor is provided for moving the zoom lens system variable power lens group, and a single cam plate is adapted to move in association with movement of the zoom lens. Movement of the cam plate moves the finder optical system via a first driven pin which is engaged in one groove in the cam plate, and the strobe assembly is moved via a pin which is attached to the strobe assembly and which is engaged in a second groove in the cam plate.

A lens cap opening mechanism is provided which is adapted to be used with a lens support frame having an outer periphery, a central opening, and at least one barrier plate for selectively closing the opening. The mechanism comprises a movable member positioned in a peripheral opening of the frame, with the member being engaged with the at least one barrier plate. Means are provided for selectively moving the member inwardly of the frame to close the opening with the at least one barrier plate.

The camera includes a zoom lens which can be moved by a driving motor into a collapsed lens position rearwardly of an extreme wide angle lens position. The lens is supported by an exterior frame having a central photographic opening and one or more barriers are provided for selectively closing the central opening. The camera comprises means for moving the barriers to close the opening when the lens is moved into the collapsed lens position and for opening the barriers in all other lens positions.

A light blocking mechanism is used in the lens shutter type camera which has a cam ring with at least one camming groove therein. The cam ring is rotatable in a constant axial position, and the light blocking mechanism comprises at least one light intercepting member positioned about the periphery of the cam ring. The light intercepting member comprises means for covering each of the cam ring grooves and for thereby preventing light from entering the interior of the cam ring.

In a lens shutter type of camera having a cam ring rotatable in a constant axial position and at least one movable lens barrel movable along an optical axis of a photographing optical system in response to rotation of the cam ring, a light interception member is provided which is positioned in a space between a front end of a cam ring support member and a front cover having an opening through which the lens barrel is adapted to move.

A flexible printed circuit board, i.e., an (FPC), is provided in the lens shutter type of camera and is adapted to conduct operational signals from the camera body to a shutter block attached to an axially movable lens barrel within the camera. A guide plate is provided for the FPC which has a front end with at least one bent portion and a rear end attached to the camera body which has a second bent guide portion thereon. The front guide plate end is attached to the shutter block. The lens shutter type of camera can also include an anti-reflection device attached to the flexible printed circuit board.

In another aspect of the present invention, a lens shutter type of camera is provided having a photographing optical system with a zoom lens having a rotatable cam ring with cam grooves engaged by at least one lens group in the zoom lens which is movable along an axis of the photographing optical system in order to vary the optical length of this optical system in response to rotational motion of the cam ring. The cam ring includes at least one flexible code plate attached to the ring which includes zoom lens positional information thereon.

Other objects, features and advantages of the present invention will hereinafter be described.

BRIEF DESCRIPTION OF DRAWINGS

The above and other objects, features, and advantages of the present invention will be described in greater detail with respect to the accompanying drawings, in which like reference numerals represent similar elements throughout the several views, and wherein:

FIGS. 15A–17A are vertical sectional views of a first embodiment of a finder optical system used in accordance with the present invention, in which:

FIG. 15A is a side plan view of the finder optical assembly when in a wide field, small magnification position;

FIG. 17A is a plan view of the assembly of FIG. 15A when the camera is in a narrow field, large magnification position when the camera is in its macro mode;

FIGS. 18A–18D, 19A–19D and 20A–20C are all vertical sectional views of a second embodiment of a finder optical system formed in accordance with the present invention in which:

FIG. 18A is a plan view of the optical system when the camera is in a wide field, small magnification mode;

FIG. 19A is a plan view of the optical system when the camera is in a narrow field, large magnification mode; and FIG. 20A is a plan view of the optical system when the camera is in a narrow field, large magnification macro mode;

FIGS. 18B–D, 19B–D, 20B and 20C respectively, are all views illustrating the aberrations for the finder optical assembly when it is in the positions of FIGS. 18A, 19A and 20A, respectively;

FIG. 32 is a sectional view similar to that of FIG. 31 but illustrating the optical barrier mechanism when it is in its closed position;

FIGS. 44A and 44B is a developed or schematic view of a code plate, with the lens of the code plate and grooves of the cam being illustrated on a flattened cam ring, illustrating the functional relationship between conductive lands on the code plate and the cam (ring and plate) grooves;

FIG. 45 is a table illustrating the zoom code on the code plate of FIG. 44 and the stopping positions which are located on the code plate;

BEST MODE FOR CARRYING OUT THE INVENTION

Figure 1:
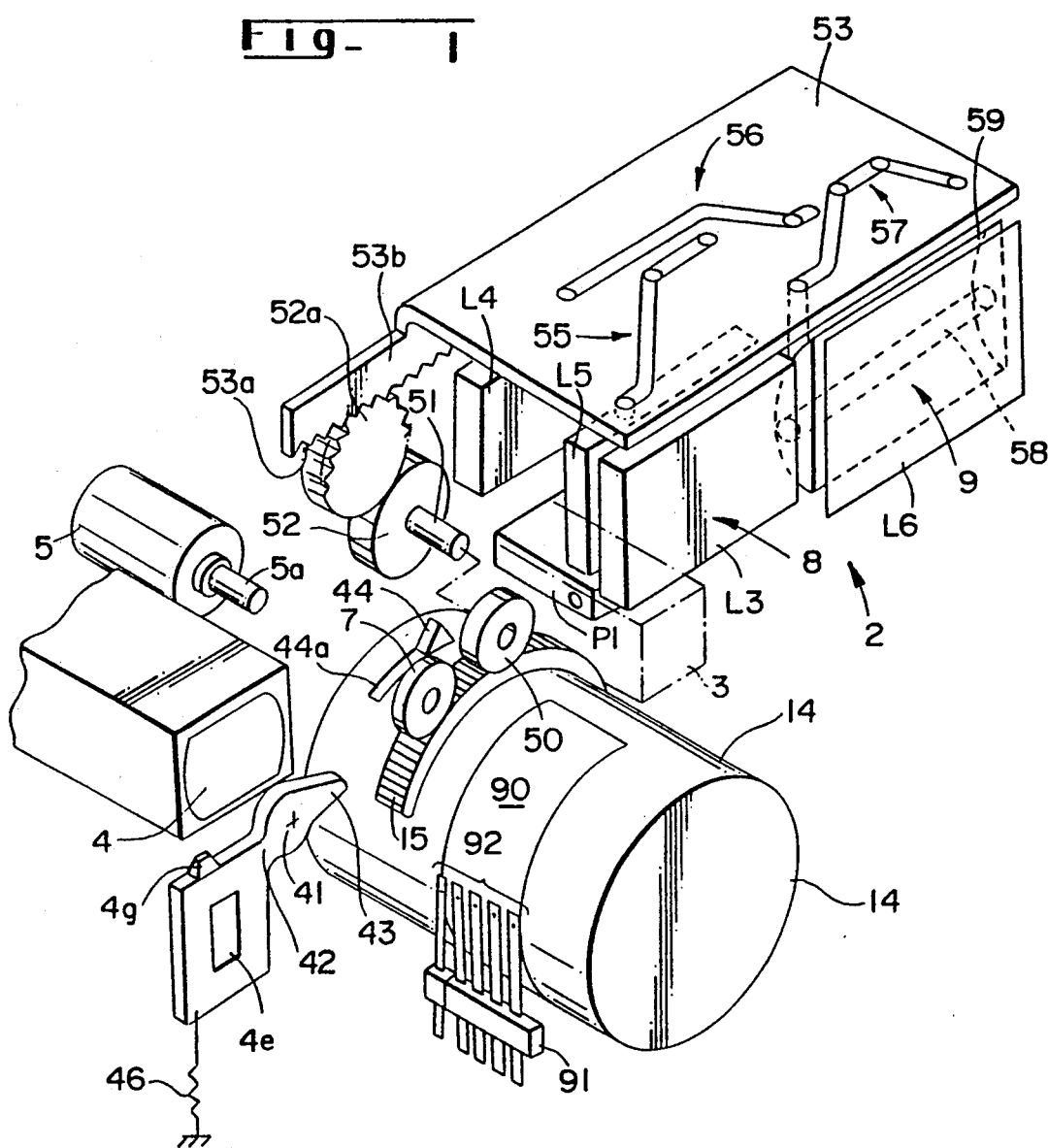
FIG. 1 is a schematic perspective view of a first embodiment of a lens shutter type of camera having a zoom lens formed in accordance with the present invention.

The present invention will now be described below in eater detail, with specific reference to the accompanying drawings which illustrate a variety of embodiments and features of the present invention.

The description will be generally provided in accordance with the following general sub headings:

A. The Overall Camera Construction for a Lens Shutter Type of Camera
B. Distance Measuring Device, i.e., Range Finder, and Camera Macro Functioning Thereof
C. Finder Optical System
D. Finder and Strobe Driving Mechanisms
E. Barrier, i.e., Lens Cap, Mechanism
F. Light Interception Assembly and Mechanism
G. FPC Board Guide and Anti-Reflection Mechanism
H. Mechanism for Detecting Information Relating to the Position of the Zoom Lens A. Overall Camera Construction for a Lens Shutter Type of Camera The overall construction of a lens shutter type of camera formed in accordance with the present invention is well illustrated in FIGS. 1-8. A lens shutter type of camera formed in accordance with the present invention essentially comprises a zoom lens barrel block 1, a finder and strobe block 2 (hereinafter referred to as a finder block), a light emitter 3 and a light receiver 4 forming a portion of a distance measuring, i.e., AF, device, and a zooming motor 5 which is used for the zooming operation of the photographing optical system. All of these elements are secured to a base 6 which forms an immovable portion of the camera body.

Figure 2:
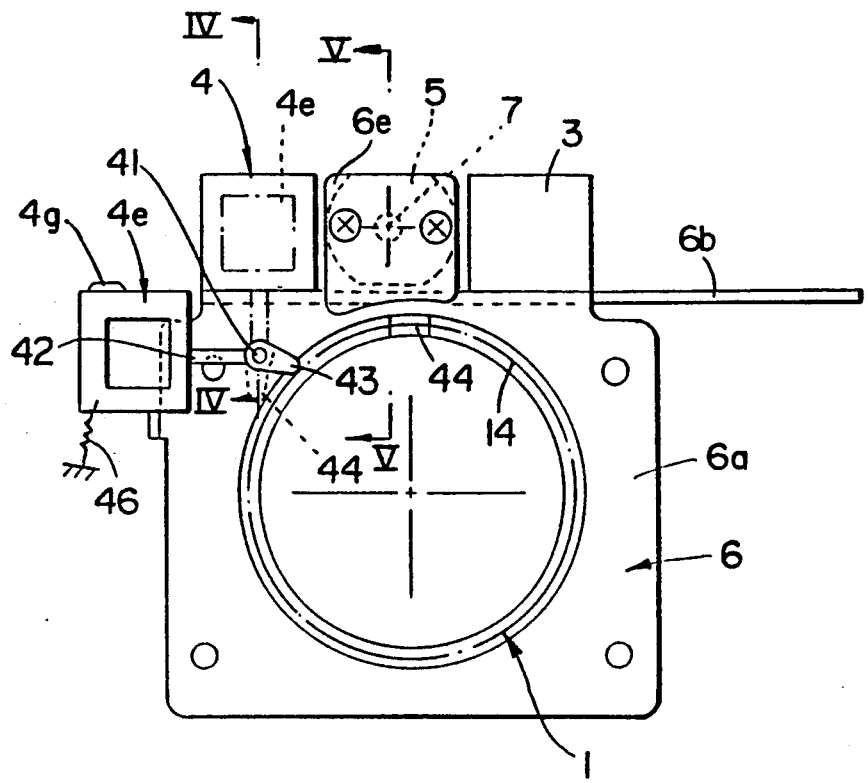
FIG. 2 is a front elevational view of a lens barrel block, a light emitter, a light receiver, and a macro compensating optical element which forms a part of a distance measuring device, together with a zooming motor, all forming a portion of the invention of FIG. 1.
Figure 3:
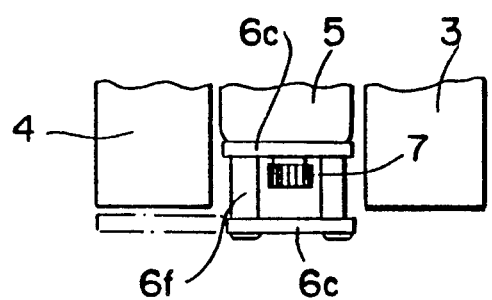
FIG. 3 is a top plan view of the apparatus of FIG. 2.
Figure 4:
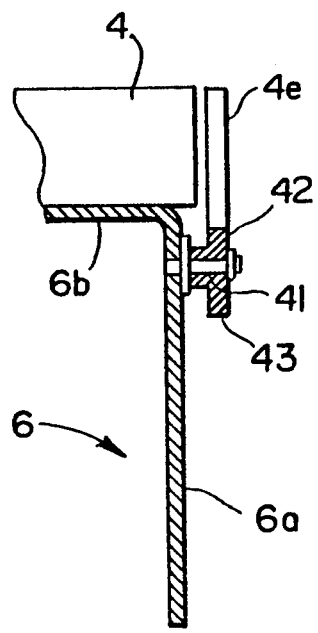
FIG. 4 is a sectional view taken along line IV—IV of FIG. 2.

Base 6 includes, as is best illustrated in FIGS. 2-4, a lens barrel supporting plate portion 6a which lies in a plane which is perpendicular to the optical axis of the lens; and a horizontal supporting plate portion 6b is provided which extends at right angles from the lens barrel support plate portion 6a. Support plate portion 6b extends beyond the side edge of plate 6a, as seen in FIG. 2, in order to support finder assembly 8 and strobe assembly 9. The base further comprises motor supporting plate portions 6c which are positioned perpendicularly with respect to the horizontal support plate portion 6b. Lens barrel block 1 is supported on lens barrel support plate portion 6a, which has a central opening (unreferenced) for receiving the lens barrel block as illustrated in FIG. 2. A zooming motor 5 is attached to motor support plate portions 6c and is located above the central portion of lens barrel block 1. Preferably, only a single such motor (e.g., a DC motor) is used to drivingly engage all of the movable elements of the system. A distance measuring device includes a light emitter 3 and a light receiver 4, which are secured to the horizontal support plate portion 6b of base 6, and which are located on opposite sides of zooming motor 5 (see FIGS. 2 and 3). Finder block 2 is secured to the right hand portion of horizontal support plate portion 6b, as viewed from the front of the camera as seen in FIG. 2. A gear train support plate portion 6e is connected to motor support plate portion 6c via spacer 6f, as best illustrated in FIG. 3.

Figure 6:
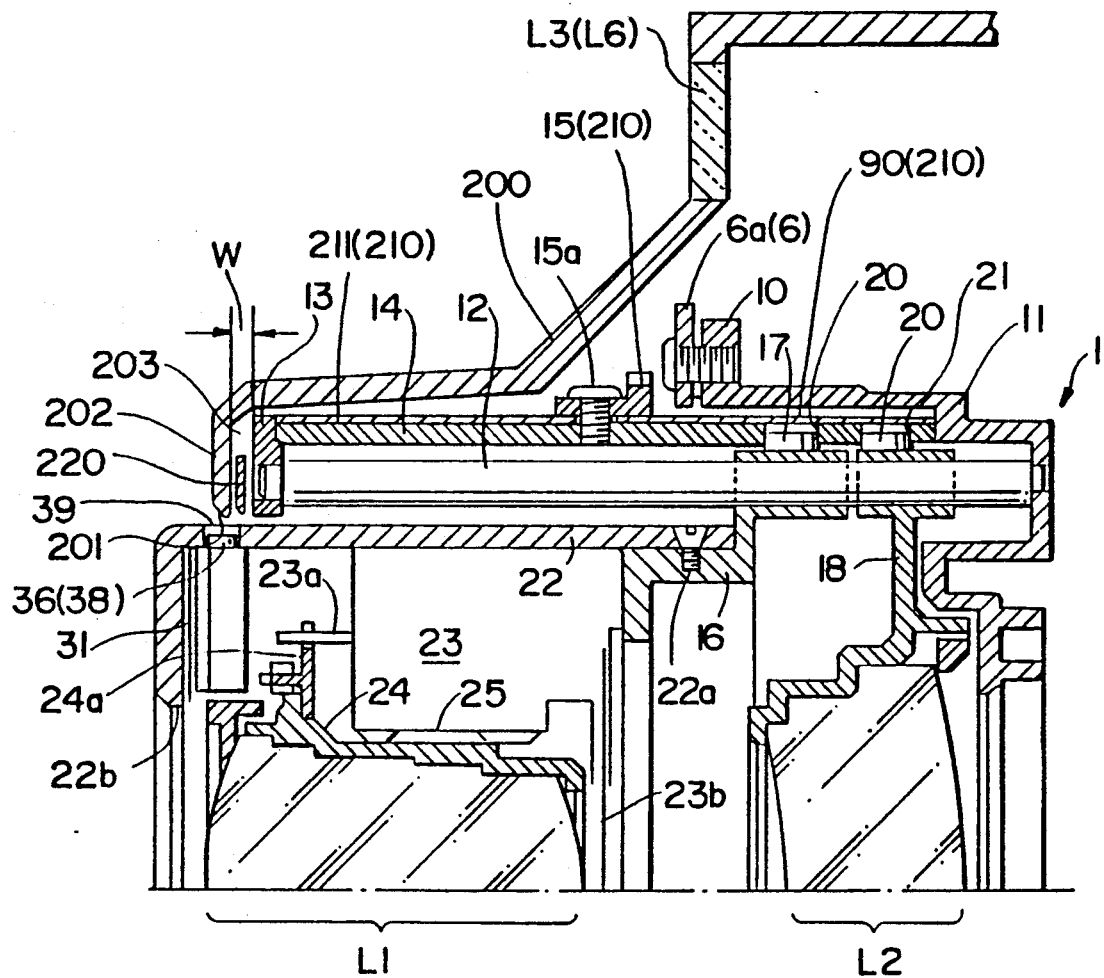
FIG. 6 is a longitudinal sectional view of a lens barrel block and two photographing optical lenses formed in accordance with the present invention.

Lens barrel block 1 is adapted to be actuated by zooming motor 5, and the construction of this block will be described hereinbelow with more specific reference to FIGS. 6-10. A rear securing plate 11 is mounted to lens barrel support plate portion 6a of base 6 by fastening screws 10, as is best illustrated in FIG. 6. Rear securing plate 11 includes four guide rods 12 which are attached to and through bores in the rear portion of the guide plate and which are located about the optical axis of the photographing optical system and parallel to this axis. A front securing plate 13 is secured to the front ends of guide rods 12; these guide rods and plates are the main securing elements for lens barrel block 1.

Figure 5:
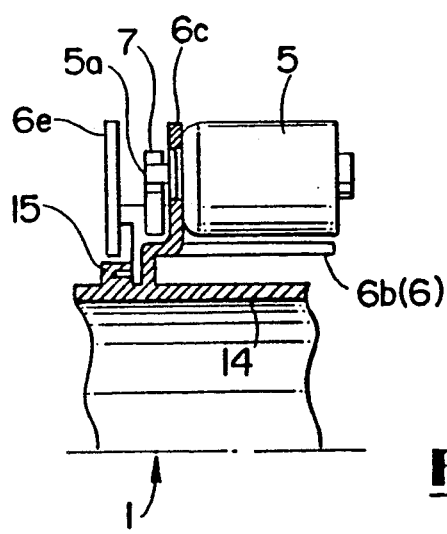
FIG. 5 is a sectional view of the apparatus of FIG. 2 taken along line V—V of FIG. 2.

A rotatable cam ring 14 is positioned between front and rear securing plates 13 and 11, respectively; a sector gear 15 is provided about a substantial portion (but preferably not the entire 360°) of the outer periphery of cam ring 14; this gear can be attached to the cam ring by conventional means, e.g., via set screws 15a, as seen in FIG. 6; this gear is adapted to engage, either directly or indirectly, a first pinion 7 (FIG. 1) which is positioned between the gear train support plate 6e and the motor support plate portion 6c, as seen in FIGS. 3 and (particularly) FIG. 5. Gear 15 can be a sector gear which will cover a predetermined range of rotational movement of cam ring 14; a turning recess 44a and cam surface 44 are provided adjacent to each other on (a flat surface portion of) the gear. The cam ring is itself provided with zooming cam grooves 20 and 21 (see FIG. 7) which are used to engage the front and rear lens element groups, respectively.

Figure 7:
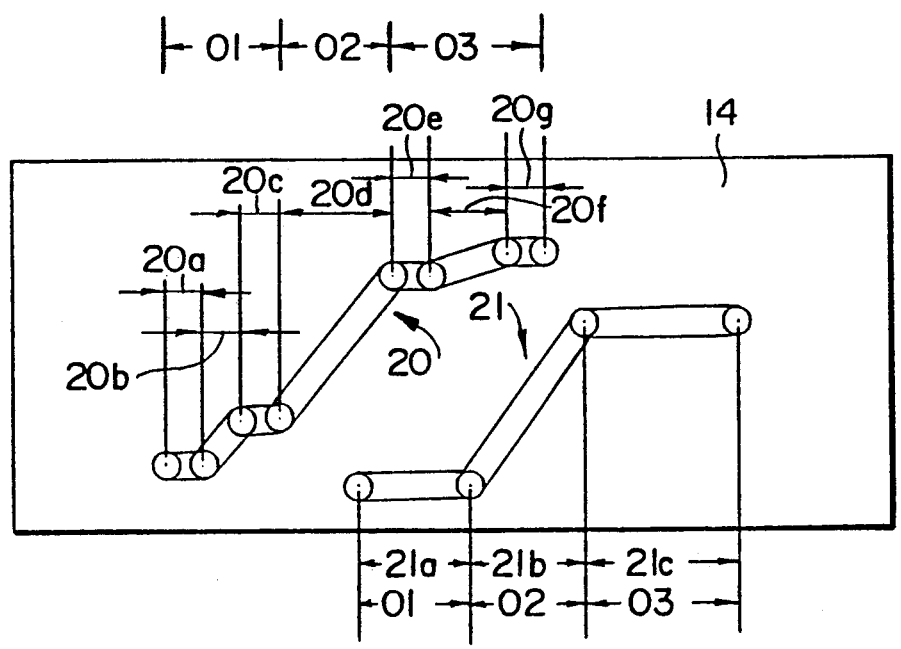
FIG. 7 is a developed view of the camming grooves in a "flattened" cam ring used to surround the front and rear lens element groups of the photographic optical system of the camera of FIG. 1.

FIG. 7 is a schematic or developed view of zooming cam grooves 20 and 21 of ring 14. Cam groove 21, used to engage the rear lens element group, includes an extreme wide angle fixing section 21a, a variable magnification section 21b inclined upwardly (as seen in FIG. 7) from section 21a, and an extreme telephoto fixing section 21c. Cam groove 20, used for the front lens element group, includes a section 20a for opening and closing barrier block 30, a lens retraction section 20b, an extreme wide angle fixing section 20c, a variable magnification section 20d, an extreme telephoto fixing section 20e, a macro transfer section 20f, and an extreme macro fixing section 20g.

When the term macro is used throughout this specification, it refers to a "close-up" photographing configuration for the camera. Previously, the term "macro" has occasionally been used to mean "bigger than life"; however, the term macro has been used throughout this specification as an equivalent term for close-up, and whenever it is used it should be taken to have such a meaning unless indicated to the contrary herein.

The total angle $\theta_1$ of the rotational displacement of cam ring opening and closing section 20a, lens retraction section 20b, and extreme wide angle fixing section 20c of zooming cam groove 20 is identical to angle $\theta_1$ of the extreme wide angle fixing section 21a of zooming cam groove 21. Angle $\theta_2$ of the variable magnification, i.e., variable power, section 20d of zooming cam groove 20 is identical to angle $\theta_2$ of the variable magnification, i.e., variable power, section 21b of zooming cam groove 21. Further, the total angle $\theta_3$ of the extreme telephoto fixing section 20e, the macro position fixing section 20g, and the macro transfer section 20f, is equal to the angle $\theta_3$ of the extreme telephoto fixing section 21c. In the illustrated embodiment, the zooming range is between approximately 35 mm and approximately 70 mm.

Figure 8:
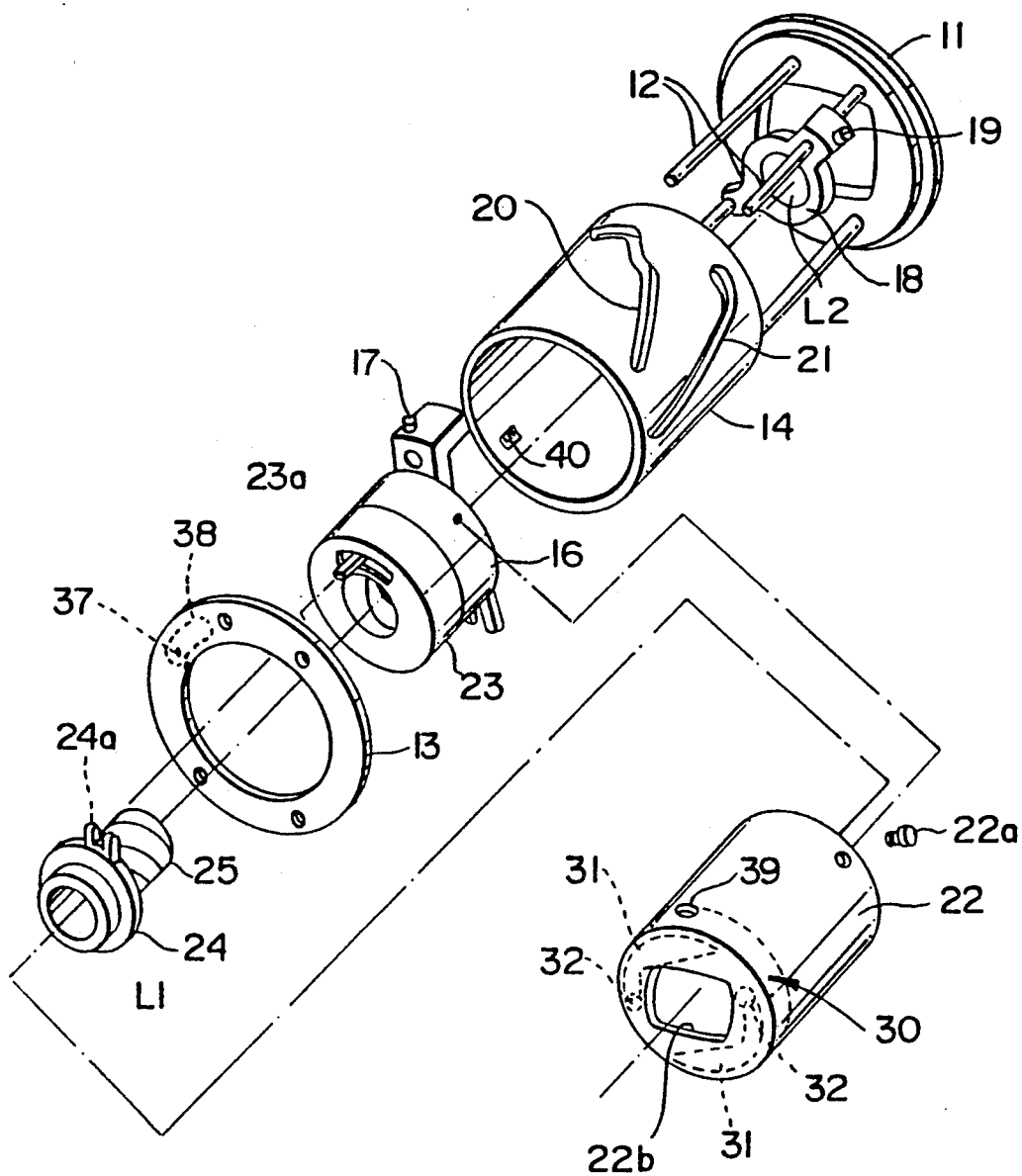
FIG. 8 is an exploded perspective view of a lens barrel block used in the camera of FIG. 1.

A roller 17, as illustrated in both FIGS. 6 and 8, is positioned within zooming cam groove 20; this roller is attached to a front lens group frame 16. A roller 19 of rear lens group frame 18 is positioned within zooming cam groove 21, again as illustrated in FIGS. 6 and 8. Front lens group frame 16 and rear lens group frame 18 are movably guided by guide rods 12, and a decorative frame 22 and shutter block 23 are secured to the front lens group frame 16 via set screws 22a, as best seen in the exploded view of FIG. 8, as well as in the cross-sectional view of FIG. 6.

The front lens frame 24 which supports front lens element group L1 is engaged by shutter block 23 via helicoid 25, which is shown in FIG. 8. Front lens frame 24 includes an arm 24a which engages lens feeding lever 23a of shutter block 23 (see FIG. 6), so that when lens feeding lever 23a rotates in a circumferential direction in order to rotate front lens frame 24, the front lens frame will move along the direction of the optical axis of the photographing optical system under the guidance of helicoid 25. Rear lens element group L2 is directly attached to rear lens group frame 18, as seen in FIG. 6. One desired configuration of lens groups L1 and L2, as illustrated in FIG. 6, are disclosed in commonly assigned U.S patent application Ser. No. 935,982, filed on Nov. 28, 1986, now U.S. Pat. No. 4,720,179 the disclosure of which is expressly incorporated by reference herein.

The structure of shutter block 23 is known per se. This shutter block rotates lens feeding lever 23a over a predetermined angular displacement in accordance with a detection signal which is received by the shutter block from the distance measuring device, as described hereinafter, via a pulse motor which is incorporated within the camera body and which is adapted to open shutter sector 23b, which has been closed for a predetermined time, and to thereafter return lens feeding lever 23a into its original position after the shutter has again closed. This type of shutter block is disclosed, e.g., in unexamined Japanese Published Patent Application (KOKAI) No. 60-235,126, dated Nov. 21, 1985, the disclosure of which is expressly incorporated by reference herein. The present camera utilizes such a shutter block in the fundamental way disclosed therein.

Finder block 2 includes finder assembly 8 and strobe assembly 9. The finder device and the strobe device are adapted to vary, respectively, the field of finder view and the illumination angle, i.e., the intensity of the strobe, in accordance with variance in the focal length of the lens barrel block 1. Zooming motor 5 is used as a power source both for finder control and strobe control; only a single motor need therefore be used.

As seen in FIG. 1, sector gear 15 of cam ring 14 is engaged by a second pinion 50 which is different from the first pinion 7 referred to previously. Shaft 51, to which pinion 50 is attached, extends rearwardly towards the rear portion of base 6, and is provided with a reduction gear train 52 adjacent a rear end of the shaft. The reduction gear train includes a final gear 52a which meshes with a rack 53a of movable cam plate 53. This substantially flat cam plate 53 is slidable in right and left hand lateral directions, as viewed in FIG. 1, and includes a downwardly bent portion 53b at its rear end, as best shown in FIG. 1 Rack 53a is formed on the lower end of bent portion 53b of cam plate 53. Reduction gear train 52 is adapted to reduce rotation of gear 15 in order to restrict or limit the lateral movement of cam plate 53. The cam plate is provided with a variable power cam groove 55 for guiding movement of finder device 8, a parallax correction cam groove 56, and a strobe cam groove 57 for guiding movement of strobe device 9.

The lens system used in finder optical assembly 8 essentially comprises a subject lens group L3, an eyepiece group L4, and a movable variable power lens group L5, and further comprises a deflection prism P1 which is used when the camera is placed into the macro or close-up mode.

Figure 28:
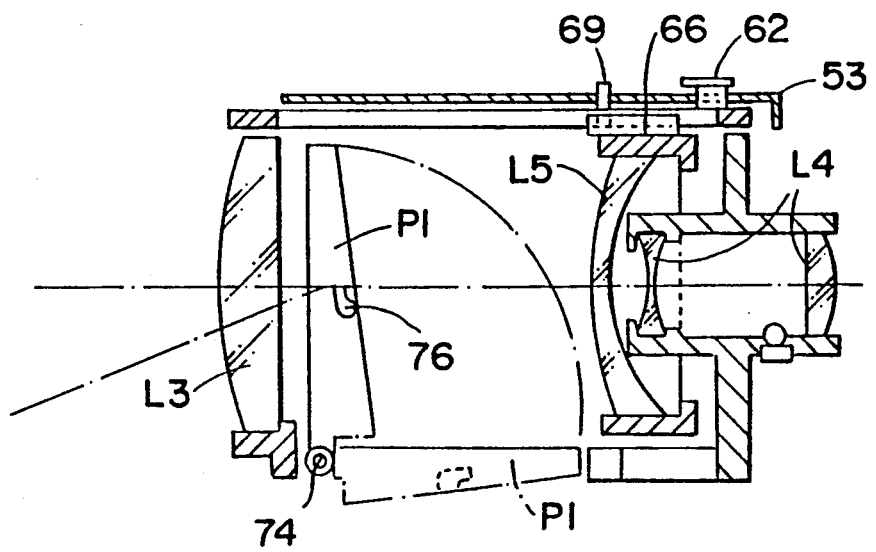
FIG. 28 is a sectional view similar to the view of FIG. 26, in which a deflecting prism actuating plate has been removed to facilitate consideration.
Figure 29:
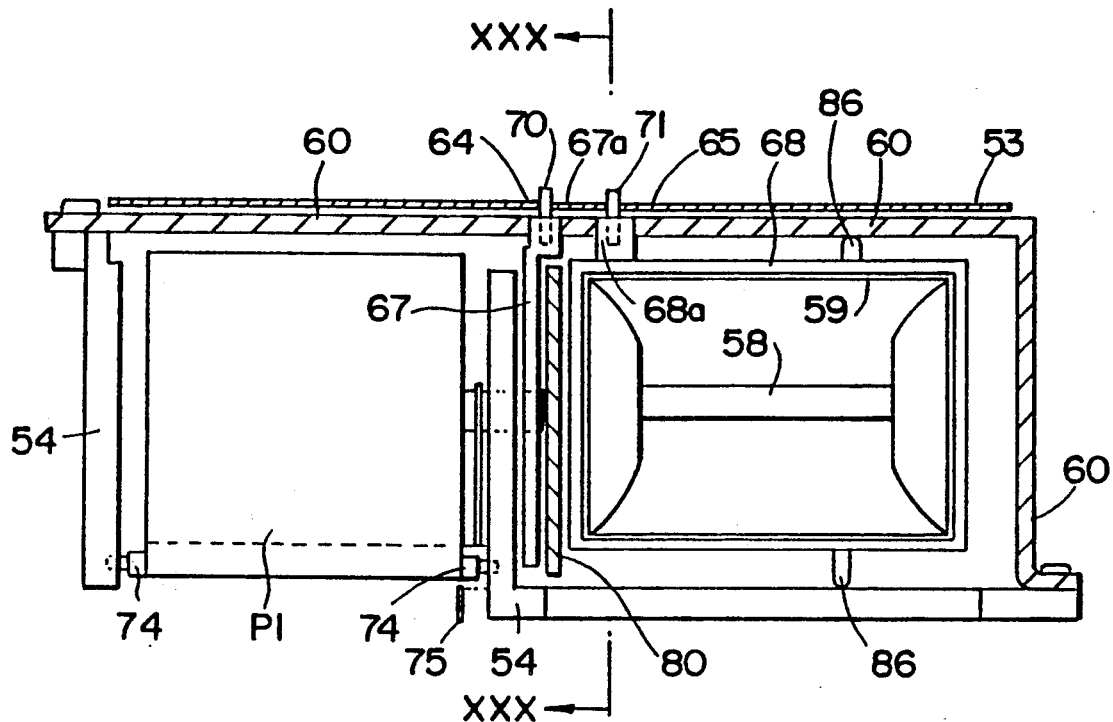
FIG. 29 is a front elevational view of the apparatus of FIG. 25, shown in a position in which a deflection prism actuating plate is inserted.

Variable power lens group L5 makes the image picture size, which is adapted to vary in accordance with the variable power operation of lens barrel block 1, be coincident with the field of view in finder device 8. Deflection prism P1 will enter the optical path of the finder lens system only in the macro mode, in order to adjust parallax which otherwise occurs in such mode. Specifically, parallax which inevitably occurs when using lens shutter type of cameras will increase as the subject whose picture is being taken approaches the camera; and, accordingly, a large parallax would normally result in the macro mode. In order to solve this problem and reduce the large parallax which otherwise occurs in the macro mode, deflection prism P1 is provided in the form of a wedge with a thicker lower end and a thinner upper end. Deflection prism P1, when located along the optical axis of the finder optical system, serves to deflect rays downwardly in order to take a picture of a subject which is located extremely close to the camera. FIG. 28 illustrates the optical path of light rays when the deflection prism P1 is located along the optical axis of the camera. As described hereinafter, the wedge prism which is used is preferably selected to be a double wedge prism, which varies in width in both the vertical and in the horizontal directions, as clearly illustrated in FIGS. 53A, B and C. The use of such a prism bends the light rays downwardly and rightwardly, to move them into substantial alignment with the photographic optical axis.

Strobe assembly 9 restricts or limits the illumination angle when the focal length of the photographing lens is large, namely, as the zoom lens is fed forwardly; and the strobe assembly 9 is moved to increase the illumination angle in the macro mode, in order to decrease the amount of light which reaches the subject. In the embodiment illustrated, strobe device 9 includes a fixed Fresnel Lens L6, a movable concave reflector 59, and a xenon lamp 58 which can be moved along the direction of the optical axis of the strobe. Alternately, a simple strobe could be used in which the illumination angle would be fixed. Although such a strobe arrangement is possible, it is preferable to move the lamp in the optical axis direction in accordance with movement of the zoom lens in order to optimize the quantity of light given to a subject during photography, dependent upon the position occupied by the photographing optical system in the zoom lens.

B. Distance Measuring Device, i.e., Range Finder, and Camera Macro Function

Before looking in a detailed fashion at the distance measuring device of the present invention and its relationship to the macro function of the camera, the relationship between the distance of a subject from the two lens group zoom lens and the displacement or forward feed of the zoom lens will be now be discussed.

Figure 12:
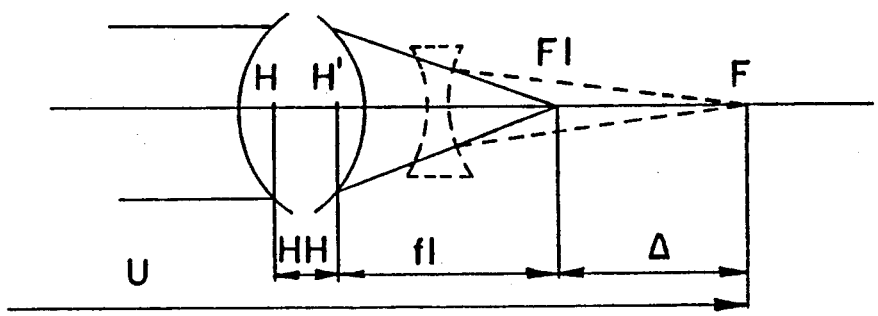
FIG. 12 is a sectional view of an optical arrangement used in a two lens group zooming lens in the camera of FIG. 1.

FIG. 12 illustrates a relatively simple construction for a two lens group Zoom lens. In such a construction, the distance of the subject and the displacement of the zoom lens have a relationship as follows:

$$U = f1\,(2 + X/f1 + f1/X) + HH + \Delta \qquad (1),$$

wherein:

U equals the distance of a subject from the film plane;
f1 equals the focal length of the first lens group;
X equals the displacement of the zoom lens;
HH equals the principal point distance; and
Δ equals the distance between the focal point of the first lens group and the focal point of the two lens group zoom lens.

From equation (1) it can be calculated that:

$$X = \{-2f1 - HH - \text{delta} + U - \sqrt{(2f1 + HH + \text{delta} - U)^2 - 4f1^2}\}/2 \qquad (2)$$

Figure 13:
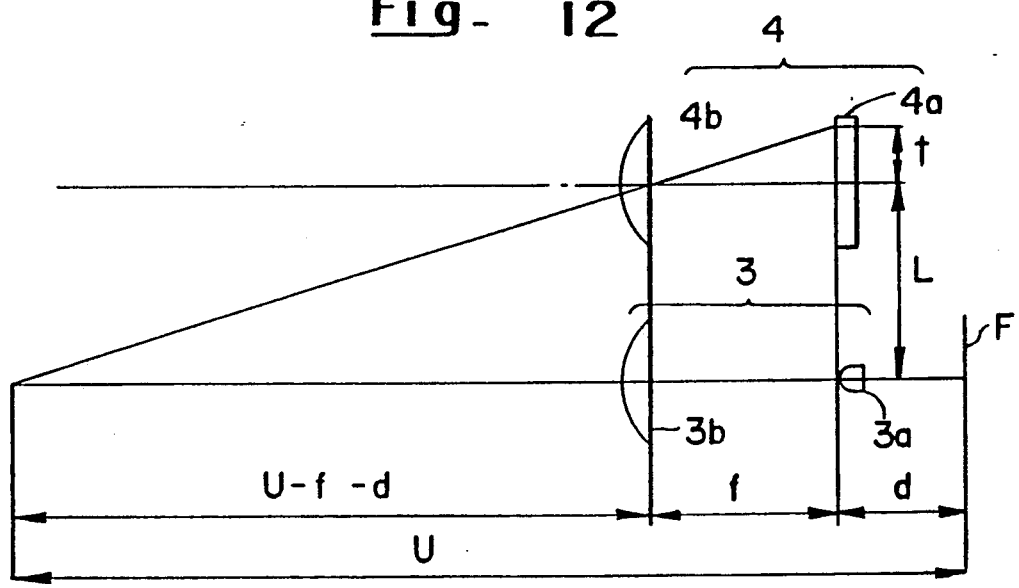
FIG. 13 is a schematic view illustrating the light emitter and light receptor of a distance measuring device used in the camera of FIG. 1.

FIG. 13 illustrates the relationship between the distance U of a subject and the positional deviation (t) on a position detection element 4a, which forms a portion of the distance measuring device which detects the distance of a subject from the film plane based upon the principle of triangulation.

The triangulation distance measuring device includes a light emitter 3 having a light source 3a and a light emitting lens 3b; and a light receiver 4 having a light receiving lens 4b and a position detection element 4a, e.g., a photo sensitive detector (hereinafter PSD). The rays of light emitted from light source 3a are reflected by the subject, and the light reflected therefrom is received by position detecting sensor 4a in order to detect the distance of the subject from the film plane F. Namely, the deviation (t) of the image on position detection sensor 4a, from a reference point represented by the position of an image of a subject at an infinite distance, relative to distance U of the subject from film plane f, is given by the following equation:

$$t = L \times f/(U - f - d) \qquad (3),$$

in which:

L represents the base length of the distance measuring device;

f represents the focal length of the light receiving lens; and d represents the distance between film plane F and the focal plane of the light receiving lens.

The deviation (t) can be detected by the electric current, i.e., output, of position detecting sensor 4a in accordance with the quantity of light received by position detecting sensor 4a, in a well known fashion. The photographing optical system of the camera is adjusted to form an image on a focal point of the image plane in accordance with the output signal, i.e., electric current, of position detecting sensor 4a, based upon equations (2) and (3), so that automatic focusing can be effected. The actuating or driving mechanism of the photographic optical system is noted above.

It is necessary to shift the range of measurement of the subject distance by the distance measuring device towards a close subject distance side in order to achieve the macro function of the camera. In the macro mode, the photographing optical system is either partially or entirely displaced, from a standard picture taking position, towards the subject to be taken, as is well known.

In the embodiment of FIG. 12, the first lens group of the photographing lens is moved forward, towards the subject over a predetermined displacement, in the macro mode, independently of (and beyond) the displacement effected by the automatic focusing device during normal photography.

Figure 14:
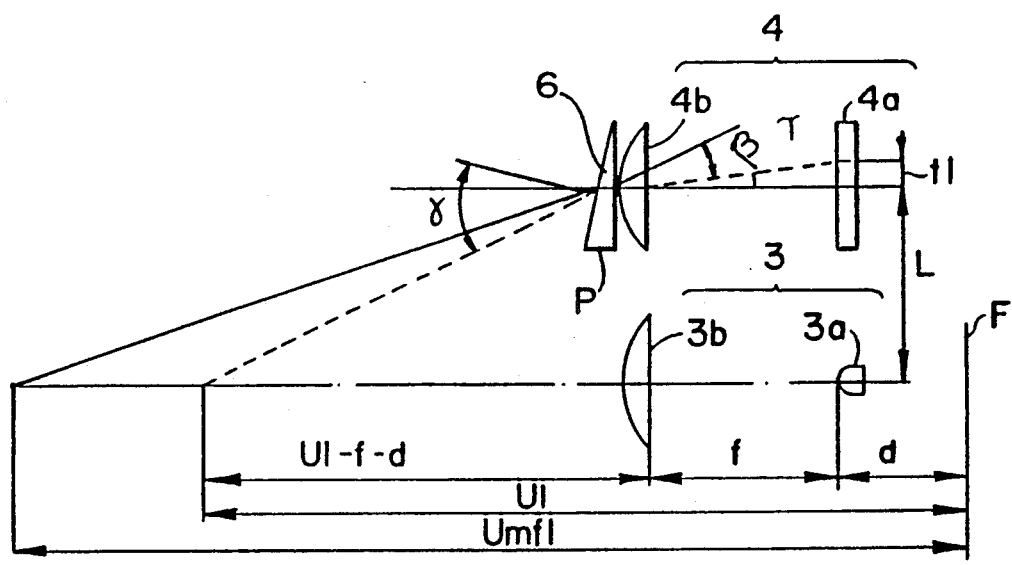
FIG. 14 is a sectional view of an optical arrangement of a system for adjusting the focal point of the object distance measuring system when the camera is in a macro mode.

FIG. 14 represents one mechanism for shifting the range of measurement of the subject distance in the macro mode in accordance with the present invention. In FIG. 14, a relatively conventional prism P having an apex angle of $\delta$ is inserted in front of light receiving lens 4b in order to shift the range of measurement of the subject distance towards the subject whose photograph is being taken. In other words, the zoom lens camera system uses a pivotable prism or wedge which is adapted to be positioned in front of light receiver 4.

Assuming, e.g., that the apex angle and the refractive index of prism P are $\delta$ and n, respectively, the deviation $t_1$ of the image on position detecting sensor 4a, with respect to the subject distance U1, can be obtained as follows: firstly, the incident angle alpha of the rays of light on the plane of prism P adjacent to the subject is determined by the following equation:

$$alpha = \tan^{-1}\{L/(U1 - f - d)\} + \delta$$

Refraction angle beta of the rays of light which are incident upon prism P having an apex angle $\delta$ at the incident angle alpha is determined by the following equation:

$$beta = alpha - \delta + \sin^{-1}[n \sin\{\delta - \sin(alpha/n)\}],$$

and, therefore $\gamma = -\delta - \beta$.

Accordingly, deviation t1 of the image on position detecting sensor 4a will be determined by $t_1 = f \times \tan\delta$.

Subject distance Umf1, which is obtained when light which is coincident with the optical axis of light receiving lens 4b intersects the optical axis of light emitting lens 3b is determined as follows, provided that the thickness of prism P is negligible:

$$Umf1 = L/\tan\{\sin^{-1}(n \sin\delta) - \delta + f + d.$$

In one example, the present Applicants calculated the values of U, U1, t, t1, and t−t1, in a camera in which the photographing optical system included a two lens group zoom lens, wherein: f1, i.e., the focal length of the first group, equals 24.68 mm; HH (i.e., the principal point distance) equals 7.02 mm; delta, i.e., the distance between the focal point of the first lens group and the focal point of the zoom lens, equals 30.04 mm;

d, i.e., the distance between the film plane and the focal plane of the light receiving lens, equals 6.292 mm; the displacement of the first group at the macro setting equals 0.5502 mm.; L, i.e., the base length of the distance measuring device, equals 30 mm; f, i.e., the focal length of the light receiving lens, equals 20 mm.; $\delta$, i.e., the apex angle of the prism P, equals 2.826°; n, i.e., the refractive index of prism P, equals 1.483; the distance range which can be measured equals 0.973 m ~ infinity; and the number of steps of forward feeding movement of the zoom lens is 18, so that the range of 0.973 m ~ 6 m is divided into 17 forward feeding motion steps of the zoom lens. The results of these calculations are illustrated in Table 1 hereinbelow. In these calculations, the distance range of 0.973 m ~ 6 m is shifted towards the range of 0.580m ~ 1.020 m.

In Table 1 hereinafter, step 17-18 represents a shifting point at which the 17th step changes to the 18th step; similarly, the step 0-1 represents a point of transfer between 0 and the first step.

TABLE 1

POSITIONS OF IMAGES ON THE POSITION DETECTING SENSOR AT DIFFERENT SUBJECT DISTANCES

| STEP NO. | U (m) | U1 (m) | t (mm) | t1 (mm) | t1 − t (mm) |
|---|---|---|---|---|---|
| 17-18 | 6.000 | 1.020 | 0.1004 | 0.1274 | 0.0270 |
| 17 | 5.154 | 0.996 | 0.1170 | 0.1423 | 0.0253 |
| 16 | 4.027 | 0.951 | 0.1500 | 0.1719 | 0.0219 |
| 15 | 3.310 | 0.911 | 0.1827 | 0.2013 | 0.0186 |
| 14 | 2.814 | 0.875 | 0.2153 | 0.2305 | 0.0153 |
| 13 | 2.450 | 0.841 | 0.2476 | 0.2595 | 0.0120 |
| 12 | 2.172 | 0.810 | 0.2797 | 0.2884 | 0.0087 |
| 11 | 1.952 | 0.782 | 0.3115 | 0.3170 | 0.0055 |
| 10 | 1.775 | 0.756 | 0.3432 | 0.3455 | 0.0023 |
| 9 | 1.628 | 0.732 | 0.3747 | 0.3738 | −0.0009 |
| 8 | 1.504 | 0.709 | 0.4059 | 0.4018 | −0.0041 |
| 7 | 1.399 | 0.688 | 0.4369 | 0.4298 | −0.0072 |
| 6 | 1.309 | 0.668 | 0.4678 | 0.4575 | −0.0103 |
| 5 | 1.230 | 0.650 | 0.4984 | 0.4850 | −0.0134 |
| 4 | 1.161 | 0.633 | 0.5288 | 0.5124 | −0.0165 |
| 3 | 1.100 | 0.616 | 0.5591 | 0.5396 | −0.0195 |
| 2 | 1.045 | 0.601 | 0.5891 | 0.5666 | −0.0225 |
| 1 | 0.996 | 0.587 | 0.6189 | 0.5934 | −0.0255 |
| 0-1 | 0.973 | 0.580 | 0.6338 | 0.6068 | −0.0270 |

$U_{mf1} = 1.283$ m

As can be seen from Table 1, an image deviation of 0.027 mm occurs at the position detecting sensor 4a at the two extremities of the range of measurement of the subject distance which can be measured, as a result of compensation by prism P. Such a deviation corresponds substantially to about 1 step, in the sense of the number of feeding steps of the zoom lens. Accordingly, it is not possible to move the photographic lens into a correct focal point by directly controlling displacement of the photographing optical system in response to the output of position detecting sensor 4a, thus resulting in an "out of focus" situation.

In other words, it is impossible to completely compensate for deviation in the images by using only prism P, since the rate of change of deviation t1 of the image on position detecting sensor 4a with respect to subject distance U1 cannot be varied by prism P. The prism begins to compensate for the image deviation, but cannot alone do so.

In view of such results, the present inventors have found that complete compensation of such deviation can be achieved if the rate of deviation t1 is adjusted by multiplying this rate by 1.1130 (calculated by dividing 0.5334 by 0.4794), which equals the change in t from step 0-1 to step 17-18 divided by the change in t1 between step 0-1 and step 17-18, since decreases in the deviations t and t1 between steps 17-18 and 0-1 are 0.5334 mm and 0.4794 mm, respectively. To this end, in the present invention, a macro mode compensating optical element is adapted to be selectively moved in front of the distance measuring optical system only when the camera is placed in the macro mode, in order to optically extend the base length between the light emitter and the light receiver of the distance measuring optical system, and in order to intersect the optical axis of the light emitter and the optical axis of the light receiver with a finite distance. Further, in this embodiment, an actuating mechanism is provided for moving the macro compensating optical element in front of the light receiver in coordination with transfer or movement of the photographing optical system, i.e., the zoom lens., from the normal photographic mode to the macro mode, as discussed in detail hereinafter.

Figure 9:
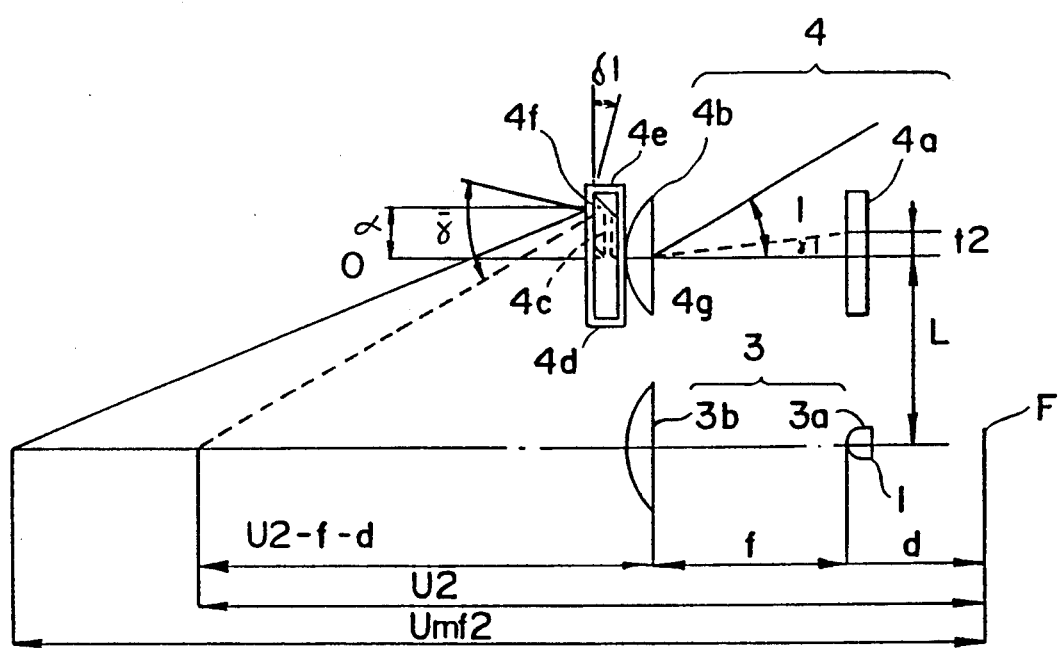
FIG. 9 is a sectional view illustrating an optical arrangement for adjusting the focus point of the camera when the camera is placed into its macro mode.

FIG. 9 illustrates an optical arrangement of the distance measuring device when in the macro mode, in the automatic focus camera of the present invention. In this figure, macro compensating element 4e comprises a prism 4c and a mask or frame 4d, rather than only the optical wedge of FIG. 14. Element 4e is moved in front of light receiving lens 4b of the distance measuring device when the camera is in the macro setting. In the normal photographic mode, element 4e is retracted away from the optical axis of light receiving lens 4b.

Prior to discussing the mechanical structure which is adapted to actuate the compensation element 4e, the actual construction of the macro compensating element 4e and the reasons why measurement accuracy can be improved or increased in the macro mode will be described in detail. The element includes a prism 4c which is adapted to optically extend the base length of the distance measuring device and to refract rays of light which enter the prism.

Figure 10:
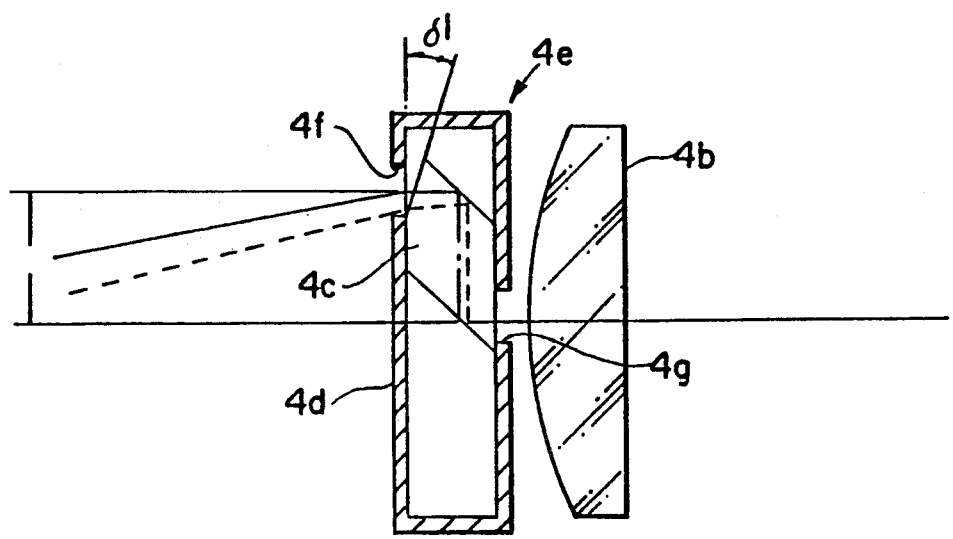
FIG. 10 is an enlarged plan view of the prism, frame (i.e., mask) and one light receptor lens of the system of FIG. 9.
Figure 11:
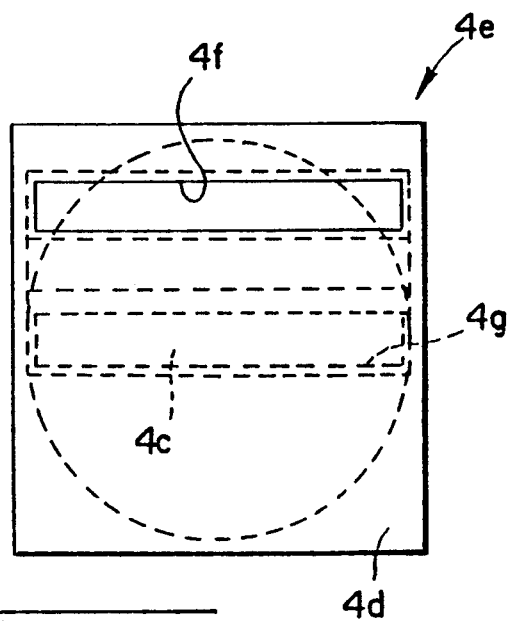
FIG. 11 is a front elevational view illustrating the assembly of FIG. 10.

FIG. 10 illustrates in detail prism 4c, mask 4d, and light receiving lens 4b. FIG. 11 is a front elevational view of FIG. 10; and both of these figures illustrate how mask or frame 4d is capable of intercepting rays of light out of the path of light approaching the prism. Mask 4d includes a front opening 4f which is shown in the form of a generally rectangular, elongated slot, on the (front) side of the frame located most closely adjacent to the subject being photographed, and a rear opening 4g (see FIG. 10) on the side of the frame or mask most closely adjacent to light receiving lens 4b. Opening 4f is in the form of a slit spaced from optical axis O of light receiving lens 4b by a distance (1) which is measured on the opposite side of the optical axis from light emitting lens 3b. Rear opening 4g is also in the form of a elongated slit, which is substantially located along the optical axis O of light receiving lens 4b.

When prism 4c, together with mask 4d, move in front of light receiving lens 4b, i.e., when the camera is in the macro mode, a first lens group of the photographing lens is fed forwardly by a constant displacement, independently of the displacement of the lens which is fed forwardly during the normal photographic mode by the automatic focusing device. As best seen in FIGS. 9 and 10, when prism 4c is located in front of light receiving lens 4b, the range of measurement of the distance of the subject can be shifted to the macro mode range. Prism 4c serves to move light incident thereon in a parallel fashion, over a displacement (1) in the direction of the base length, so that base length L can be optically extended to equal the distance (L+1).

Assuming that the angle and the refractive index of prism 4c are $\delta_1$, and n, respectively, and that the parallel displacement of light by prism 4c is represented by the distance (1), deviation t2 of the image on position detecting element 4a, as viewed with respect to the subject distance U2, can be obtained as hereinafter detailed.

The incident angle of light on the plane of prism 4c which is adjacent to the subject is provided by the following equation:

$$\text{alpha}_1 = \tan^{-1}\{(L+1)/(U2-f-d)\} + \delta_1.$$

This equation indicates that the base length of the triangulation distance measuring device is extended from L to (L+1) by the insertion of prism 4c in front of the light receiving lens 4b. The refraction angle beta$_1$ of light which is incident upon a prism having an angle $\delta_1$, which light is incident upon the prism at an incident angle of alpha$_1$, is calculated in accordance with the following equation:

$$\text{beta}_1 = \text{alpha}_1 - \delta_1 + \sin^{-1}[n\sin\{\delta_1 - \sin(\text{alpha}_1/n)\}],$$
$$\text{and, therefore:} \delta_1 = \text{alpha}_1 - \delta_1 - \text{beta}_1.$$

Accordingly, deviation t2 of the image on position detecting sensor 4a is equal to f x tan $\delta_1$, i.e., t2 = F x tan $\delta_1$.

The subject distance Umf2 which is obtained when light coincident with the optical axis of light receiving lens 4b intersects the optical axis of light emitting lens 3b is yielded by using the following equation, provided that the thickness of prism 4c is negligible:

$$Umf2 = (L+1)/\tan\{\sin^{-1}(n \times \sin \delta_1) - \delta_1\} + f + d.$$

Table 2 hereinafter illustrates the results of the calculations in which the distance measuring device of FIGS. 10 and 11 has been applied to a photographing lens satisfying the same basic criteria as those mentioned with respect to the embodiment of FIG. 14, i.e., namely that:
(a) The photographic lens is a 2-group lens;
(b) f1, i.e., the focal length of the first group, equals 24.68 mm;
(c) HH, i.e., the principal point distance, equals 7.02 mm;
(d) delta, i.e., the distance between the focal length of the first lens group and the focal length of the zoom lens, equals 30.04 mm;
(e) d, i.e., the distance between the film plane and the focal plane of the light receiving lens, equals 6.292 mm;
(f) the displacement of the first lens group in the macro setting equals 0.5502 mm;
(g) L, i.e., the base length of the distance measuring device, equals 30 mm;
(h) f, i.e., the focal length of the light receiving lens, equals 20 mm;
(i) $\delta_1$, i.e., the angle of prism 4c, equals 3.39°;
(j) n, i.e., the refraction index of the prism, equals 1.483;

(k) (l), i.e., the distance representing the parallel displacement of the rays of light, equals 3.39 mm;

(l) the range of measurement of the distance of the subject which can be measured equals 0.973 m~infinity;

(m) the number of steps of forward feeding movement of the zoom lens is 18;

(n) the range of 0.973 m~6 m is divided into 17 steps; and (o) the photographic range of 0.973 m~6 m is shifted into the range of 0.580 m~1.020 m.

TABLE 2

POSITIONS OF IMAGES ON THE POSITION DETECTING SENSOR AT DIFFERENT SUBJECT DISTANCES WITH THE MACRO COMPENSATION ELEMENT OF FIGURES 9, 10 AND 11

| STEP NO. | U (m) | $U_2$ (m) | t (mm) | $t_2$ (mm) | $t_2 - t$ (mm) |
|---|---|---|---|---|---|
| 17-18 | 6.000 | 1.020 | 0.1004 | 0.1005 | 0.0001 |
| 17 | 5.154 | 0.996 | 0.1170 | 0.1171 | 0.0001 |
| 16 | 4.027 | 0.951 | 0.1500 | 0.1500 | 0 |
| 15 | 3.310 | 0.911 | 0.1827 | 0.1827 | 0 |
| 14 | 2.814 | 0.875 | 0.2153 | 0.2152 | −0.0001 |
| 13 | 2.450 | 0.841 | 0.2476 | 0.2475 | −0.0001 |
| 12 | 2.172 | 0.810 | 0.2797 | 0.2796 | −0.0001 |
| 11 | 1.952 | 0.782 | 0.3115 | 0.3115 | 0 |
| 10 | 1.775 | 0.756 | 0.3432 | 0.3432 | 0 |
| 9 | 1.628 | 0.732 | 0.3747 | 0.3746 | −0.0001 |
| 8 | 1.504 | 0.709 | 0.4059 | 0.4059 | 0 |
| 7 | 1.399 | 0.688 | 0.4369 | 0.4369 | 0 |
| 6 | 1.309 | 0.668 | 0.4678 | 0.4677 | −0.0001 |
| 5 | 1.230 | 0.650 | 0.4984 | 0.4984 | 0 |
| 4 | 1.161 | 0.633 | 0.5288 | 0.5288 | 0 |
| 3 | 1.100 | 0.616 | 0.5591 | 0.5591 | 0 |
| 2 | 1.045 | 0.601 | 0.5891 | 0.5891 | 0 |
| 1 | 0.996 | 0.587 | 0.6189 | 0.6190 | 0.0001 |
| 0-1 | 0.973 | 0.580 | 0.6338 | 0.6338 | 0 |

$U_{m/2} = 1.283$ m

It should be clearly understood from Table 2 that the deviation of the images on the position detecting sensor 4a at different steps between the normal photographic mode and the macro mode will therefore be within +/−0.0001 mm. This is represented by the value $t_2 - t$ in the last column of Table 2. Accordingly, it is possible to almost completely form images at the focal point by adjusting the photographic optical system in accordance with the output of the position detecting sensor 4a. Table 2 illustrates the prism 4c can optically extend the base length, which is normally 30 mm in a normal photography camera mode, in the macro mode so that it will be 1.113 times the normal base length, i.e., the base length will be 33.39 mm when the camera is in its macro mode; as a result, displacement of position detecting sensor 4a can be increased by a factor of 1.113.

In operation, it is possible to automatically focus the camera within any zooming range, including the macro setting of the camera, by actuating previously discussed shutter unit 23 in accordance with the output signals, i.e., the measurement data, which are sent by position detecting sensor 4a. Specifically, when driving pulses are applied to the pulse motor of shutter unit 23 in accordance with the measurement data which has been received from detecting sensor 4a, a lens actuating or feeding lever 23a, as seen in FIG. 8, rotates over an angle corresponding to the driving pulses which it has received in order to rotate front lens frame 24 together with it. As a result of this rotation of front lens frame 24, the front lens element group L1 is moved along the direction of the photographing optical axis, via the action of helicoid 25, in order that focusing of the photographic lens assembly will be automatically effected.

Lens barrel block 1 rotates cam ring 14 when zooming motor 5 is driven. Rotation of cam ring 14 causes roller 17 of front frame 16 to engage the extreme macro position fixing section 20g of cam groove 20, i.e., roller moves into section 20g from macro transfer section 20f of cam ring 14, so that front lens element group L1 will be fed further forwardly to move into position for macro mode operation of the camera.

As clearly seen in FIGS. 1 and 2, macro compensating element 4e is secured to a free end of a flexible compensation or correcting flag 42, which is pivoted at its base end to camera base plate 6 via a shaft 41 located below light receiver 4. Flag 42 is normally retained in a substantially straight position when no external force is applied to the flag, and is elastically deformed whenever an external force is applied to the flag. Also attached to shaft 41, and having a pointed surface directed away from the flag, is a projection 43, which can either be formed integrally with the flag and attached to shaft 41, or which can be formed separately from the flat and attached to shaft 41 at a central bore of the projection. The macro compensating element 4e is continuously and rotatably biased into a retracted position in which it is retracted away from the optical axis of light receiver 4 by a tension spring 46, as illustrated in FIG. 2. As seen in FIG. 2 and (better) in FIG. 1, cam ring 14 includes a projection 44 on sector gear 15 (or on the cam ring) which engages flag projection 43 in order to move macro compensating optical element 4e into the optical axis of the distance measuring device and in front of light receiver 4 whenever the cam ring 14 rotates to the macro setting position. As shown in FIG. 1, a substantially semi-cylindrical recess (or other recess configuration) 44a is provided on the gear 15 adjacent to the camming surface or projection 44. This recess is provided to facilitate the pivoting or rotating motion of flag projection 43 as the cam ring rotates. In other words, recess 44a is necessary to facilitate turning movement of the projection and hence pivoting or rotating motion of optical element 4e into the position illustrated in dotted lines in FIG. 2, in front of light receiver 4. Alternately, ring 14 or gear 15 can be formed with a smaller diameter in order to provide sufficient pivoting room for projection 43. Camming projection 44, which effects, via its engagement with projection 43, rotational or advancing motion of macro compensating optical element 4e, is positioned and configured so that the optical element will be rotated slightly past the position in which the element would be aligned with the optical axis of light receiver 4. However, the flat end of the element 4e which most closely approaches support plate 6e which is integrally attached to base 6, is adapted to engage the left hand side surface of plate 6e (as seen in FIG. 2) via a shock absorbing nub or button 4g, shown in both FIGS. 1 and 2. Accordingly, over rotational motion of element 4e which is effected by projection 44 will be absorbed both by the flexible flag 42, which is formed from a resilient plastic, rubber, or other resilient material and/or the provision of nub 4g, which will serve to engage the side edge of plate 6e.

Thus, when cam ring 14 moves into the macro setting position, the macro compensating optical element 4e can automatically be brought into alignment with the optical axis of the light receiver, into a position in front of the light receiver, in order to optically extend the base length between the light emitter 3 and the light receiver 4.

C. Finder Optical System

The finder optical system is best illustrated in FIGS. 1 and 15-20.

The finder optical system is designed not only to vary magnification between a wide field of view with a small magnification, and a narrow field of view with a large magnification, in accordance with the zooming operation of the photographing lens system, but also to provide a field of view having less parallax when the camera is used in its macro mode.

One significant feature of the present invention is that the finder optical system is capable of automatically moving in association with both zooming of the photographic lens and movement of the photographic lens into a macro setting in order to satisfy all of the requirements of a finder system as set forth immediately above. While conventional finders appear to provide a plurality of bright frames with different sizes in the field of view of the finder, this is not a satisfactory solution to the problems noted above, e.g., the use of such frames alone will not minimize parallax in a macro operational mode such as that used in the present camera.

Under such circumstances, and in accordance with the present invention, a finder optical device is provided in a lens shutter type of camera having a zoom lens which essentially comprises an improved inverted Galilean finder. In other words, the finder optical system of the present invention includes a first lens group having a negative refracting power which comprises a positive lens in the form of a fixed lens L3 and a movable negative lens in the form of a variable power lens L5, a second lens group having a negative lens L4-1 which is one lens in a fixed eyepiece group L4, and a third lens group having a positive refracting power lens L4-2 which defines a second lens in the fixed eyepiece lens group L4. A prism P1 is adapted to be selectively moved between the positive lens L3 and the negative lens L5 of the first lens group in order to refract rays of light towards the optical axis. The negative lens L5 of the first group can be displaced from a position adjacent to the subject towards a position which is adjacent to a photographer's eye in order to vary the magnification from a wide field of view having a small magnification to a narrow field of view having a large magnification. Prism $P_1$, selectively brought into alignment with the optical axis of the finder optical system, serves to decrease the parallax when the photographic optical system is in the macro setting and when the negative lens L5 of the first group moves closest to the eye of the photographer along the optical axis.

Figure 52:
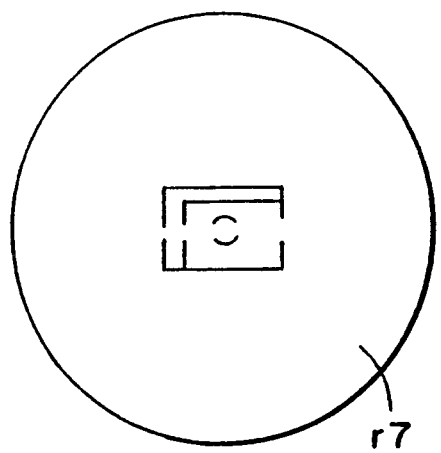
FIG. 52 is a front plan view of a finder optical system lens having a plurality of bright frames thereon.

The bright frames which are illustrated in dashed lines in FIG. 52 define the photographing ranges and are applied to the face of the lens of the third group which is closest to the subject, i.e., on the left hand face A of stationary eyepiece lens L4-2 in FIGS. 15A, 16A, 17A, 18A, 19A and 20A, respectively. These yellow frames, which are placed on lens surface A comprise a central autofocus spot (to be positioned on the main portion of a photographic subject), a large picture area frame (for ordinary photography using the zoom lens), and a smaller parallax correction frame (used since the picture area will slightly narrow in the macro mode). Further, face B of the second lens group L4-1 which is most closely adjacent to the eye of a photographer, is formed from a semi-transparent material, so that a virtual image of the bright frames which are formed by the semi-transparent face can be enlarged and viewed through the positive lens of the third lens group L4-2.

The yellow bright frames are positioned on the front surface of the fixed eye piece lens L4-2 by, e.g., sputtering; and the rear surface of the eyepiece lens element L4-1, i.e., surface B or r6, can be in the form of a semi-transmissive, semi-reflective concave mirror. Light rays emitted from (i.e., reflected by) the bright frames are reflected rearwardly by concave surface R6 and are focused on the viewers eye. The eye recognizes enlarged false images of the frames in a position in the far foreground, which images are formed via the optical effect of lenses L4-1 and L4-2.

The negative lens L5 of the first group is movable, as noted above, so that it will move from a position which it is located adjacent to the subject into a position in which it is more closely adjacent to the eye of a photographer, in order to increase the focal length of the photographic optical system during the normal zooming operation, so that magnification can be varied from a wide field of view having a small magnification to a narrow field of view having a large magnification. When a picture is taken in the macro (beyond telephoto) mode with a narrow field of view and large magnification, a prism is inserted between the movable lens L5 and stationary lens L3 in order to decrease parallax, so that light will be refracted towards the location of the axis of the photographic optical system.

Enough room is provided for the prism to pivot upwardly for macro focusing, i.e., thereby creating a need to move the lens L5 a relatively large distance, as shown in FIGS. 16A, 17A, 19A and 20A, in order to insert the prism P1 therein in a pivotable or rotatable fashion.

On advantage of the system is that it incorporates only a single moving lens L5, rather than zooming a plurality of lenses or the entire finder optical lens system and having to thereafter compensate for such zooming movement of all of the lenses. This serves to simplify the zooming cam plate structure, as movement of only a single lens will suffice to change the magnification of finder image.

The fixed viewing frames, as shown in FIG. 52, are provided in order to avoid having to make a viewing adjustment. The two rear eyepiece lens groups L4-1 and L4-2 which include the frames are fixed, and the curvatures of their respective surfaces are controlled so that the reflected frames will have a desired magnification which is compatible with the image magnification over the entire range of zooming operation of the photographic lens.

The apex angle or angles of the selectively insertable prism are defined by the resultant angles in the horizontal and vertical directions, in accordance with the positions of the optical finder system and the photographic optical system. The prism can be a single wedge prism, or can be a double wedge shaped prism, as illustrated in FIGS. 53A, 53B, and 53C, which illustrate a double wedge prism P1' which is advantageous because it is capable of bending light downwardly and rightwardly towards the optical axis of the photographic optical system.

Figure 53A:
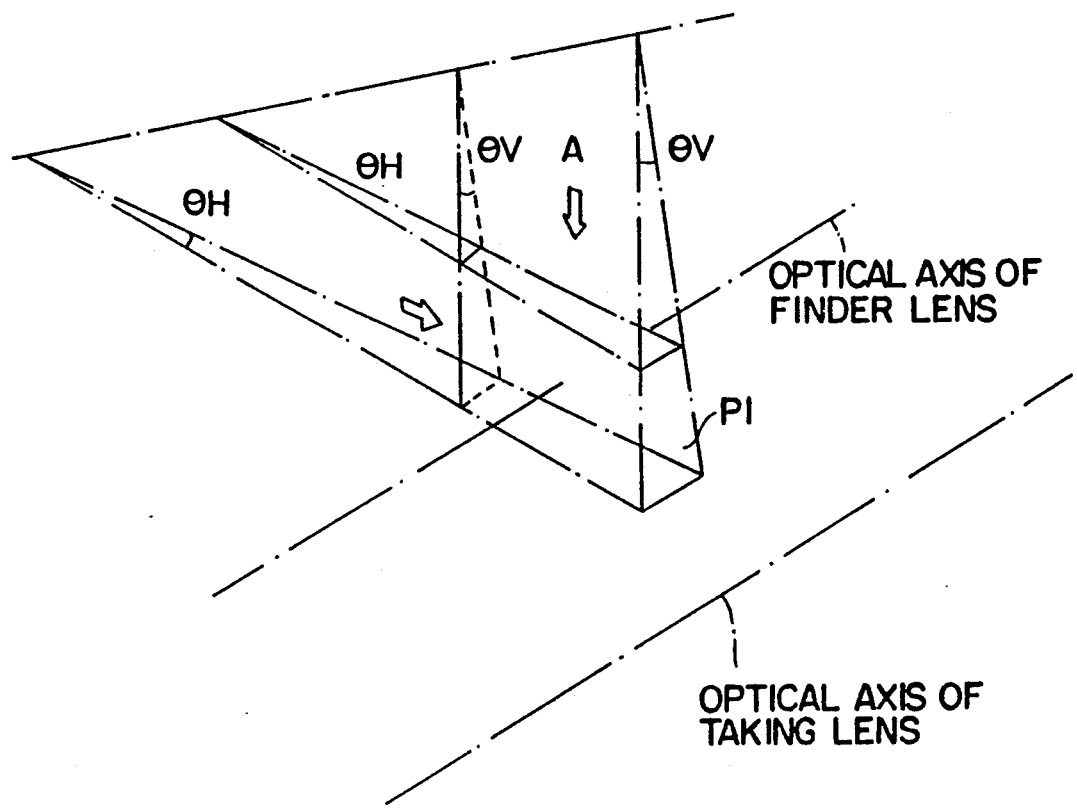
FIG. 53A is a perspective view of a double-wedge shaped prism used in the present finder optical system.
Figure 53B:
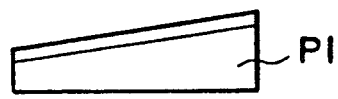
FIG. 53B is a top plan view of the prism of FIG. 53A.
Figure 53C:
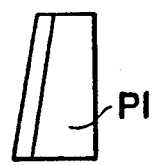
FIG. 53C is a right hand side plan view of the prism of FIG. 53A.

As illustrated in FIGS. 53, double wedge prism P1 has a surface which increases, when viewed from the top in the direction of arrow A (see FIGS. 53A and 53B) and which also increases from the left hand to the right hand direction, as viewed from the front of the camera from the photographing optical axis, and as shown by arrow B (FIGS. 53A and 53C). In the example illustrated, the angle $\theta H$ can be 2.8°, the angle $\theta V$ can be 4.2°, the angle θH' could be 4.2°, and the angle θV' could be 5.0°.

The wedge prism is adapted to be inserted between the first convex single lens element L3 and the movable concave single lens element L5 in a rotatable fashion. This permits the finder unit to be made compactly and allows the prism to be inserted between these two elements. The viewing distance of the false image of an object and the bright frames remain stationary throughout the zooming range of the photographic lens, and parallax compensation is provided by moving the prism between the lenses in the macro or close up picture taking mode. The viewing magnification or size of the bright frame images is also maintained constant throughout the zooming range of the photographic lens, as well as in the macro setting, due to the placement of the bright frames on the stationary lens element L4-2. The distance between the eye of a viewer and the image distance, i.e., the diopter of the finder, virtually does not vary, because the zooming concave lens element moves over an image magnification of 1x, or, i.e., is life size.

Parallax compensation in the macro or close up picture taking mode is effected by positioning the wedge prism between the lens elements, as well as by the use of the compensation framing marks illustrated in FIG. 52 (which is the normal means of parallax compensation in a close focusing mode in viewfinder type cameras). The edges of the wedge prism are tinted green to highlight the frame that illustrates the photographic area in the macro or close-up mode.

Theoretically, the prism could be located in front of the first lens group; however, by so arranging the prism, it would increase the overall size of the finder optical system. The prism cannot, however, be located between the second and third lens groups, because if it were inserted between these groups, the positions of the bright frame and of the virtual image of the subject could vary in accordance with movement of the prism. However, when the prism is retractably inserted between the positive lens and the negative lens of the first lens group, as is the case in the present invention, the prism is free from such problems, and virtually no change in dioptric power to the virtual image of the subject will occur.

Several examples of a finder optical system formed in accordance with the present invention will now be discussed:

EXAMPLE 1

Figure 15A:
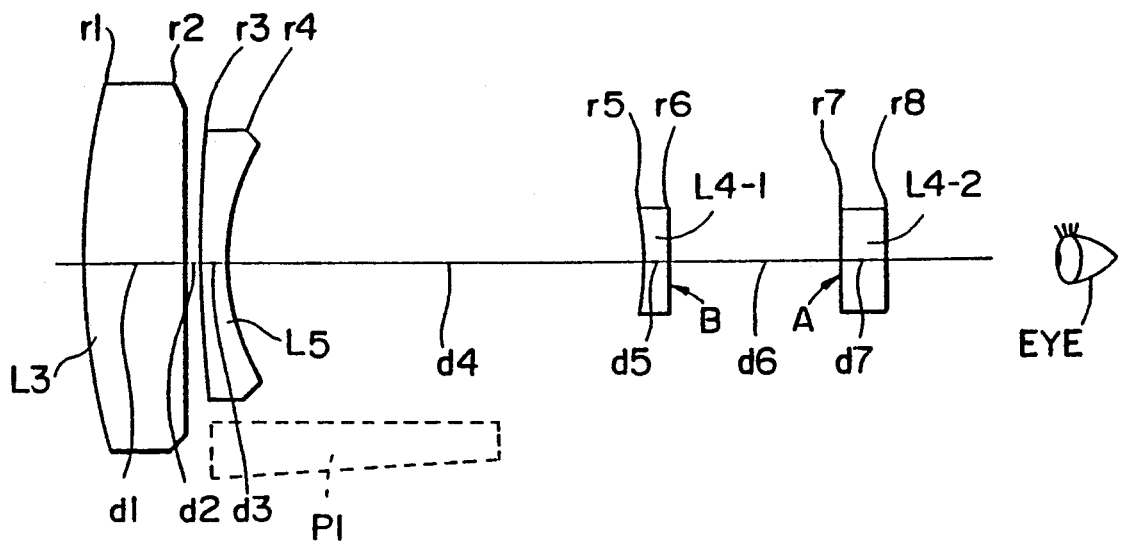
Figures 15B, 15C, 15D:
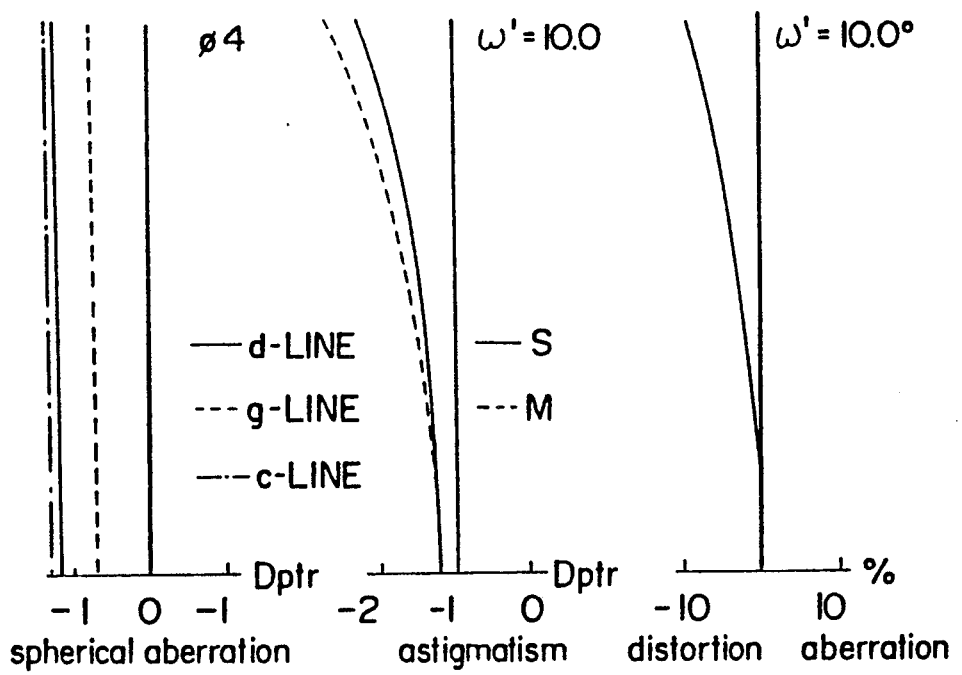
FIGS. 15B–D, 16B–D, and 17B–C, respectively, illustrate the aberrations of the optical systems of FIGS. 15A, 16A and 17A, respectively.
Figure 16A:
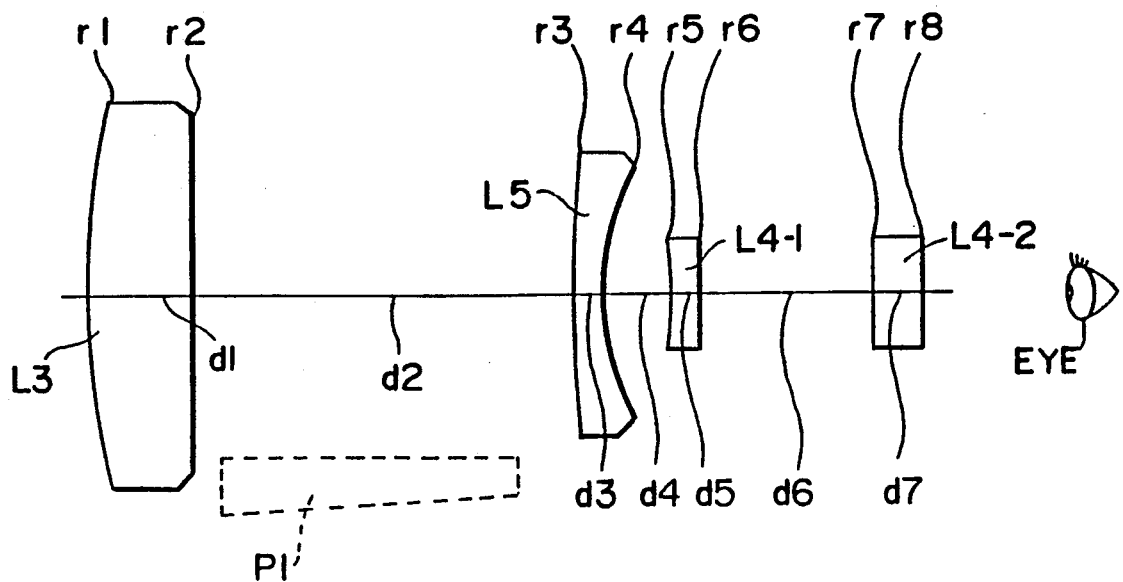
FIG. 16A is a plan view of the assembly of FIG. 15A when the camera is in a narrow field, large magnification mode.
Figures 16B, 16C, 16D:
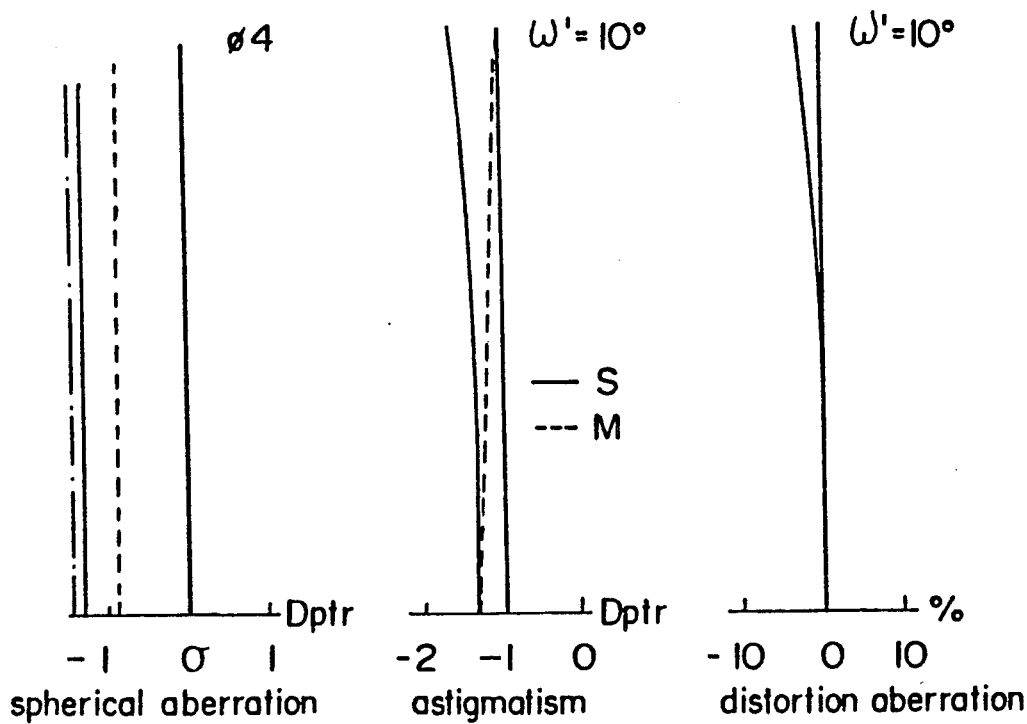
Figure 17A:
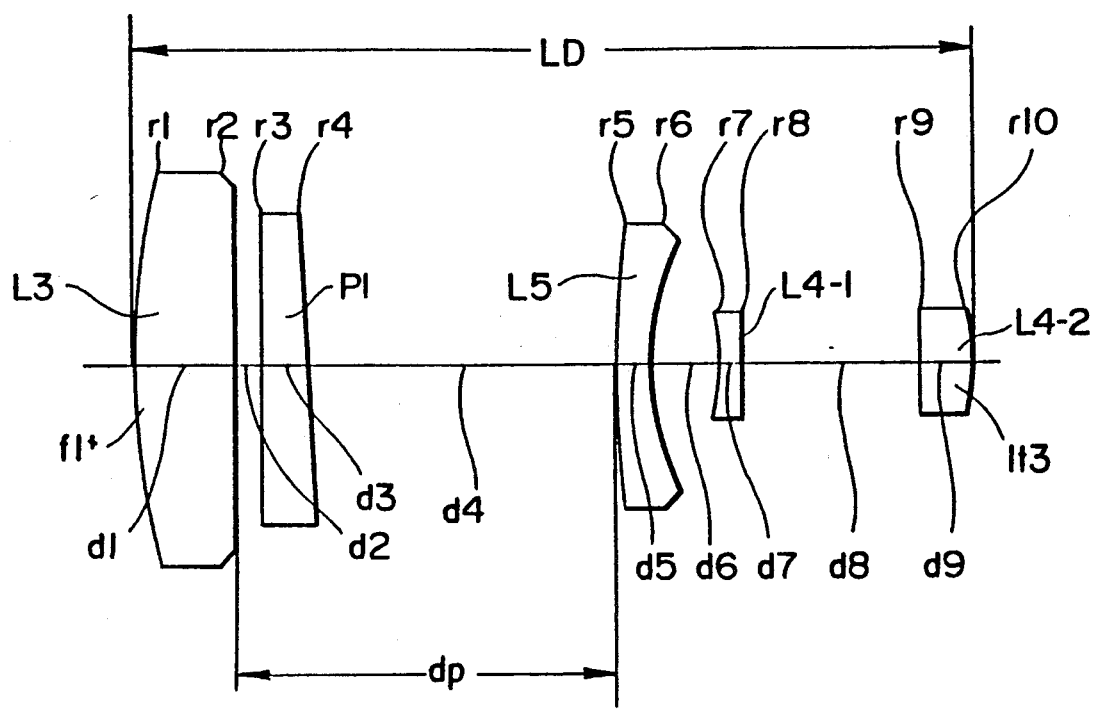
Figures 17B, 17C:
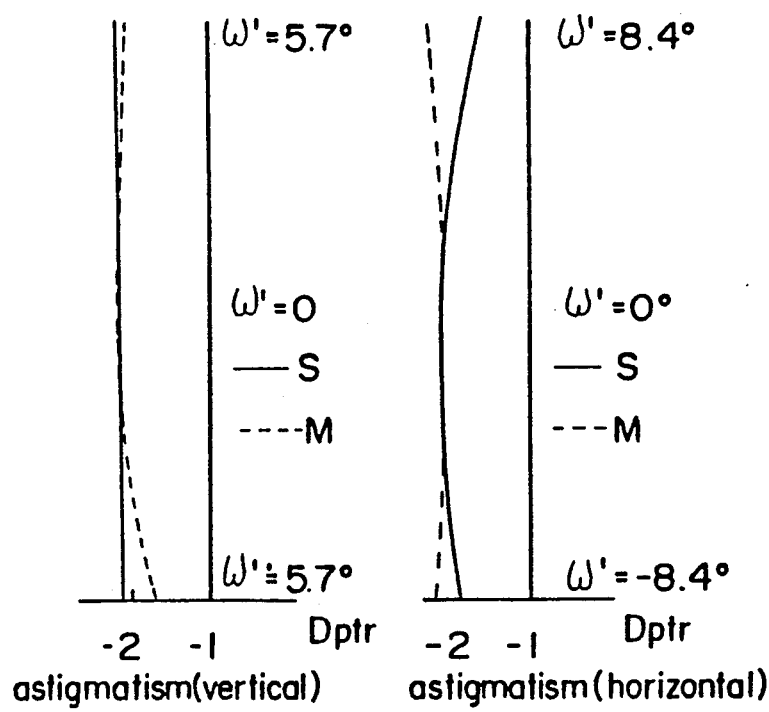

FIGS. 15A, 15B-D, 16A, 16B-D and 17A, 17B, C illustrate different positions of a first embodiment of a finder device formed in accordance with the present invention. FIG. 15A illustrates the finder optical system when it is providing a wide field of view with a small magnification; FIG. 16A illustrates this finder system when it is providing a narrow field of view with a large magnification; and FIG. 17A illustrates the finder system whenever it is providing a narrow field of view with large magnification and when it is in the macro mode, respectively. FIGS. 15B-D, 16B-D and 17B, C respectively, are views illustrating the aberrations of the finder lens system in the positions of FIGS. 15A, 16A and 17A, respectively.

This finder optical system includes a positive single lens L3 and a negative single lens 15 which form the first lens group; a negative single eyepiece lens L4-1 which forms the second lens group; and a positive single eyepiece lens L4-2 forming the third lens group; together with a selectively positionable prism P1. Among all of these optical elements, only the negative single lens L5 is movable along the direction of the optical axis, and prism P1 is selectively movable into alignment with this optical axis; all of the other lenses remain stationary.

Tables 3 and 4 which follow illustrate the curvatures r, the distances d, the refractive indexes Nd and Abbe's numbers $\nu d$ of the opposite side faces of optical elements L3, L5, L4-1, L4-2, and P1 (Table 4 only), respectively. As shown in the following tables 3 and 4, each of features r, d, Nd and $\nu d$ are designated by any one of numbers 1-8 and 1-10, respectively, as viewed from the side of the positive single lens L3 which is closest to the subject, i.e., from the left hand portion of the figures towards the eye or right hand portion of the figures.

Table 3 represents the position of the lens when it is in its wide field of view, small magnification position (0.38 x) and when it is in its narrow field of view, large magnification position (0.70x), and Table 4 illustrates the position of the lens when it is in the macro mode. The apex angles of prism P1 used in this mode, when it is in a double wedge prism are, e.g., 2.8° in horizontal section and 4.2° in vertical section.

The bright frame which defines the picture taking range is applied to surface A of the positive single lens L4-2 of the third lens group which is most closely adjacent to the subject being photographed, and the surface B of the negative single lens L4-1 of the second lens group which is most closely adjacent to the photographers eye is semi-transparent. As a result, a virtual image of the bright frame applied to face A of the positive single lens L4-2 is formed and reflected by face B, and is thereafter enlarged and viewed through the positive single lens L4-2, again as discussed previously.

TABLE 3

| No. | r | d | Nd | $\sqrt{d}$ |
|---|---|---|---|---|
| 1 | 30.800 | 4.50 | 1.49186 | 57.4 |
| 2 | −2221.231 | 0.50 (0.38x) ~ 15.80 (0.70x) | | |
| 3 | 55.555 | 1.21 | 1.49186 | 57.4 |
| 4 | 9.680 | 18.50 (0.38x) ~ 3.00 (0.70x) | | |
| 5 | −8.327 | 1.00 | 1.60311 | 60.7 |
| 6 | 50.845 | 7.33 | | |
| 7 | ∞ | 2.23 | 1.60311 | 60.7 |
| 8 | −11.780 | | | |

TABLE 4

| No. | r | d | Nd | $\sqrt{d}$ |
|---|---|---|---|---|
| 1 | 30.800 | 4.50 | 1.49186 | 57.4 |
| 2 | −2221.231 | 1.70 | | |
| 3 | ∞ | 2.70 | 1.49186 | 57.4 |
| 4 | ∞ | 11.40 | | |
| 5 | 55.555 | 1.21 | 1.49186 | 57.4 |
| 6 | 9.680 | 3.00 | | |
| 7 | −8.327 | 1.00 | 1.60311 | 60.7 |
| 8 | 50.845 | 7.33 | | |
| 9 | ∞ | 2.23 | 1.60311 | 60.7 |
| 10 | −11.780 | | | |

EXAMPLE 2

Figure 18A:
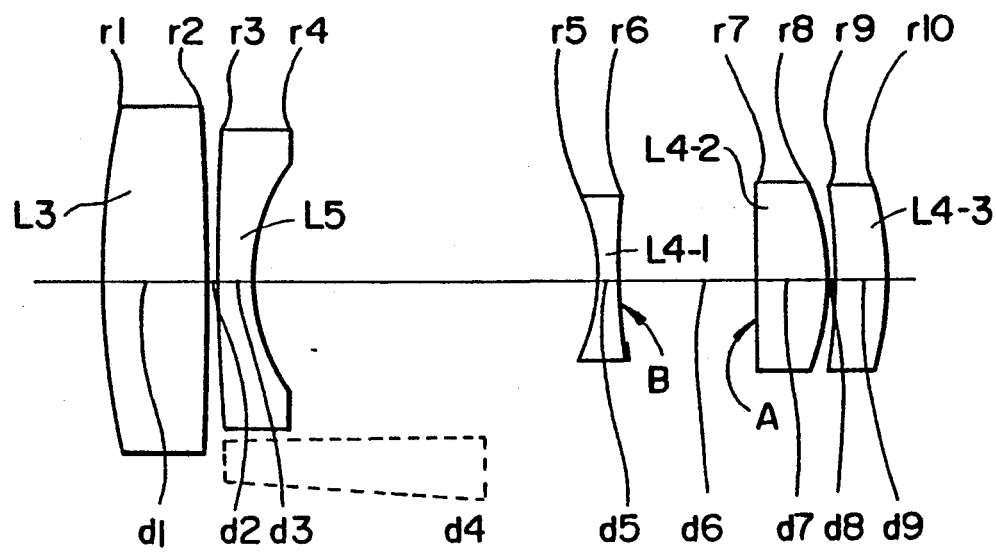
Figures 18B, 18C, 18D:
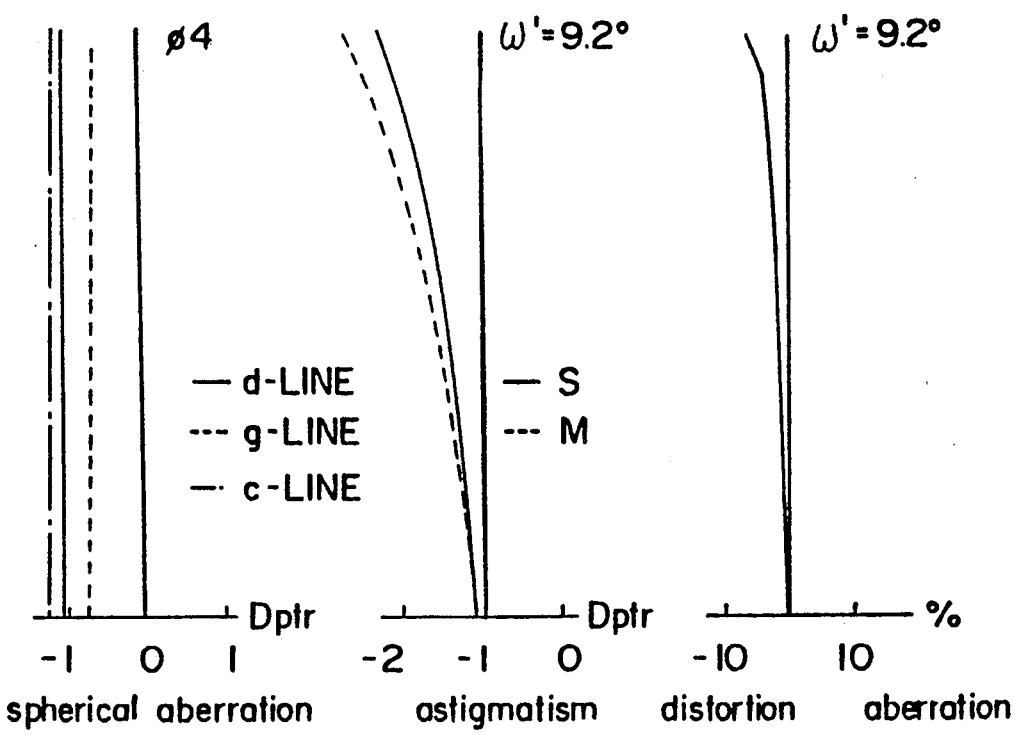
Figure 19A:
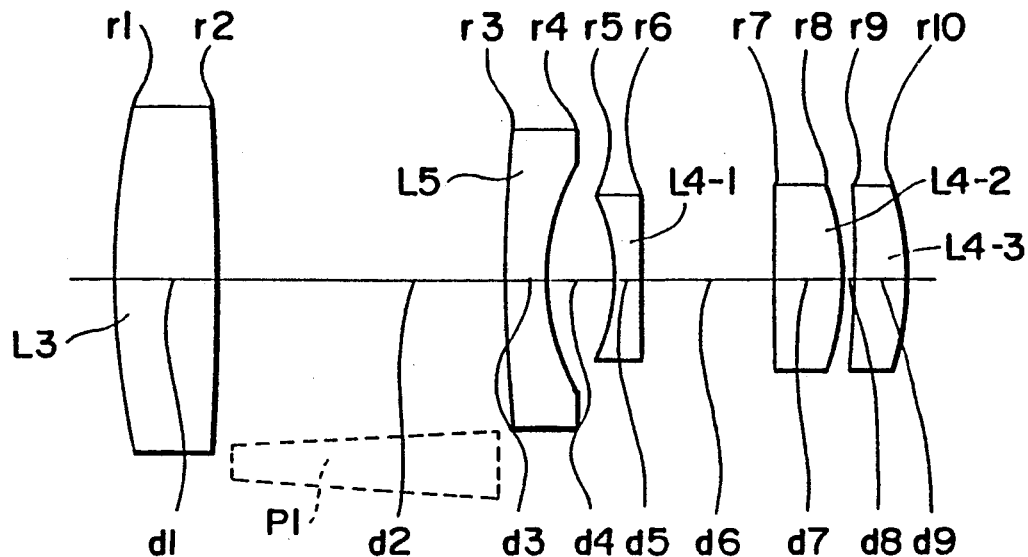
Figures 19B, 19C, 19D:
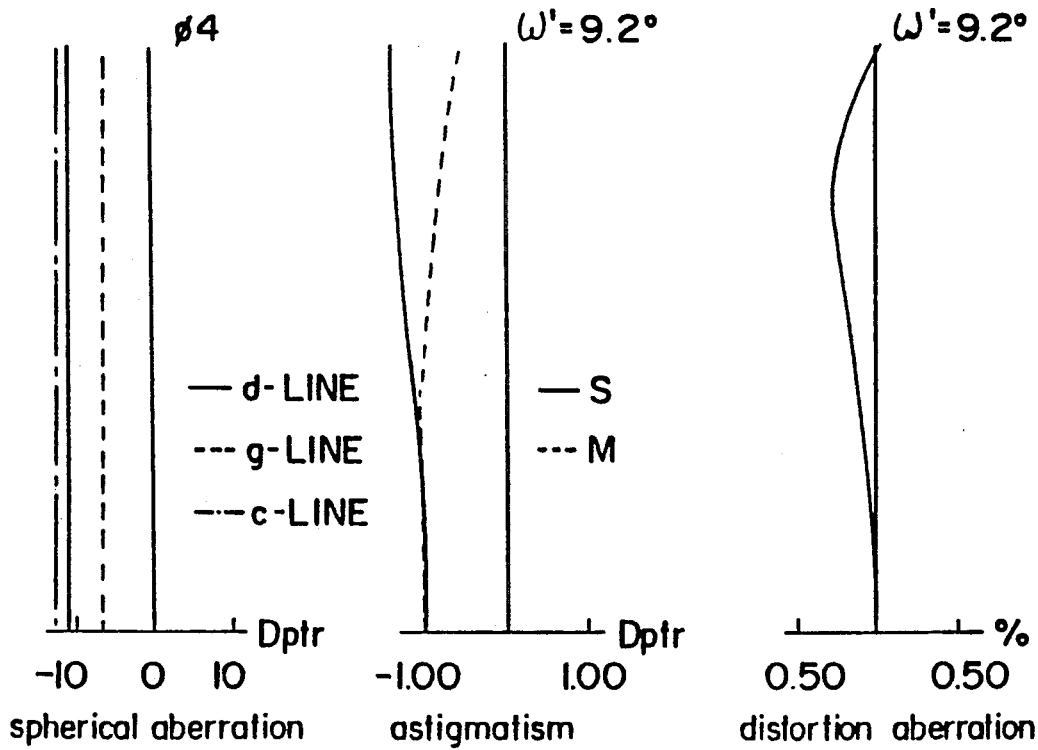
Figure 21:
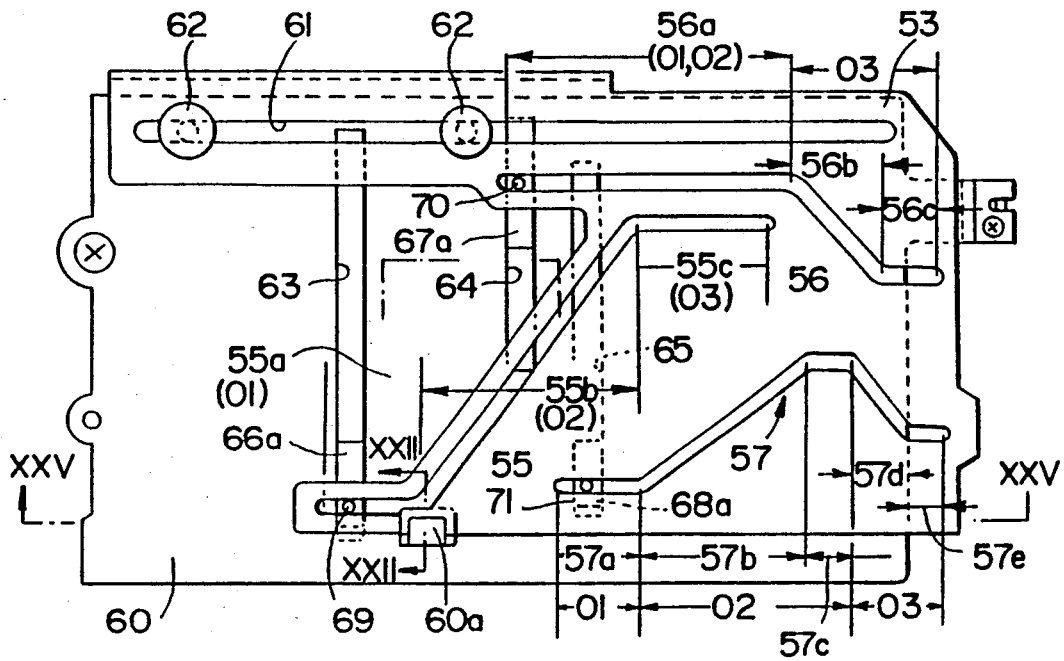
FIG. 21 is a plan view of a cam plate which can be attached to a portion of the finder block and the strobe lamp assembly of the present invention.
Figure 22:
FIG. 22 is a sectional view taken along line XXII—XXII of FIG. 21.
Figure 23:
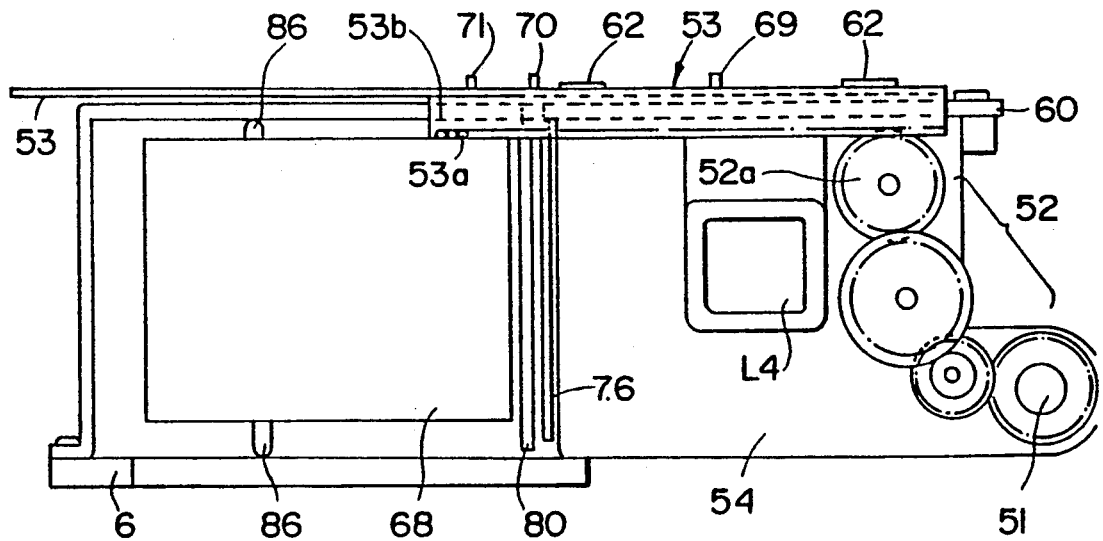
FIG. 23 is a back plan view of the cam plate of FIG. 21.
Figure 24:
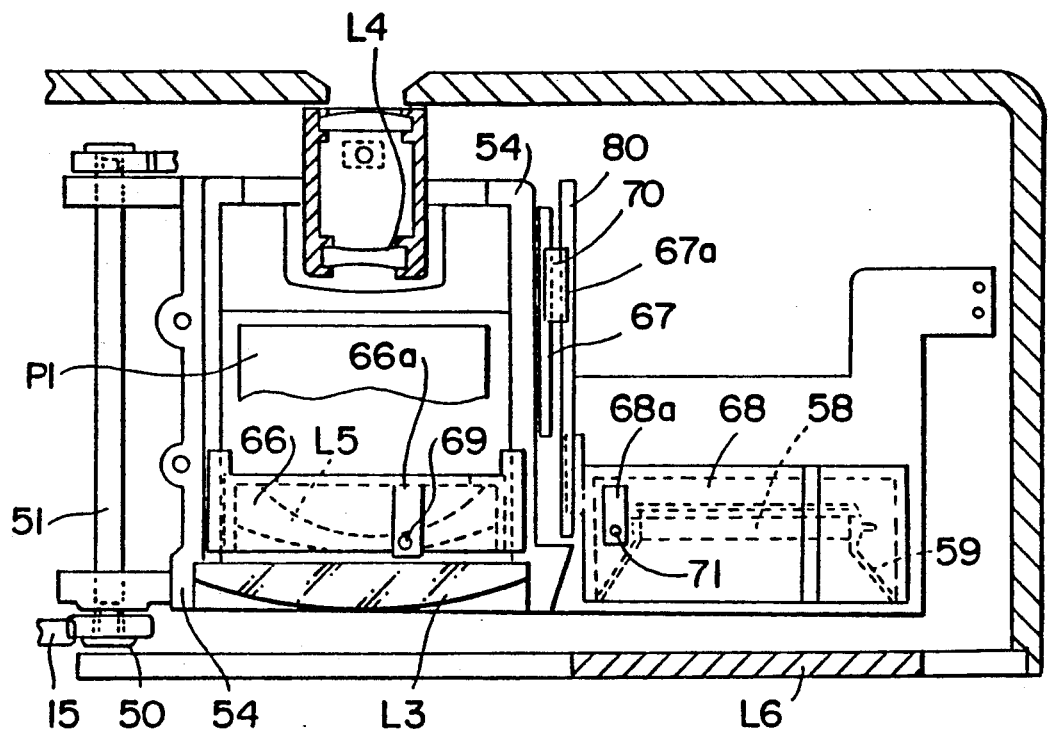
FIG. 24 is a plan view of the apparatus of FIG. 21 with the cam plate removed.

FIG. 18A illustrates a second embodiment of the finder optical system in its wide field of view, small magnification position; FIG. 19A illustrates this embodiment in its narrow field of view, large magnification position; and FIG. 20A illustrates this finder optical assembly embodiment in its narrow field of view, large magnification, macro mode position; and FIGS. 18B-D, 19B-D and 20B-D respectively, illustrate the aberrations in the finder lens system in the three different positions illustrated in FIGS. 18A, 19A and 20A, respectively. In this second embodiment of the finder optical device, the lens system is different from that in the first embodiment as discussed in example 1, insofar as the third lens group comprises two lenses in the form of positive lenses L4-2 and L4-3.

Tables 5 and 6 illustrate the curvatures r, distances d, refractive indexes Nd, and Abbe's numbers νd, for all of the elements of the second embodiment of the finder lens system, which tables are similar to Tables 3 and 4 previously discussed with respect to the first embodiment of the finder optical system. In Table 5, which represents the wide field of view, small magnification (0.35x) position of the system, and the narrow field of view, large magnification (0.648x) position of the system, and in Table 6, which represents the system when in the macro mode, the apex angle of prism P1 is 3.0° in the horizontal direction and 5.0° in the vertical direction, e.g. The bright frame which defines the photographic range is again applied to face A of the positive lens L4-2 of the third group, and face B of the negative single lens L4-1 of the second group is again semi-transparent, as in the first embodiment of the finder system.

TABLE 5

| No. | r | d | Nd | $\sqrt{d}$ |
|---|---|---|---|---|
| 1 | 25.800 | 4.50 | 1.49186 | 57.4 |
| 2 | −190.341 | 0.50 (0.35x) ~ 11.89 (0.648x) | | |
| 3 | 85.200 | 1.50 | 1.49186 | 57.4 |
| 4 | 8.081 | 14.39 (0.35x) ~ 3.00 (0.648x) | | |
| 5 | −7.056 | 1.00 | 1.67003 | 47.3 |
| 6 | 34.700 | 5.37 | | |
| 7 | ∞ | 2.93 | 1.60311 | 60.7 |
| 8 | −12.538 | 0.30 | | |
| 9 | −30.259 | 2.23 | 1.49186 | 57.4 |
| 10 | −15.420 | | | |

TABLE 6

| No. | r | d | Nd | $\sqrt{d}$ |
|---|---|---|---|---|
| 1 | 25.800 | 4.50 | 1.49186 | 57.4 |
| 2 | −190.341 | 9.42 | | |
| 3 | ∞ | 2.00 | 1.49186 | 57.4 |
| 4 | ∞ | 0.47 | | |
| 5 | 85.200 | 1.50 | 1.49186 | 57.4 |
| 6 | 8.081 | 3.00 | | |
| 7 | −7.056 | 1.00 | 1.67003 | 47.3 |
| 8 | 34.700 | 5.37 | | |
| 9 | ∞ | 2.93 | 1.60311 | 60.7 |
| 10 | −12.538 | 0.30 | | |
| 11 | −30.259 | 2.23 | 1.49186 | 57.4 |
| 12 | −15.420 | | | |

As illustrated in FIG. 17A, the finder optical device of the present invention preferably satisfies the following conditions:
(1) $0.3 < dP < 0.5$;
(2) $f1+ < 1.8$; and (3) $0.45 < f3/LD < 0.7$; wherein:
LD = the total length of the finder;

dP = the distance between the face of lens L3 which is most closely adjacent to prism P1 and the face of lens L5 which is most closely adjacent to prism P1;

f1+ = the focal length of the positive lens of the first lens group, and f3 = the focal length of the third lens group.

These criteria are useful and helpful to enable prism P1 to be retractably inserted between the movable lens L3 of the first lens group and the negative lens L5 of the first lens group and to minimize the effective diameter of the prism when it is brought into alignment with the optical axis.

The first condition, i.e., $0.3 < dP < 0.5$ is based upon the fact that if the value of dP exceeds the noted upper limit, the effective diameter of the lens L3 will become large, making it difficult to provide a compact camera as does the present invention; to the contrary, if the value of dP was <0.3, it would become extremely difficult to smoothly and easily rotate prism P1 so that it would come into alignment with, and be capable of retracting away from, the optical axis in a position between lenses L3 and L5.

Conditions 2 and 3, in which $f1+ < 1.8$, and $0.45 < f3/LD < 0.7$, are provided to minimize the effective diameter of prism P1. The second criteria noted above is substantially equivalent to setting or establishing the focal length FR of the lens system which is positioned rearwardly of prism P1 when the prism is in alignment with the finder optical axis. Namely, if f1+ exceeds its noted upper limit of 1.8, the effective diameter of the prism will become large, thereby resulting in difficulty in realizing a compact prism and finder.

Condition three is basically equivalent to a requirement for the third lens group located rearwardly of the prism. Namely, if f3/LD is less than the lower limit of 0.45, the tolerance of the system will become quite small. To the contrary, if the value of f3/LD exceeds the upper limit of 0.7, the effective diameter of the prism will increase.

The values of dp, f1+, and f3/LD in the first and second embodiments above will now be listed; all of these values are set to satisfy conditions 1, 2 and 3 noted above.

| | First Embodiment | Second Embodiment |
|---|---|---|
| dP | 0.45 | 0.36 |
| f1+ | 1.76 | 1.42 |
| f3/LD | 0.56 | 0.49 |

D. Drive Mechanism for the Finder and Strobe Devices

The driving mechanism which serves to actuate finder optical assembly 8 and strobe assembly 9 is best illustrated in FIGS. 21-30.

A mother plate 60 is attached to a finder block 54 which is mounted to base plate 6 via horizontal support plate extension 6b. The mother plate is provided with guide pins 62 integrally attached to the mother plate and which are adapted to fit within a substantially linear guide groove 61 of cam plate 53. Sliding motion of cam plate 53 is in the lateral direction, with respect to the optical axis of the camera, and is restricted by the engagement between guide grooves 61 and guide pins 62; and a guide projection or flange 60a (shown in both FIGS. 21 and 22) is formed integrally with mother plate 60 and serves to prevent cam plate 53 from floating or moving away from the front surface of the mother plate, particularly at the front end of cam plate 53 where the flange engages the cam plate.

Finder mother plate 60 includes a variable power lens guide groove 63, a deflection prism guide groove 64, and a strobe assembly guide groove 65. Each of these guide grooves extends parallel to the photographic optical axis of the camera. A guide projection 66a of variable finder lens frame 66, which carries the variable finder power lens group L5, is fitted within variable power lens guide groove 63. Guide projection 67a of deflection prism actuating plate 67 is slidably positioned or fitted within deflection prism guide groove 64; and guide projection 68a of strobe assembly case 68, which casing has a concave reflector 59 attached thereto, is fitted or positioned within strobe guide groove 65.

Variable power lens frame 66, deflection prism actuating plate 67, and strobe assembly case 68, together move in a direction which is parallel with respect to the optical axis, along the respective guide grooves. Guide projections 66a, 67a, and 68a are provided with driven pins 69, 70 and 71, which fit within the variable power cam groove 55, the parallax compensating cam groove 56, and the strobe cam groove 57, respectively. Accordingly, when cam plate 53 moves laterally, variable power lens frame 66, reflection prism actuating plates 67, and strobe case 68 move along the respective camming grooves 55, 56 and 57.

The sections of the variable power cam groove 55, parallax compensating cam groove 56, and strobe cam groove 57 correspond to sections of zooming cam grooves 20 and 21 of cam ring 14 which have been illustrated in FIG. 7 and described with respect thereto. Specifically, the variable power cam groove 55 includes an extreme wide angle fixing section 55a, a variable power section 55b, and an extreme telephoto fixing section 55c, with the angles $\theta_1$, $\theta_2$ and $\theta_3$, respectively, of these three sections corresponding to the similar angles in the cam ring FIG. 7. The parallax compensating cam groove 56 includes a non-projecting section 56a, a projecting movement section 56b, i.e., a forward feed section used for the macro mode, and a projected position fixing section 56c, i.e., an extreme macro fixing section. Strobe cam groove 57 includes an extreme wide angle fixing section 57a, a variable power section 57b, an extreme telephoto fixing section 57c, a macro feeding section 57d, and an extreme macro fixing section 57e. The relationship between cam grooves 55, 56 and 57, and zooming cam grooves 20 and 21, is best illustrated in the schematic or plan view illustrated in FIG. 44.

Figure 25:
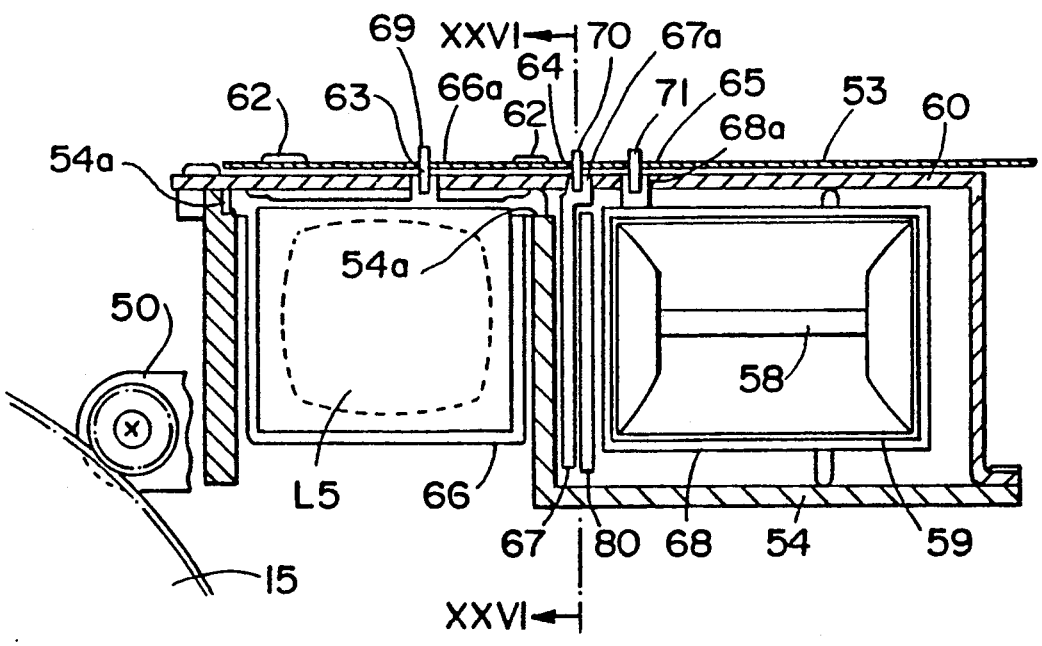
FIG. 25 is a sectional view taken along line XXV—XXV of FIG. 21.

The variable power lens frame 66 which supports the variable power lens group L5 is movably supported along guide face 54a of finder block 54 so that frame 66 will hang therefrom, as best illustrated in FIG. 25. The frame can be formed, e.g., from a resin which can slide with respect to the finder block in a substantially frictionless fashion. When variable power lens frame 66 moves along variable power cam groove 55, magnification of the finder optical system, including lens group L3, eye piece group L4, and variable power lens group L5, will vary, so that the photographic range over which lens barrel block 1 moves will be substantially coincident with the field of view of the finder.

Figure 26:
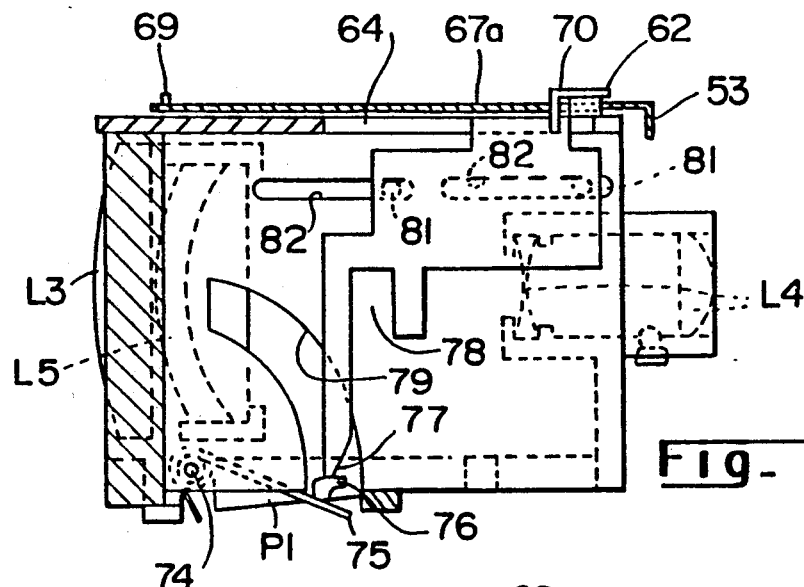
FIG. 26 is a sectional view taken along line XXVI—XXVI of FIG. 25 showing the finder plate in a first position.
Figure 27:
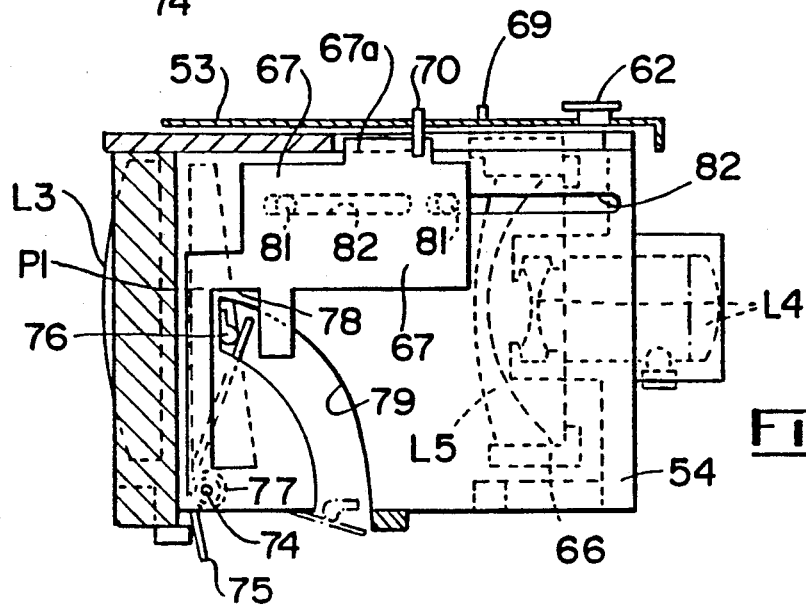
FIG. 27 is a sectional view similar to that of FIG. 26 but illustrating the finder plate in a second, operational position.

The deflection prism actuating plate 67 is illustrated in FIGS. 26–28, and is hereinafter described in greater detail.

Deflection prism P1, which is formed of synthetic resin, is rotatably supported by finder block 54 via two lower opposed prism support pins 74 of the prism. These supporting pins include torsion springs 75 which surround them, with one end of each spring bearing against a respective abutment 76 which abutments are provided along the side faces of deflection prism P1, so that the deflection prism will be continuously biased into a position in which the prism P1 moves into alignment with the optical axis of finder lenses L3–L5. Abutment 76 are located in arc-shaped grooves 79 formed in finder block 54, as best illustrated in FIGS. 26–28. The deflection prism actuating plate 67 is held between finder block 54 and a guide plate 80 (see FIG. 25) connected to finder block 54 so that a guide pin 81 which is positioned on the side face of finder block 54 will fit within linear guide groove 82 of guide plate 80.

Position restricting abutments 76 on the prism can be engaged by a stop surface 77 and a guiding surface 78 of deflection prism actuating plate 67; further, the prism abutments 76 can come into contact with an end surface of the groove 79 in plate 67 (see FIG. 27). Deflection prism actuating plate 67 serves to retract the deflection prism from the optical path of lenses L3–L5, against the bias of springs 75, when pin 70 is located in the non-projection section 56a of parallax compensating cam groove 56, insofar as the rotation preventing face 77 of the plate will move into engagement with abutment 76 (see FIG. 26). When pin 70 moves into the projecting movement section 56b, guide surface 78 will move into a butting contact with abutment 76, so that deflection prism P1 will rotate into a position in which it is in alignment with the finder system optical axis with the help of torsion spring 75. During such movement, abutments 76 move on and along face 78, and deflection prism P1 will gradually move into the optical path, as illustrated in FIGS. 27 and 28, so that the optical path of the finder will be deflected downwardly by prism P1, as illustrated by the arrow in FIG. 28. As a result of this movement, a subject which is otherwise located below the finder optical axis will come into the camera field of view, and parallax in the macro mode of the camera will be decreased. It is even further decreased, as noted above, when a double wedge prism (FIG. 53A) is used to deflect the finder optical axis downwardly and (rightwardly) towards the optical axis of the photographing optical system.

Figure 30:
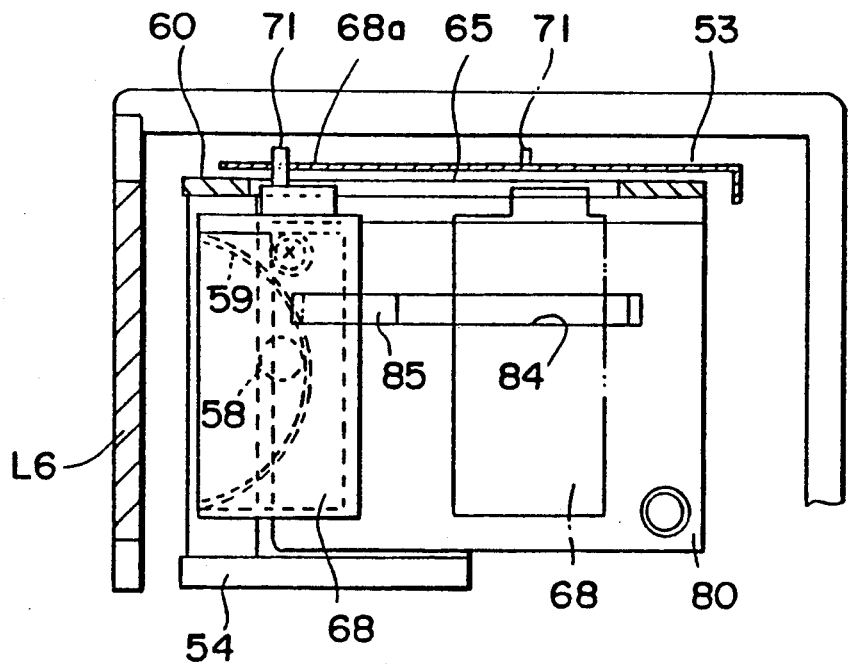
FIG. 30 is a sectional view taken along line XXX—XXX of FIG. 29.

A guide block 85 is provided along the side face of strobe case 68 and is fitted within a linear guide groove 84 which is parallel to the optical axis of the camera which is formed in guide plate 80, as illustrated in FIG. 30. Further, height adjusting pins 86 (see FIGS. 23 and 29) are provided on the upper and lower faces of strobe case 68 and are adapted to prevent the strobe case from falling downwardly. The strobe case 68 moves along strobe cam groove 57 when cam plate 53 moves in the lateral direction. Variable power section 57b of strobe cam groove 57 is adapted to move xenon lamp 58 rearwardly, away from Fresnel lens L6. Rearward movement of the xenon lamp 58 causes the illumination angle of light emitted from Fresnel lens L6 to decrease so as to substantially increase the guide number in accordance with an increase in the focal length. To the contrary, in macro feeding section 57d, the illumination angle is increased, and the guide number is therefore substantially decreased in the macro mode.

E. Barrier, i.e., Lens Cap, Mechanism

The barrier lens cap mechanism is best illustrated in FIGS. 6, 8 and 31–34.

Barrier mechanism 30 opens and closes a pair of barriers 31, (see FIG. 8 ) which are located forwardly of the front lens element group L1 of the photographic (zooming) lens system, and which are closed with the assistance of rotational force which is produced when cam ring 14 rotates within retracting or storing cam section 20b (see FIG. 7) in which the lens is collapsed.

Figure 31:
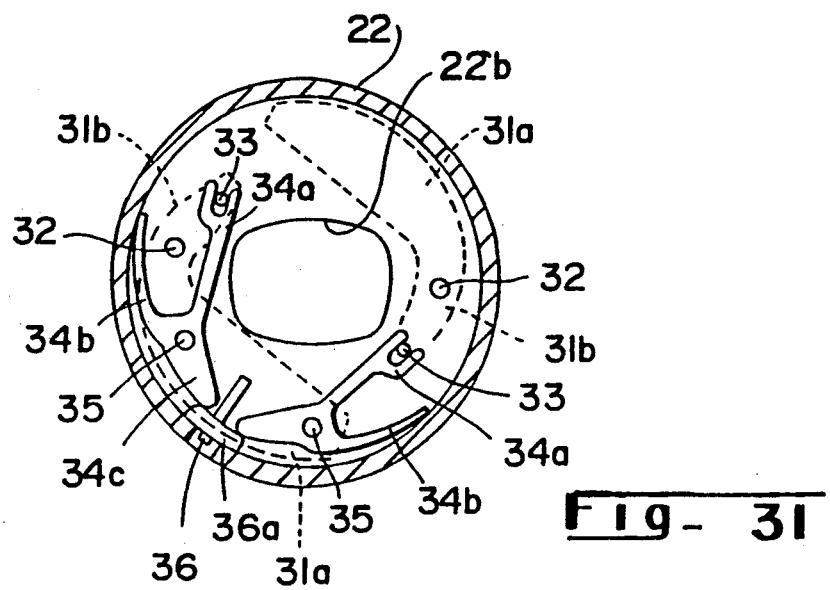
FIGS. 31 and 32 are sectional views of a first embodiment of an optical barrier mechanism, as viewed along a plane which is perpendicular to an optical axis, when in its open position with the central lens frame opening being open.
Figure 32:
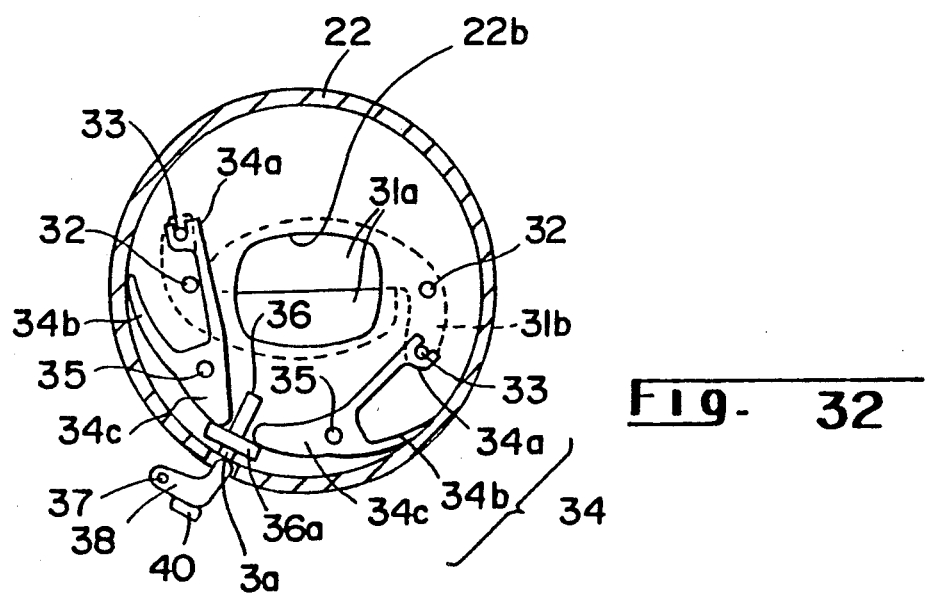

FIGS. 31 and 32 illustrate a first embodiment of the barrier mechanism. In this embodiment, barrier mechanism 30 opens and closes a photographic opening 22b at the opening of frame 22 via pivoted barrier elements 31. The barrier elements are pivoted, via pins 32, in a substantially symmetrical fashion with respect to the photographic opening 22b of the front lens group support frame 22.

Barriers 31 are disposed in a symmetrically opposite position with respect to each other and include respective barrier plate portions 31a which can be moved so as to project into the path of the photographing optical axis, as well as driving arm portions 31b which are positioned on the opposite sides of the barriers from the side on which barrier plate portions 31a are located. Driving arm portions 31b are generally attached to the inner front surface of barrier assembly 30 by pins 33. Driving arm portions 31b include pins 33 which are engaged by operational arms 34a of opening and closing springs 34, as shown in FIGS. 31 and 32. In other words, pins 33 are adapted to slide within, and/or be moved by, respective fork-shaped end portions of the driving arms.

Opening and closing springs 34 are comprised, e.g., of molded synthetic resin and include the Y-shaped spring arm 34b and driving arm portions 34c, in addition to the fork-shaped operational arms 34a which engage pins 33. Each of the springs is pivoted to the barrier mechanism 30 by a respective pin 35. Spring arms 34b bear against the inner wall of the front lens group support frame 22 in order to continuously bias barrier plate portions 31a, via operational arm 34a, into positions in which barrier plate portions 31a are located away from the optical axis of the photographing optical assembly, and in which the front aperture 22b of the frame 22 remains in an open position.

Driving arms 34c come into engagement with opposed flange portions 36a of pin 36, which is movably fitted in a radial direction within front lens group support frame 22. As shown in FIGS. 31 and 32, pin 36 is engaged by a free end of an operational lever 38 which is pivoted to front securing plate 13 via pin 37, through an operational aperture 39 of the front group lens support frame 22. Although a pivotable actuating lever is illustrated in the embodiments of FIGS. 31-34, any structure which can move pin 36 inwardly in a radial direction would be satisfactory.

Pin 36 occupies a substantially radially projecting position, under the influence of the spring force of spring 34, when no external force is applied to pin 36, as is illustrated in FIG. 31. In this position, the barrier plate portions 31a are located away from the photographing optical axis or path, and aperture 22b remains in an open position.

A restricting projection or abutment 40 is provided on the inner wall of cam ring 14, which is adapted to bear against the outer end of the operational lever (or other analogous structure) 38 when the cam ring rotates in its fixed axial position into a predetermined position in order to press pin 36 radially inwardly; this occurs when cam ring 14 (pin 17)rotates within the opening and closing section 20a of zooming cam groove 20.

With such an arrangement of the barrier mechanism, when projection 40 is not in engagement with operational lever 38, barrier plates 31a of barriers 31 open photographic opening 22b. Specifically, cam ring 14 causes rollers or pins 17 to engage any groove section other than opening and closing section 20a of zooming cam groove 20, with barriers 31 thus being open.

To the contrary, when zooming motor 5 is driven by a lock switch (not shown in the drawings) to rotate cam ring 14, so that roller 17 will move into and engage opening and closing section 20a of zooming cam groove 20 from lens collapsing or retracting groove section 20b, projection 40 will push opening and closing pin 36, via operational lever 38, in the radial direction, and barriers 31 will rotate through their engagement with spring drive arms 34c and operational arms 34a to move the barrier plate portions 31a into the optical path of the lens system. As a result, the photographic opening 22b will be closed so as to protect front lens element group L1. Namely, front lens groups support frame 22 closes barriers 31 after the frame has been collapsed from the rearmost position from which a picture can be taken.

When a picture is to be taken, zooming motor 5 is reversed so as to rotate cam ring 14, so that the zooming cam groove 20 will be rotated from a position in which opening and closing section 20a is engaged by roller(s) 17 towards a position in which lens collapsible section 20b is so engaged. This causes barriers 31 to open and the front lens group L1 is moved into a position in which a picture can be taken.

Figure 33:
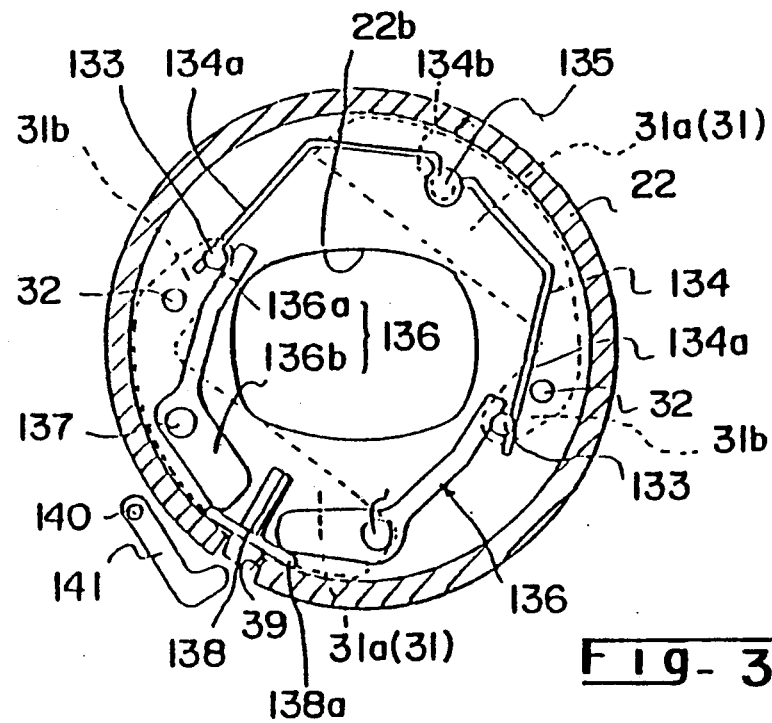
FIG. 33 is a sectional view of a second embodiment of an optical barrier mechanism formed in accordance with the present invention, the view being similar to that of the first embodiment of the optical barrier mechanism illustrated in FIG. 31.
Figure 34:
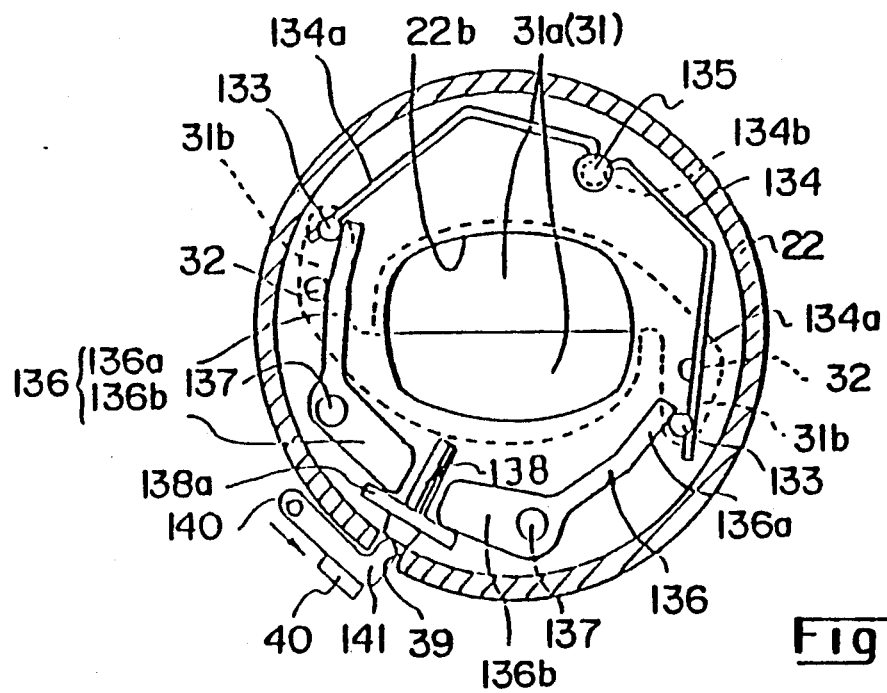
FIG. 34 is a sectional view of the optical barrier mechanism of FIG. 33 in its closed position, similar to the view of the embodiment of FIG. 32.
Figure 35:
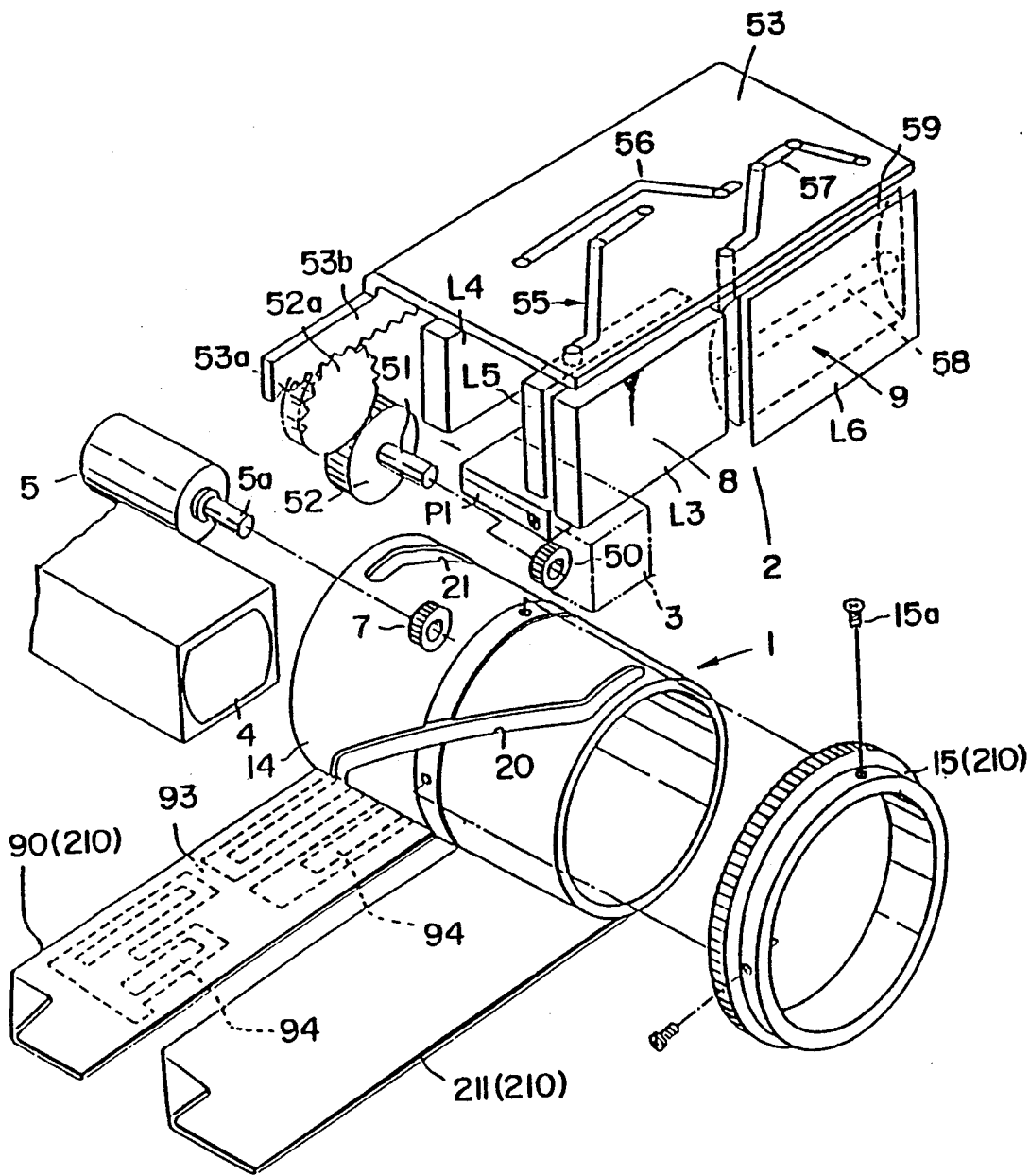
FIG. 35 is an exploded perspective view of a light intercepting mechanism positioned adjacent to a lens barrel block.

FIGS. 33 and 34 illustrate a second embodiment of a mechanism used in a lens shutter type of camera in accordance with the present invention. As shown in FIGS. 33 and 34, this barrier mechanism 30 is basically identical to the embodiment illustrated in FIGS. 31 and 32. Specifically, barrier mechanism 30 in FIGS. 33 and 34 also include a pair of barriers 31, 31 which are positioned in a substantially symmetrical fashion with respect to the photographic opening 22b of front lens group support frame 22. Barriers 31, 31 are pivoted to frame 22 via pins 32 in order to open and close photographic opening 22b. However, details of construction of the barrier mechanism in this embodiment are different from those in the first embodiment discussed above.

Barriers 31, 31 which are illustrated in FIGS. 33 and 34 are symmetrically disposed with respect to each other and include barrier plate portions 31a which can be projected onto the photography optical axis, and driving arms 31b which lie or are disposed on opposite sides of the barrier plate portions 31a; and the barriers are pivotably attached to the frame by pins 32.

Driving arms 31b include operational pins 133 which are engaged to, and which are adapted to abut or contact, a single wire spring 134 having elastic leg portions 134a. A free end of each of the elastic leg portions 134a is adapted to contact a respective pin 133 in order that barrier plate portions 31a will be continuously biased into an open position in which the photographic aperture 22b is opened and the barriers located away from the optical axis and the aperture. Thus, when no external force is applied to barriers, they constantly maintain the photographing aperture in an open condition.

Wire spring 134 is made from metal and has a central, U-shaped portion 134b which bears against a support pin 135 provided on front lens group support frame 22. Wire spring 134 has a constant spring force which force will not vary in accordance with changes in temperature, humidity or other environmental parameters. Accordingly, it is therefore possible to bias barriers 31 in a direction in which a photographing aperture is maintained in an open position by a substantially constant spring force.

Operational pins 133 are engaged by respective driving free ends 136a of a pair of right and left driving arms 136, which are spaced from each other and which are adapted to open barriers 31, by overcoming the biasing force exerted by wire spring 134. The free ends 136a of each of the driving arms 136 bears against a respective inner side of a respective operational pin 133, which is located away from the outer side of each pin against which one elastic leg portion 134a bears. Driving arms 136 are pivoted to lens support frame 22 via pins 137. Driving arms include operational arm portions 136b located on opposite sides of the driving arms from free ends 136a, with a pin 137 provided between them to pivot the arm to frame 22, such that operational arm portions 136b will engage flange portions 138a of pin 138, which is radially movably fitted within an opening 39 in frame 22. Pin 138 includes a head (unreferenced) which is adapted to bear against the free end of operational lever 141; the lever is pivoted to front securing plate 13 by pin 140, and the head can extend, when depressed, through an opening 39 of frame 22. The opening and closing pin 138 is normally maintained in a position in which it projects outwardly from the inner periphery of frame 22, and is radially movable by lever 141 into a position in which the head of pin 138 is forced inwardly through opening 39, overcoming the influence of wire spring 134. Thus when an external force is applied to pin 138, it moves radially inwardly against the force of spring 134, as seen in FIG. 34.

As in the first embodiment, the cam ring 14 can be provided, along its inner wall, with a narrowing projection 40 attached to its interior peripheral surface which is adapted to push the operational lever 141 inwardly so that it will engage operational arm portions 136b (via pin flanges 138a) when cam ring 14 rotates so that roller 17 is positioned within opening and closing section 20a of zooming cam groove 20. Other suitable actuating structure could also be used.

With such an arrangement of the barrier mechanism, barriers 31 serve to open the photographing aperture when the restriction projection 40 does not engage operational lever 141. Specifically, barriers 31 open when roller 17 is located within any of the sections of the zooming cam groove other than opening and closing groove section 20a. To the contrary, when roller 17 is moved to engage the opening and closing section 20a, after it has been positioned within lens collapsible section 20b of zooming cam groove 20 (via rotation of actuating cam ring 14 effected by zooming motor 5), projection 40 will push the opening and closing pin 138 in a radially inward direction, via operational lever 141, in order to rotate barriers 31, via driving arms 136 and operational pins 133, so that barrier plate portions 31a will be brought into the optical path of the lens system. In this condition, the photographic opening will be closed so as to protect the front lens element group L1. Namely, after front lens group support frame 22 is collapsed from the most extreme rearward position i.e., the extreme wide angle position, in which a picture can be taken, the photographic aperture will then be closed by barriers 31.

When a picture is taken, zooming motor 5 will be reversed to rotate cam ring 14 from a position in which opening and closing section 20a is engaged by roller 17 to a position in which lens collapsible section 20b is so engaged, in order to open barriers 31, so that the front lens element group L1 will move into a position in which a picture can be taken.

F. Light Interception Assembly and Mechanism

The light interception mechanisms are best illustrated in FIGS. 6 and 35-38 of the present application.

In a lens shutter type of camera as described herein, the front and rear lens element groups can be independently moved along the photographing optical axis direction in order to effect a lens zooming operation. Since a gap exists between the front lens group frame 16 and the rear lens group frame 18, and since cam ring 14, which includes through cam grooves 20 and 21 for actuating movement of lens frames 16 and 18, is located about the outer peripheries of the lens frames, the possibility exists that undesirable light rays would otherwise penetrate into the photographic optical system of the camera through the gap between the front and rear lens group frames and through the cam grooves 20 and 21. Further, since front lens group frame 22 moves through opening 201 of front cover 200 (see FIG. 6), rays of light can also enter the camera via opening 201. The front cover 200 covers the front face of lens barrel block 1 and supports lenses L3 and L6 of the finder as well as strobe block 2. Opening 201 is formed along and defined by an inner flange 202 of front cover 200, so that the movable decorative frame 22, i.e., which includes the front group lens frame 16, will move through opening 201 when the camera is in its zooming operation. An annular space 203 having a relatively small width W is provided between inner flange 202 and front stationary plate 13. The front stationary plate is substantially annular in configuration.

In order to prevent rays of light from penetrating into the camera, as noted above, a light intercepting mechanism has been provided. Specifically, a light intercepting assembly 210 which comprises a plurality of sections is provided about the outer periphery of cam ring 14 and is adapted to cover through or continuous cam grooves 20 and 21 in order to intercept rays of light and prevent them from entering the interior of lens barrel block 1. In the embodiment illustrated in FIG. 35, intercepting assembly 210 comprises a gear ring 15, a flexible code plate 90 which is adjacent to gear member 15 along one side of the gear member, and a light intercepting tape 211 which extends on the opposite side of the gear member 15. In other words, the annular gear member is located between the flexible code plate 90 which is wrapped about lens barrel block 1 over cam grooves 20 and 21, and the light tape 211, which is also flexible and which is wrapped about the lens barrel block so that it covers cam grooves 20 and 21.

Code plate 90 is provided to detect the angular position of cam ring 14 in order to automatically detect a change in the focal length of the zoom lens, a change of the F number which will vary in accordance with the changing focal length of the zoom lens, the extreme wide angle position of the zoom lens, the extreme telephoto position of the zoom lens, the collapsed position of the zoom lens, the extreme macro position of the zoom lens, e.g., in order to effect a variety of controls which are disclosed in detail hereinafter with respect to the mechanism for detecting the position of the zoom lens and for deciphering information relating to the position of the zoom lens.

Code plate 90 is formed from a flexible material having a light intercepting property. Intercepting tape 211 comprises a flexible material also having such a property, e.g., a dull-finish black paper. The code plate and the intercepting (paper) tape are applied to the cylindrical outer surface of cam ring 14, along opposite sides of gear member 15, in order to cover the major portions of zooming cam grooves 20 and 21. Gear 15 is preferably superimposed or overlapped over the side edges of the code plate and the intercepting tape in order to ensure the interception of rays of light, as illustrated in FIG. 6.

An annular light intercepting member 220 which forms an additional portion of the light intercepting assembly is provided in annular space 203, which is defined by the space between front stationary plate 13, which rotatably supports the front portion of cam ring 14, and front cover 200, as best seen in FIG. 6.

Figures 36, 37, 38:
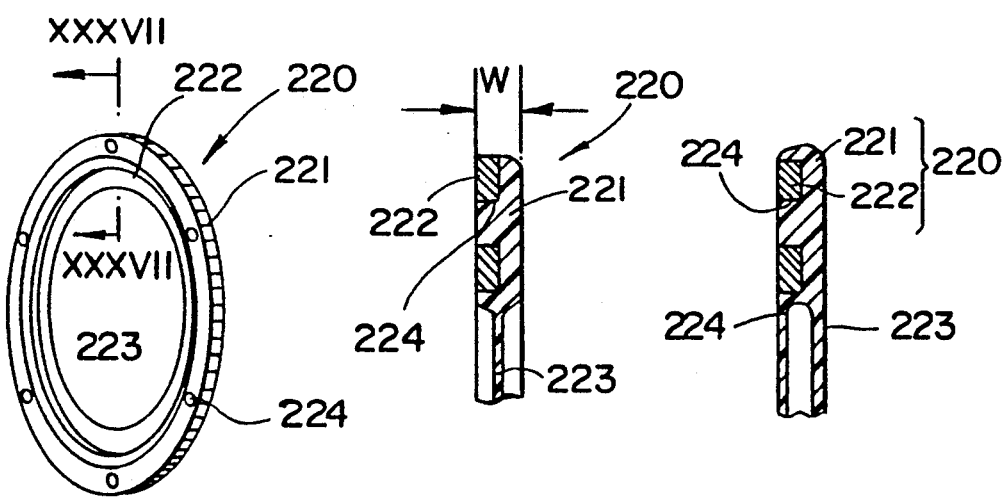
FIG. 36 is a perspective view of a light intercepting ring.
FIG. 37 is a sectional view taken along line XXXVII—XXXVII of FIG. 36.
FIG. 38 is a sectional view of a second embodiment of a light intercepting ring formed in accordance with the present invention which is similar to the view of FIG. 37.

Annular light intercepting member 220 which is positioned within annular space 203 comprises an elastic annular body 221, e.g., rubber, and an annular reinforcing plate 222, so that the light intercepting member 220 will be have the overall configuration of a substantially flat annular ring, as best illustrated in FIGS. 36 and 37. The thickness w of light intercepting member 220 is slightly less than the width W of annular space 203, so that the light intercepting member 220 can move over a small distance within space 203, along the direction of the photographing optical axis.

Elastic body 221 of light intercepting member 220 is provided, along its inner periphery, with a light intercepting lip 223 having a small width which slidably contacts the outer periphery of decorative frame 220. Reinforcing plate 222 can be secured to elastic body 221, e.g., by partially imbedding the elastic body 221 into connecting recesses, holes or apertures 224 formed in reinforcing plate 222, which plate is made, e.g., of metal or synthetic resin. The inner lip 223 is extremely flexible and is capable of moving in either direction axially of a lens barrier block about which it is positioned. The lip can thus play a minor role in reducing rebound of the barrier block after it ceases movement in a first axial direction.

FIG. 38 illustrates a second embodiment of the annular ring illustrated in FIGS. 36 and 37, in which two spaced light intercepting lips 223 (rather than merely one) are formed on the inner periphery of annular light intercepting member 220 in order to increase the light interception effect of the apparatus. These lips are spaced from each other in a parallel fashion and form a generally annular U-shaped, inwardly directed annular flange for the light intercepting member. Elastic body 221 is used to cover the outer periphery of reinforcing plate 222 in such structure.

Alternately, it would be possible to replace annular light intercepting member 220 with a conventional O-ring structure, which would be the simplest manner of intercepting light and preventing it from reaching undesired areas within the camera.

With such a light intercepting mechanism, undesirable light rays will not enter the camera lens system through the circumference of the front lens group frame 16 and/or the rear lens group frame 18, nor through the front annular opening between the lens barrel and camera cover.

G. FPC Board Guide and Anti-Reflection Mechanism

The FPC board guide and its associated anti-reflection mechanism of the are best illustrated in FIGS. 39-43.

In a lens shutter type of camera as in the present invention, it is necessary to provide operational signals to shutter block 23 on lens barrel block 1 from the body of the camera. Shutter block 23 is supported by support frame 22 of front lens element group L1, and accordingly moves together with front lens element group L1 along the direction of the optical axis. In order to send operational signals from the camera body to the shutter block 23 which moves in such an optical axis direction, in response to outputs of the distance measuring device, i.e., the range finder, and, e.g., the exposure control device on the camera body, a flexible printed circuit board (hereinafter referred to as an FPC board) is desirably used. The mechanism for guiding movement of the FPC board and the anti-reflection assembly which are used in conjunction with such board are described hereinbelow in detail with more specific reference to FIGS. 39-43.

FPC board 160 (see FIGS. 39 and 40) provides operational signals to shutter block 23 from one side of the camera body. This board is made from a flexible synthetic resin sheet having a predetermined printed circuit pattern thereon; in general, such FPC boards are well known.

Figure 39:
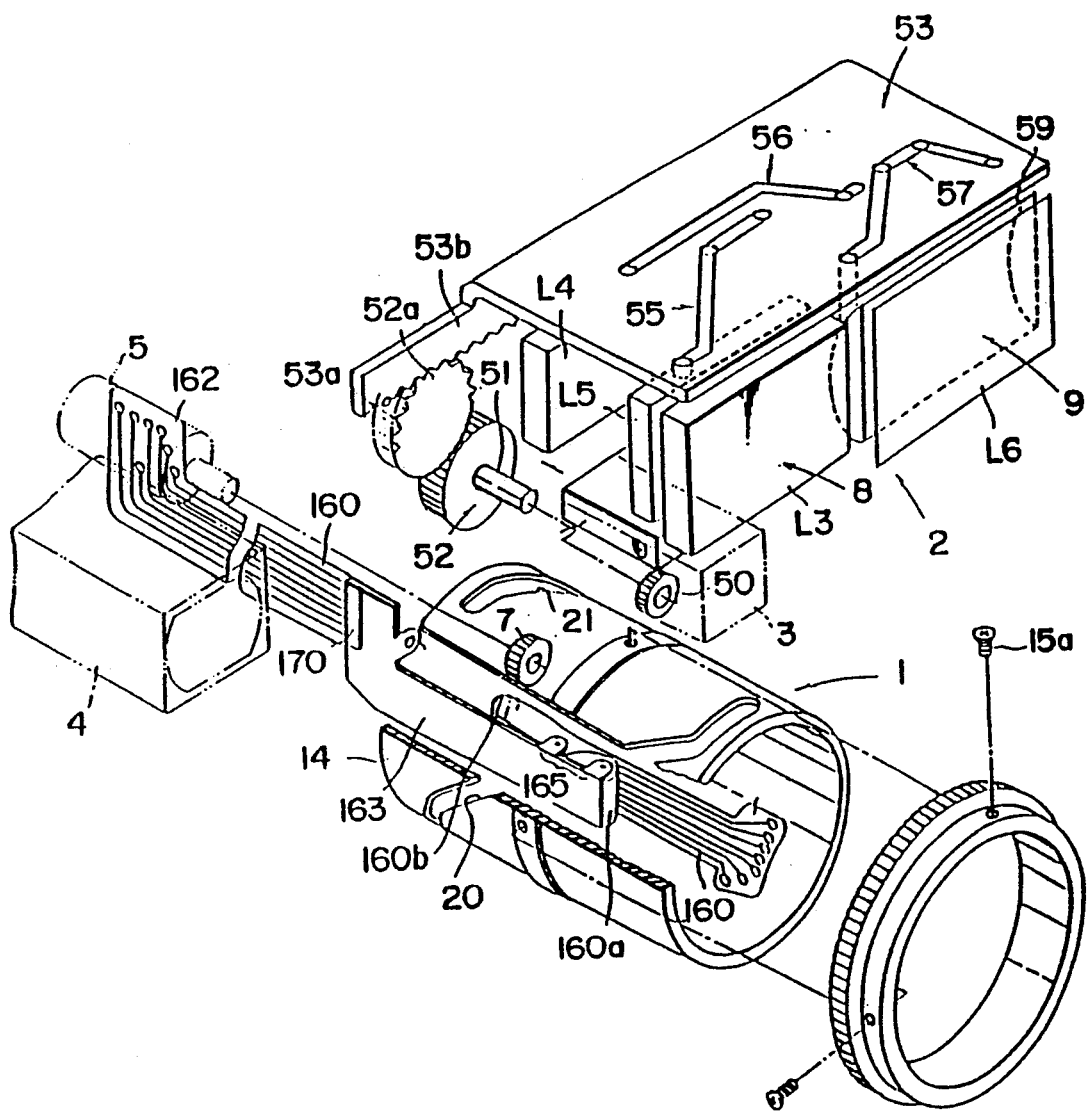
FIG. 39 is an exploded perspective view of one embodiment of a guiding device for a flexible printed circuit board (i.e., an FPC) with the cam ring being partially cut away.

As illustrated in FIG. 39, FPC board 160 has a connecting pattern 161 at a front end of the board to which shutter block 23 can be electrically connected, and a rear connecting pattern 162 to which a CPU (a central processing unit which is not illustrated in the drawings) which is provided in the camera body can be electrically connected. FPC board guide plate 163, which guides FPC board 160, is secured to the camera body at a base or rear portion thereof, and extends into a space between cam ring 14 and decorative frame 22, forwardly of lens barrel block 1. Securing clips 166 are provided for attaching the FPC board 163 to the guide plate, and clamping members 167 (see FIG. 41) are provided for attaching the FPC board to the front portion of a camera body frame, e.g., which is die cast, or to the rear portion of a lens barrel frame(base 6).

A bent guide 165 is provided on the front end of FPC board 163; this bent guide comprises a pair of front and rear guide pins 168 and 169. These guide pins are preferably stationary (although it is conceivable that rollers could be used instead) and are adapted to maintain the curvature of the FPC board 163 along an immovable bent portion 160a of the board, at which point the board extends forwardly from the camera body and is bent in opposite directions so as to extend towards the camera body. FPC board 160, which is bent around guide pin 168, extends rearwardly into the gap between guide pin 169 and FPC board guide plate 163, and is again freely bent forwardly by or at a movable bent portion 160b.

It should be appreciated that the relative positional relationship between guide pins 168 and 169, and FPC board 160, is constant, irrespective of the movement of shutter block 23 forwardly and rearwardly in an axial direction. Accordingly, guide pins 168 and 169 are preferably immovable pins which are not rotatable. Alternately, it is possible to replace these pins with guide rods or shafts over which the FPC board will be bent in opposite directions.

Figure 40:
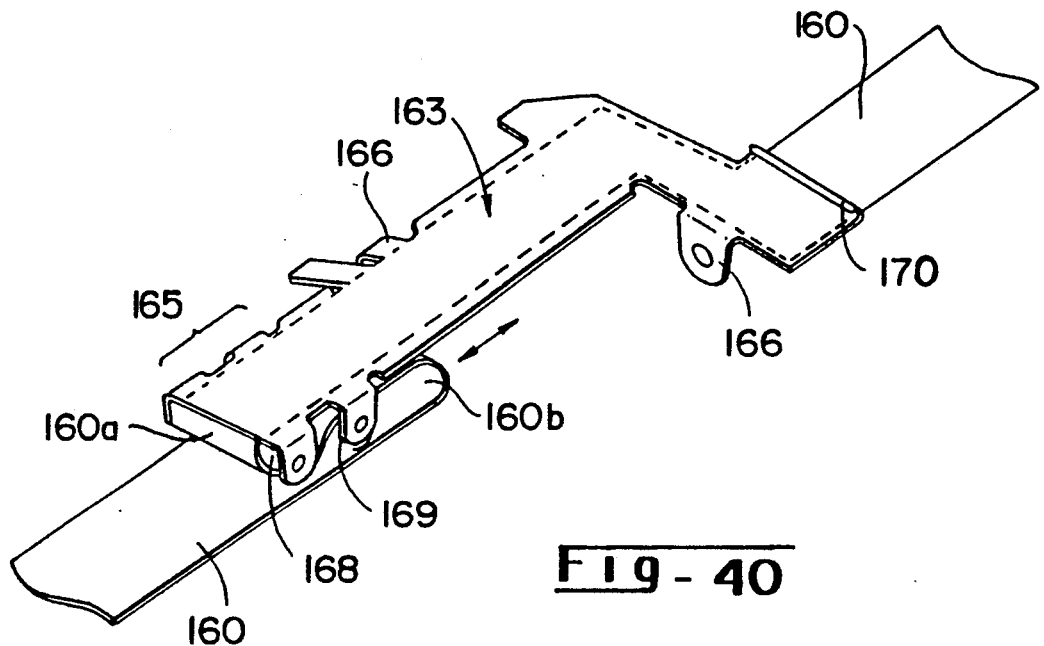
FIG. 40 is a perspective view of the FPC board guide member of FIG. 39.

As shutter block 23 moves forwardly and rearwardly, the movable bent portion 160b of the FPC board also moves forwardly and rearwardly. Although the extension of the FPC board 160 extends rearwardly from the board guide plate 163, as shown in FIGS. 39 and 40, actually the rear extension of FPC board 160 can be bent forwardly along, and by, a bent guide 170 of guide plate 163 in order to move the board towards the front part of the camera body.

The inner surface of FPC board 160 faces the gap between the front lens group frame 16 (as well as decorative frame 22) and rear group lens frame 18, and there is therefore a possibility that rays of light which are incident upon the lens system will be reflected by FPC board 160, resulting in undesirable internal reflection. In order to prevent such internal reflection, an anti-reflection material or apparatus can be (and should be) provided on FPC board 160.

Figure 43A:
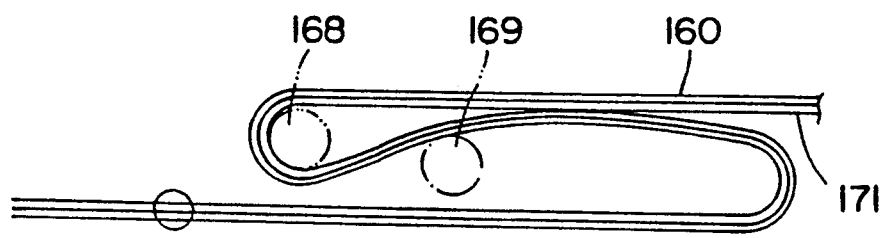
FIGS. 43A and 43B is a side elevational view of a light intercepting means used in association with an FPC board.
Figure 43B:
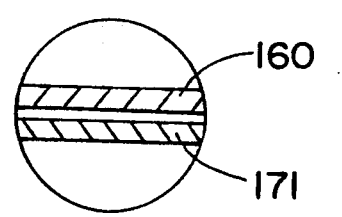

Several alternate solutions can be used to provide anti-reflection means on the FPC board 160. As one solution, FPC board 160 can be formed from a dull-finish, black synthetic resin material. Alternately, the FPC board 160 can be provided along its inner surface, i.e., on its surface which is adjacent to the optical axis of the camera, with an anti-reflection sheet 171, as illustrated in FIG. 43. Such a sheet can comprise, e.g., a dull-finish black paper or the like, and is adapted to be placed on the FPC board 160. Preferably, the anti-reflection sheet 171 is simply loosely superimposed on the FPC board without being adhered to the board in order to provide flexibility against deformation due to expansion and shrinkage of the material. Sheet 171 lies on the FPC board in the area between bent portions 160a and 160b of FPC board 160. A third solution is to coat at least the inner surface of FPC board 160 with an anti-reflective layer.

Figure 41:
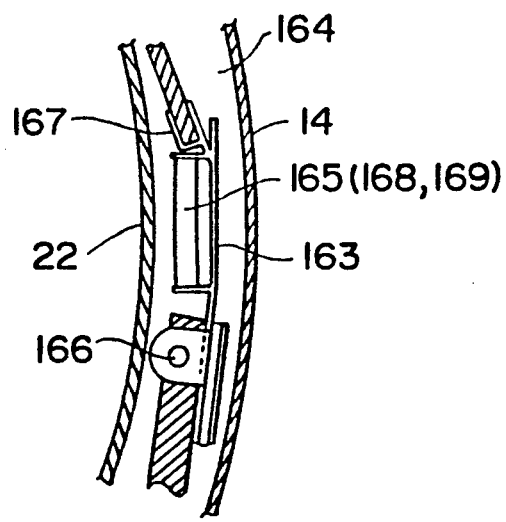
FIG. 41 is a sectional view of a mechanical arrangement of an FPC board guide plate with respect to the space defined between the cam ring and a front lens group frame.
Figure 42:
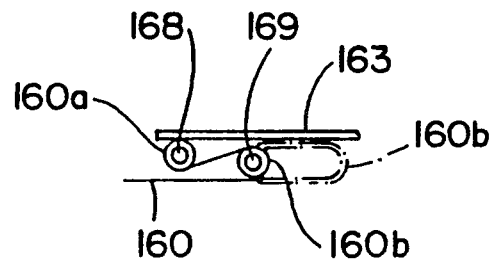
FIG. 42 is a side elevational view of an FPC board which is illustrated in extension (in dashed lines) and in a deformed position (in solid lines), respectively.

With the guide mechanism of the FPC board and with the anti-reflection mechanism which are noted above, when the zooming motor 5 is driven to rotate in order to rotate cam ring 14, front lens group frame 16 and rear lens group frame 18 will be moved in directions along the optical axis in accordance with the cam grooves 20 and 21 on cam ring 14 in order to effect a zooming operation, and can be moved into a position in which the camera is in its macro setting or mode. Movement of the front lens group frame 16 causes shutter block 23 to move in the same direction, so that FPC board 160 will be extended in accordance with movement of the shutter block 23. Extension of the board is made possible by displacement of movable bent board portion 160b. Specifically, FPC board 160 is integrally connected to the CPU in the body of the camera at rear end connecting pattern or portion 162 (see FIG. 39) and the intermediate portion of the FPC board is guided by FPC guide plate 163. The movable bent portion 160a of the FPC board 160 is immovably guided by guide pins 168 and 169; and, accordingly, when the front end connecting pattern 161 of FPC board 160 moves in accordance with or in response to movement of shutter block 23, only the movable bent board portion 160b will be displaced forwardly and rearwardly in order to absorb the movement of shutter block 23, as illustrated in FIGS. 40 and 42. In this fashion, FPC board 160 can be surely guided within the annular space 164 located between cam ring 14 and decorative frame 22 (FIG. 41).

Since the FPC board 160 has an anti-reflection structure as disclosed above, internal reflections which would otherwise cause an undesirable phenomena, e.g., a flare or a ghost, will not occur.

H. Detection Mechanism for Detecting Information Relating to the Position of the Zoom Lens As noted previously, in a lens shutter camera formed in accordance with the present invention, the photographic optical system is moved along the optical axis by the rotation of cam ring 14, so that the focal length of the photographic optical system will vary, and so that the optical system will move from one extreme angular position of the cam ring into the macro setting position, and from the other extreme angular position of the cam ring into a lens (totally) collapsed position. In such a lens shutter type of camera, which includes a zoom lens, it is necessary, e.g., to detect the focal length of the photographic optical system, the macro setting position, and the two extreme positions of the cam ring in order to indicate the focal length, to control the exposure which varies in accordance with the F number, and to control the direction of rotation of the motor which drives the cam ring.

In the present invention, the above information, i.e., relating to the focal length and the two extreme positions of th zoom lens, can easily be detected by code signals on the single flexible code plate 90 which is provided on cam ring 14. Specifically, code plate 90, as illustrated in FIG. 44, is provided on cam ring 14 (which is shown in FIG. 1) and is brought into sliding contact with a brush 92 (FIG. 44) which is secured at its base end to a stationary frame 91 positioned on the outside of cam ring 14. This is well illustrated in FIG. 1.

FIG. 44 illustrates the developed code plate 90, in a flattened condition, in which the upper half of the drawing illustrates the cam profiles of zooming cam groove 20 and 21 of cam ring 14, and cam grooves 55, 56 and 57 of cam plate 53, respectively. Brush 92 includes a common terminal C and independent (bristles) terminals T0, T1, T2, and T3. When each of terminals T0-T3 is electrically connected to the conductive lands 93 of code plate 90, a signal "0" is issued, and when each of the terminals T0-T3 are not electrically connected to conductive lands 93, a signal "1" is issued. The angular position of cam ring 14 can be detected by the combination of signals "0" and "1". A plurality of dummy terminals 94 are formed in conductive lands 93. The purpose of the dummy terminals, which are formed from the same material as conductive lands 93, is that the flexible code plate bent about the cam ring, and in order to improve the physical strength of the plate and still provide an area without electrical contact the dummy terminals were so positioned to increase flexibility while preserving strength. Additionally, these dummy terminals provide (non-conductive) lands upon which the terminals T0- T3 of the brush can ride as the cam ring is rotated.

The four bit information received from terminals T0-T3 are provided as zoom code data ZP0, ZP1, ZP2, and ZP3, respectively, of a zoom code encoder, as is clearly illustrated in FIG. 45. This figure comprises a table of combinations of signals "0" and "1", in which the angular position, i.e., POS, of cam ring 14 is divided into 13 steps between "0" and "9", and "A", "B", and "C", respectively, which are hexadecimal numbers. The number "0" designates a locked position, and the "C" position designates a position in which the camera is in its macro mode. Between the locked position and the macro position, there are nine focal length positions f0-f7'. The locked position and the macro position correspond to the two extreme angular positions of the cam ring 14. Zooming motor 5 is controlled so that the cam ring 14 will not rotate beyond the two extreme positions. These angular or rotational positions are shown on the code plate in FIG. 44.

Rotation of cam ring 14 is controlled by the mode changing switch 101 and the zoom switch 102, which are illustrated in FIGS. 47-50, in accordance with positional information of cam ring 14 as determined by code plate 90.

Figure 46:
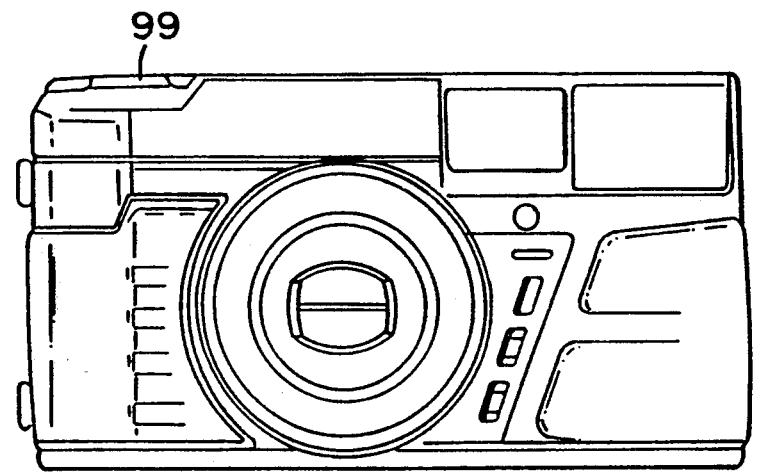
FIG. 46 is a front elevational view of the operational switches of a camera formed in accordance with the present invention.
Figure 47:
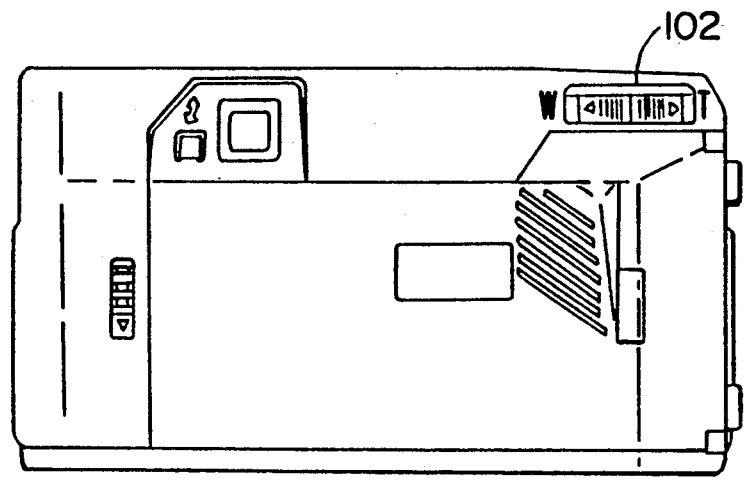
FIG. 47 is a back elevational view of the camera of the present invention illustrating a zooming lens operation switch thereon.
Figure 48:
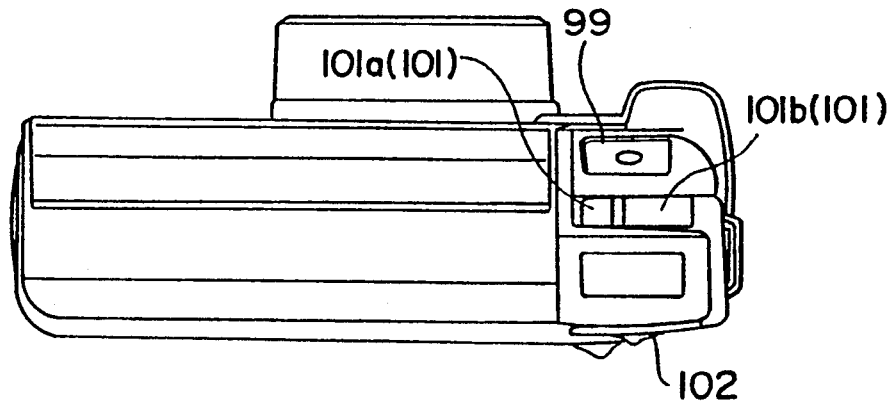
FIG. 48 is a top plan view of the camera of FIGS. 46 and 47, illustrating additional operational switches.
Figure 49:
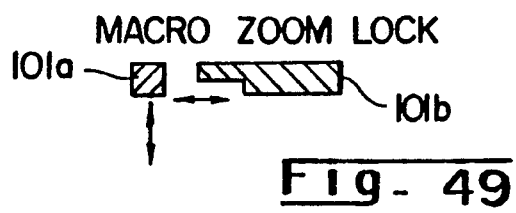
FIG. 49 is a schematic sectional view illustrating a mode changing switch formed in accordance with the present invention in a first, inoperative position.
Figure 50:
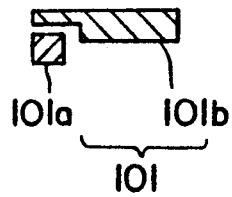
FIG. 50 is a sectional view of a mode changing switch and a macro button illustrated in a second operational position.

The arrangement of mode changing switch 101 and zoom switch 102 on the camera body is illustrated in FIGS. 46-48. A release button 99 is provided on the upper surface of the camera which can be pushed by one step to turn a photometry switch into an ON position, and which can be pushed by two steps to turn a release switch into an ON position (neither of these two switches are shown in the drawings, however). Mode changing switch 101 is a transfer switch which can occupy 3 positions, i.e., a lock position (LOCK), a zooming position (i.e., ZOOM), and a macro position, i.e. (MACRO). As illustrated in FIGS. 49-50, when macro button 101a is not depressed, switch lever 101b can move between the LOCK and ZOOM positions. When macro button 101a is depressed, however, and when switch lever 101b slides onto the upper surface of macro button 101a, the macro mode of the camera will be set. FIGS. 49 and 50 are cross-sections of the macro and zoom-lock switches, respectively. When in the LOCK position, neither the releasing operation nor the zooming operation of the zoom lens can be effected. In the ZOOM position, however, the release operation and the zooming operation can be carried out. In the MACRO position, the releasing operation can be performed but the zooming operation cannot be effected.

Figure 51:
FIG. 51 is a schematic view of an alternative telephoto-wide angle switch of the camera of the present invention.

FIG. 51 illustrates an alternate arrangement of the zoom switch, in which the zoom lens is moved towards a telephoto position when a telephoto button T is pushed and towards a wide angle position when a wide angle button W is pushed.

Zoom switch 102 occupies a neutral position, i.e., it is placed into an OFF position, when no external force is applied to the switch; and it can be manually moved into a wide angle position, i.e., a WIDE position, and into a telephoto position, i.e., a TELE position, which positions are located on opposite sides of the neutral "OFF" position. Zooming motor 5 can be rotated in both forward and reverse directions by switching the position of zoom switch 102 between the WIDE and TELE positions.

Mode changing switch 101 and zoom switch 102 actuate the camera of the present invention as detailed hereinafter. In actual use, positional information relating to the position of cam ring 14 which is indicated by code plate 90 will be used.

1. For the LOCK position of the mode changing switch 101, zooming motor 5 is reversed to rotate cam ring 14. When the angular position POS of cam ring 14 becomes "0" (see FIGS. 44 and 45) as detected by code plate 90 and brush 92, zooming motor 5 will stop rotating.

2. For the MACRO position of the mode changing switch 101, zooming motor 5 rotates in the forward direction and stops rotating when POS reaches the "C" position.

3. For the ZOOM position of the mode changing switch 101, zooming motor 5 reverses when zoom switch 102 is in the WIDE position, and rotates in the forward direction when the zooming switch is in the TELE position. Zooming motor 5 will stop rotating when POS reaches the "A" position, when the zoom switch is in the TELE position. When the zoom switch is in its WIDE position, zooming motor 5 will continue reversing for a predetermined short span of time after POS reaches the "1" position. After this time, zooming motor 5 will begin rotating in a forward direction and will stop rotating when POS becomes 2.

When zoom switch 102 is turned to the OFF, i.e., neutral, position, during rotation of zooming motor 5, the zooming motor will immediately stop rotating when the zoom switch is in the TELE position, and will stop after it rotates in the forward direction for a predetermined short period of time when it is in the WIDE position, respectively.

Details of several of the positions will now be described.

POS 1: Since the code signals change at the LOCK position and at the extreme WIDE position, these extreme positions are detected. More precisely speaking, the LOCK position is not "POS 0", but is instead a point which is located between POS 0 and POS 1. However, when the camera is in the LOCK position, the brush is in POS 0, in a location very close to POS 1. Similarly, the WIDE extreme position is apoint between POS 1 and POS 2. However, when the camera is in the extreme WIDE position, (which is not a wide zone), brush 92 is in POS 2, which is very close to POS 1. Accordingly, POS 1 denotes a range in which the cam ring 14 moves from the extreme WIDE position to the LOCK position, and vice versa.

POS f7': This zone is provided for absorbing the backlash of cam ring 14 (i.e., backlash from movement of the lens system). Specifically, as illustrated in FIG. 45, during rotation of the cam ring from POS 0 towards POS C, the cam ring will stop immediately when a stop signal is given, i.e., when the zoom switch is turned to an off position. To the contrary, rotation of the cam ring from POS C towards POS 0 causes the cam ring 14 to reverse slightly after it overruns its desired position by a predetermined displacement, and then stops the cam ring at a first changing POS point. POS f7' is the extreme TELE position, and, accordingly, when cam ring is in its extreme TELE position (with the TELE zone being a zone in which the cam ring operates at the TELE exposure), the brush will be located at position POS A, which is very close to POS 9. The focal length information or the F number information are fed to the shutter by the code plate and the brush. Accordingly, the same focal length information is fed at the TELE zone and the TELE extreme positions. This is the reason that POS 9 is represented by f7 and POS A is represented by f7' in order to distinguish it from f7. The zone f7' is quite small, and accordingly the zone f7' can essentially be considered identical to the extreme TELE position.

POS B: In a fashion similar to POS 1, this zone is provided to distinguish the extreme MACRO and TELE positions. Unlike POS 1, in which the WIDE extreme position is a changing point between POS 1 and the WIDE extreme position, and POS B is an extreme TELE position representing changing points between POS 9 and POS A, respectively.

POS 2≃POS A: These are intermediate focal length positions which comprise a plurality, e.g., 9 in the illustrated embodiment, steps.

The CPU then checks the code information and the setting positions for the various switches when they are turned into their ON positions. If the mode changing switch is in a zoom position, no zooming will be necessary when the cam ring is in any position between and including POS 2 and POS A. If, however, the mode changing switch is in a position other than the zoom position, i.e., in either the LOCK position, an intermediate position between LOCK and WIDE, an intermediate position between TELE and MACRO, or the MACRO position, zooming operation of the lens will be immediately effected. This is also true when the switch is brought into the zoom position during rotation of the zooming motor in the forward direction and when the switch is brought into the zoom position during reverse rotation of the zooming motor. Specifically, when in the zoom position, whether the zoom code is within the range between and including POS 2 to POS A (within which range zooming is effected) will be checked by the CPU. If the zoom code is out of the range, no picture can be taken, and, accordingly, the cam ring will be moved into the zooming position. In other words, POS 1 and POS B are areas in which the cam ring is prohibited from stopping and in which a picture cannot be taken.

Of course, it is clear that the present invention is not limited to the embodiments described above, nor those illustrated in the drawings, and the invention can be modified without departing from the spirit and scope of the claimed invention.

We claim:

1. A movable cam plate positioned within a camera which is adapted to be driven by a rotary electrical motor, said cam plate comprising a substantially flat main portion, a rack extending in a plane transverse to said flat main portion and attached to a rear edge of said main portion, and a plurality of guide surfaces in said main portion, said rack comprising means for transmitting motive force from said motor to said guide surfaces.

2. The movable cam plate according to claim 1, said rear edge comprising an edge adjacent a surface of the camera opposite a surface of the camera from which a photographing lens extends.

3. The movable cam plate according to claim 1, said rack meshing with a cooperating toothed member mounted for movement together with a lens of said camera, said rack and toothed member comprising means for transmitting motion from said camera lens to said cam plate.

4. The movable cam plate according to claim 1, said plurality of guide surfaces comprising a plurality of cam slots within said flat main portion of said cam plate, each of said cam slots receiving a pin for moving an associated camera mechanism in accordance with movement of said cam plate.

5. The movable cam plate according to claim 1, said plurality of guide surfaces comprising means for moving an associated camera mechanism in a direction substantially parallel to an optical axis of a camera lens.

6. The movable cam plate according to claim 1, at least one of said plurality of guide surfaces in said main portion comprising a parallax compensating cam groove.

7. A movable cam plate positioned within a camera which is adapted to be driven by a motor, said camera having a zoom lens driven by said motor, said cam plate comprising a substantially flat main portion, a toothed peripheral area provided at an edge of said main portion, and a plurality of cam surfaces in said main portion, said zoom lens including a rotatable gear which is engaged via a gear train to said cam toothed peripheral area, said toothed peripheral area comprising means for transmitting motive force from said motor to said cam surfaces.

8. The movable cam plate according to claim 7, said rotatable gear comprising means transmitting motive force from said motor to said cam plate.

9. The movable cam plate according to claim 7, said plurality of cam surfaces comprising a plurality of cam slots in said main portion, each of said cam slots receiving a pin for driving an associated camera mechanism in response to movement of said cam plate.

10. A movable cam plate in accordance with claim 7, said plurality of cam surfaces comprising means for moving an associated camera mechanism in a direction substantially parallel to an optical axis of said zoom lens.

11. The movable cam plate according to claim 7, at least one of said plurality of cam surfaces comprises a parallax compensating cam groove.

12. The movable cam plate according to claim 7, said toothed peripheral area comprising means for transmitting motion from said zoom lens to said cam plate.

* * * * *

UNITED STATES PATENT AND TRADEMARK OFFICE
CERTIFICATE OF CORRECTION

PATENT NO. : 5,321,462
DATED : June 14, 1994
INVENTOR(S) : K. Haraguchi, et. al.

It is certified that error appears in the above-indentified patent and that said Letters Patent is hereby corrected as shown below:

Foreign Patent Documents,
Title page, item [56], References Cited, insert the followings:

| | | |
|---|---|---|
| 61-208040 | 9/1986 | Japan--. |
| 61-118734 | 6/1986 | Japan--. |
| 863557 | 7/1958 | United Kingdom--. |
| 58-040733 | 9/1981 | Japan--. |
| 58-040735 | 9/1981 | Japan--. |

Signed and Sealed this

Seventeenth Day of December, 1996

Attest:

BRUCE LEHMAN

*Attesting Officer*    *Commissioner of Patents and Trademarks*